United States Patent
Keilaf et al.

(10) Patent No.: US 12,481,037 B2
(45) Date of Patent: *Nov. 25, 2025

(54) VARYING DETECTION SENSITIVITY BETWEEN DETECTIONS IN LIDAR SYSTEMS

(71) Applicant: Innoviz Technologies Ltd., Rosh Ha'Ayin (IL)

(72) Inventors: Omer David Keilaf, Kfar Saba (IL); Oren Buskila, Hod Hasharon (IL); Ronen Eshel, Givataim (IL); Yair Antman, New York, NY (US); Amit Steinberg, Adanim (IL); David Elooz, Kfar Ha'Ro'E (IL); Julian Vlaiko, Kfar Saba (IL)

(73) Assignee: Innoviz Technologies Ltd., Rosh Ha'Ayin (IL)

( * ) Notice: Subject to any disclaimer, the term of this patent is extended or adjusted under 35 U.S.C. 154(b) by 1102 days.

This patent is subject to a terminal disclaimer.

(21) Appl. No.: 16/999,249

(22) Filed: Aug. 21, 2020

(65) Prior Publication Data

US 2020/0386872 A1 Dec. 10, 2020

Related U.S. Application Data

(63) Continuation of application No. 16/411,582, filed on May 14, 2019, now Pat. No. 11,500,076, which is a
(Continued)

(51) Int. Cl.
*G01S 7/4863* (2020.01)
*G01S 7/481* (2006.01)
(Continued)

(52) U.S. Cl.
CPC ......... *G01S 7/4863* (2013.01); *G01S 7/4815* (2013.01); *G01S 7/4816* (2013.01); *G01S 7/4817* (2013.01); *G01S 7/489* (2013.01); *G01S 17/931* (2020.01)

(58) Field of Classification Search
CPC .... G01S 7/4863; G01S 7/4815; G01S 7/4816; G01S 7/4817; G01S 7/489; G01S 17/931; G01S 7/4868
See application file for complete search history.

(56) References Cited

U.S. PATENT DOCUMENTS

| 9,304,203 B1 * | 4/2016 | Droz | G01S 17/88 |
| 2005/0151957 A1 * | 7/2005 | Stierle | G01C 3/08 356/5.15 |

(Continued)

FOREIGN PATENT DOCUMENTS

| EP | 1916545 | 4/2008 |
| EP | 2422225 | 2/2012 |

(Continued)

OTHER PUBLICATIONS

International Search Report and Written Opinion dated Nov. 5, 2018 issued in International Application No. PCT/IB2017/001569; 15 pages.

*Primary Examiner* — Isam A Alsomiri
*Assistant Examiner* — Sanjida Naser
(74) *Attorney, Agent, or Firm* — Meitar Patents Ltd.; Daniel Kligler

(57) ABSTRACT

Systems and methods use LIDAR technology. In one implementation, a LIDAR system includes at least one processor configured to: control activation of at least one light source for illuminating a field of view; receive from at least one sensor having a plurality of detection elements reflections signals indicative of light reflected from objects in the field of view; dynamically allocate a first subset of the plurality
(Continued)

of detection elements to constitute a first pixel; dynamically allocate a second subset of the plurality of detection elements to constitute a second pixel; following processing of the first pixel and the second pixel, dynamically allocate a third subset of the plurality of detection elements to constitute a third pixel, the third subset overlapping with at least one of the first subset and the second subset, and differing from each of the first subset and the second subset; and following processing of the first pixel and the second pixel, dynamically allocate a fourth subset of the plurality of detection elements to constitute a fourth pixel, the fourth subset overlapping with at least one of the first subset, the second subset, and the third subset, and differing from each of the first subset, the second subset, and the third subset.

23 Claims, 37 Drawing Sheets

Related U.S. Application Data continuation of application No. PCT/IB2017/001569, filed on Nov. 16, 2017.

(60) Provisional application No. 62/567,692, filed on Oct. 3, 2017, provisional application No. 62/563,367, filed on Sep. 26, 2017, provisional application No. 62/560,985, filed on Sep. 20, 2017, provisional application No. 62/521,450, filed on Jun. 18, 2017, provisional application No. 62/516,694, filed on Jun. 8, 2017, provisional application No. 62/461,802, filed on Feb. 22, 2017, provisional application No. 62/456,691, filed on Feb. 9, 2017, provisional application No. 62/455,627, filed on Feb. 7, 2017, provisional application No. 62/441,606, filed on Jan. 3, 2017, provisional application No. 62/441,574, filed on Jan. 3, 2017, provisional application No. 62/441,581, filed on Jan. 3, 2017, provisional application No. 62/441,578, filed on Jan. 3, 2017, provisional application No. 62/441,583, filed on Jan. 3, 2017, provisional application No. 62/441,610, filed on Jan. 3, 2017, provisional application No. 62/441,611, filed on Jan. 3, 2017, provisional application No. 62/425,089, filed on Nov. 22, 2016, provisional application No. 62/422,602, filed on Nov. 16, 2016.

(51) Int. Cl.
*G01S 7/489* (2006.01)
*G01S 17/931* (2020.01)

(56) References Cited

U.S. PATENT DOCUMENTS

| 2014/0240721 | A1* | 8/2014 | Herschbach | G01S 17/42 |
|---|---|---|---|---|
| | | | | 356/625 |
| 2016/0274589 | A1* | 9/2016 | Templeton | G01S 17/89 |
| 2017/0180703 | A1* | 6/2017 | Kovacovsky | G01S 17/89 |
| 2018/0275256 | A1* | 9/2018 | Tosato | G01S 17/04 |
| 2018/0284273 | A1* | 10/2018 | Buettgen | G01J 3/2823 |

FOREIGN PATENT DOCUMENTS

| EP | 2708913 | 3/2014 | | |
|---|---|---|---|---|
| WO | WO-2015122955 A2 * | 8/2015 | | G01C 3/08 |

* cited by examiner

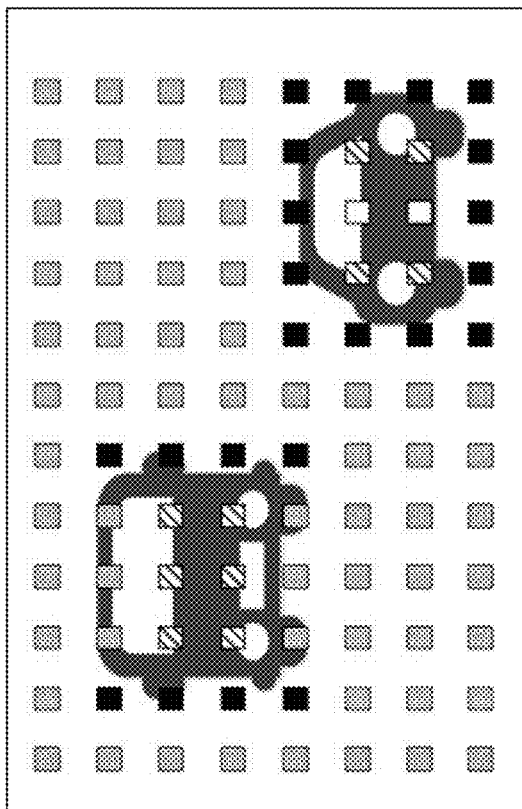
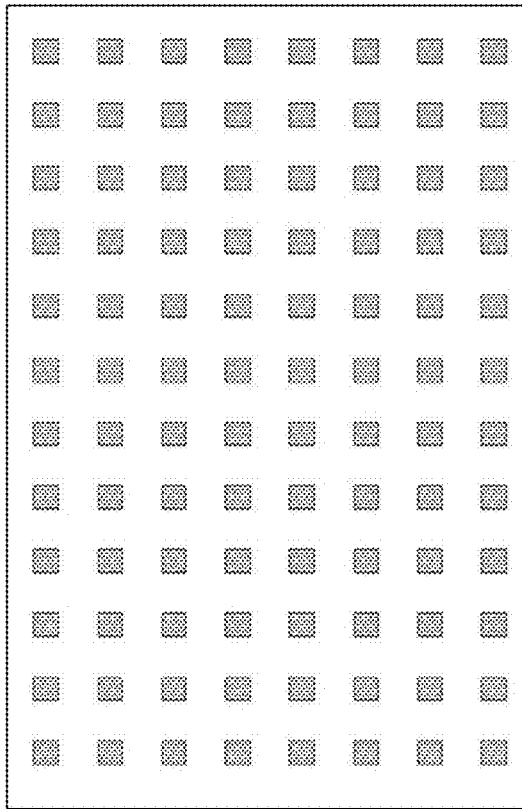
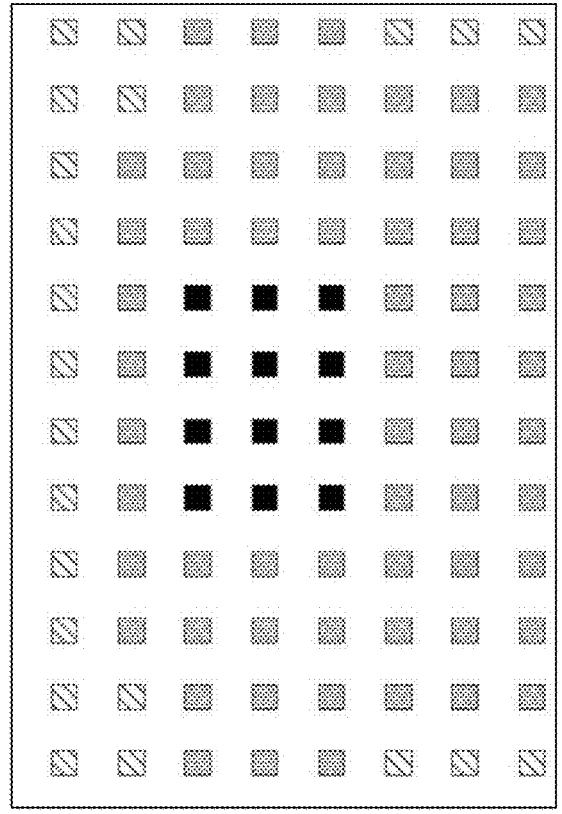
500
NO LIGHT FLUX
LOW LIGHT FLUX
DEFAULT LIGHT FLUX
HIGH LIGHT FLUX
FIG. 5B

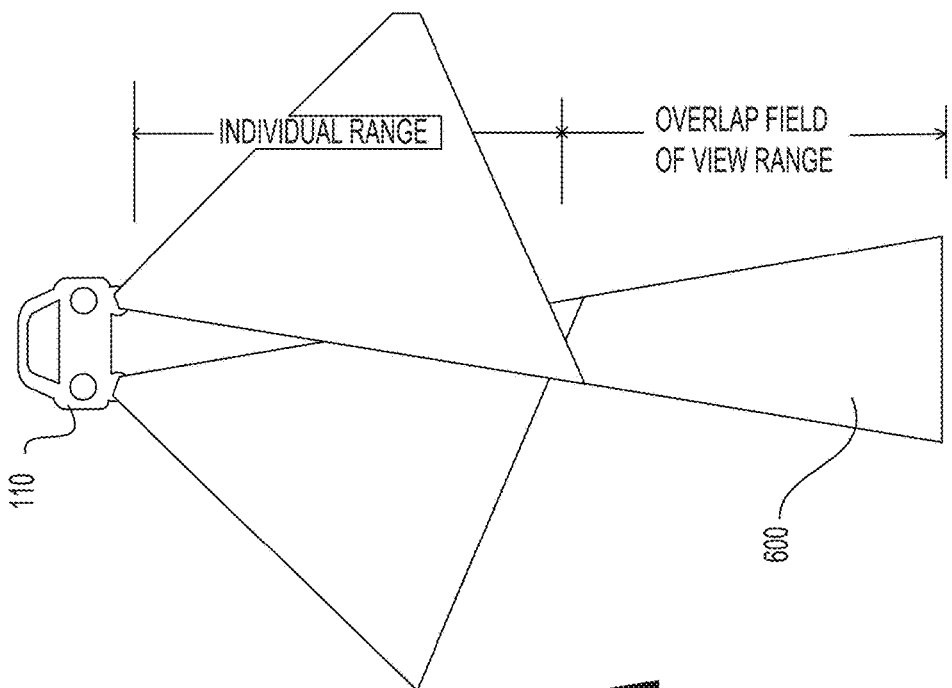
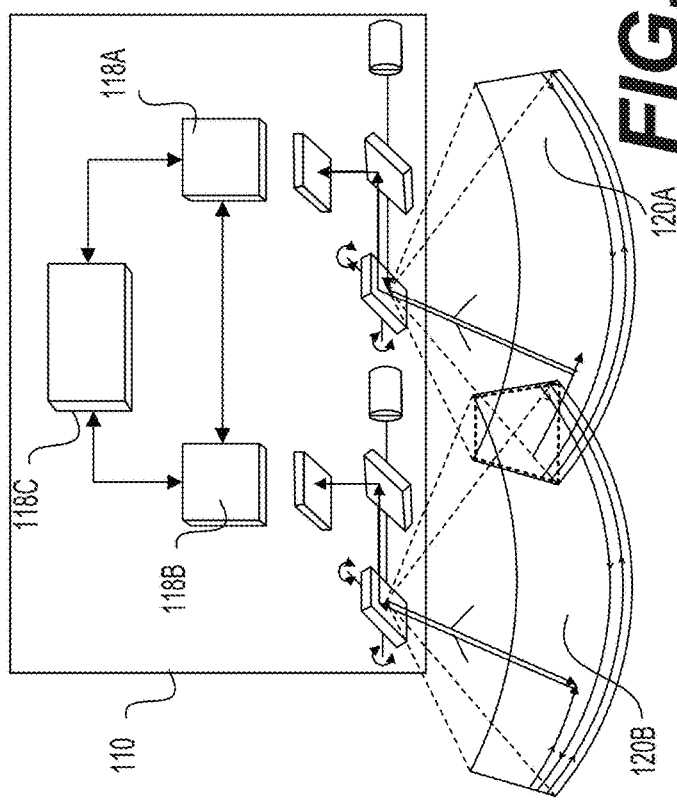
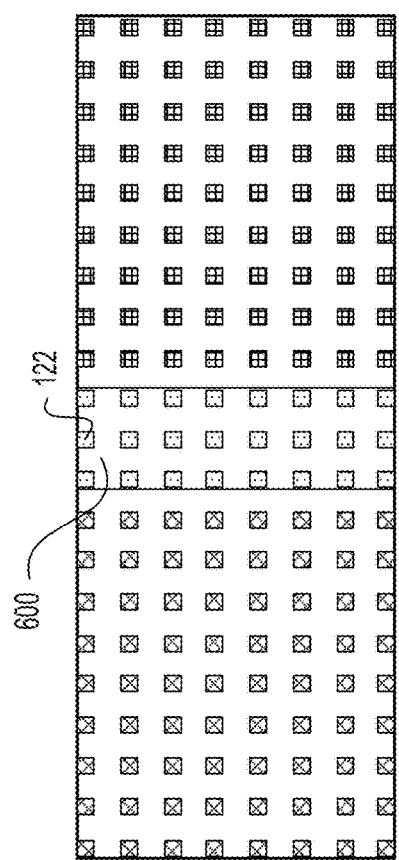
FIG. 6A
FIG. 6B
FIG. 6C

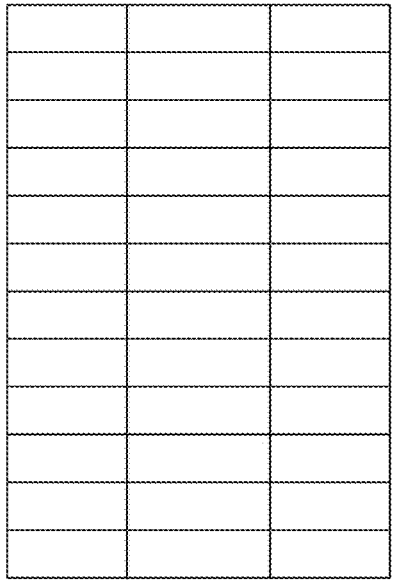
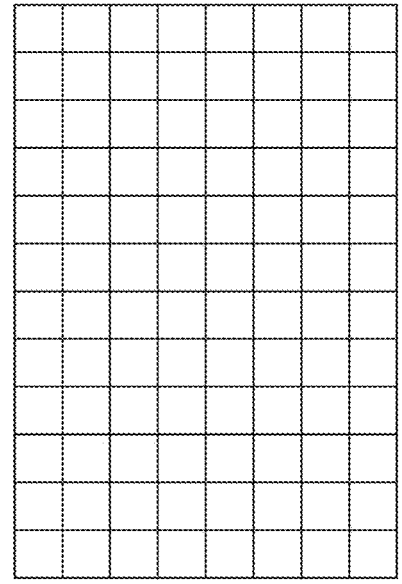
Fig. 7J
Fig. 7K
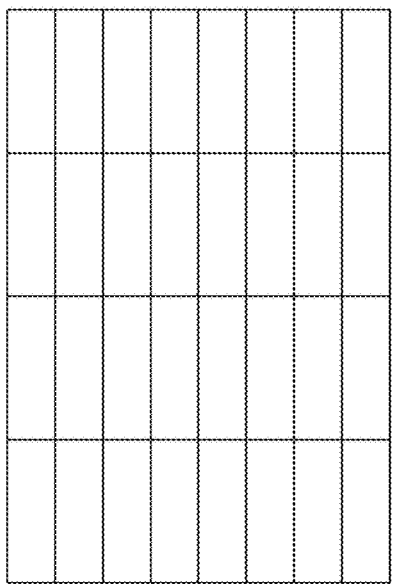
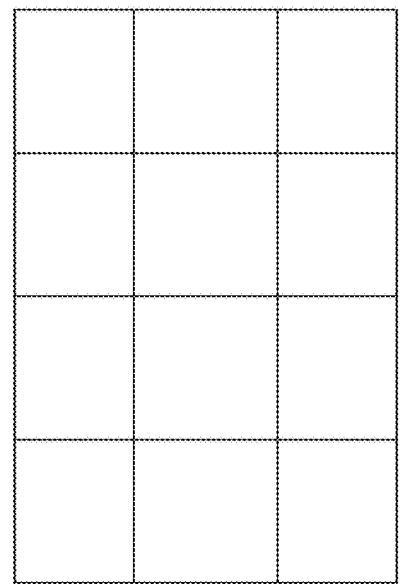

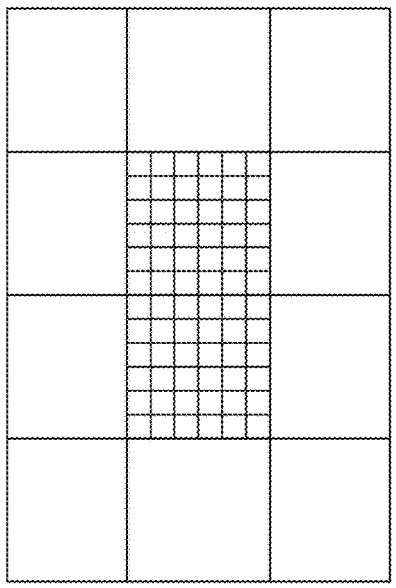
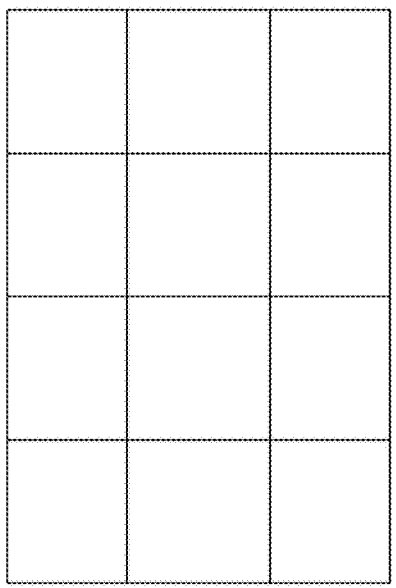
Fig. 7L
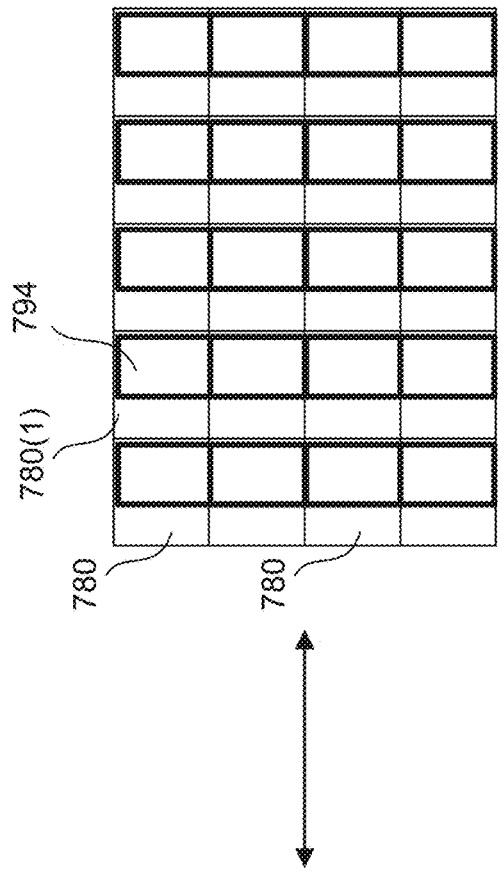
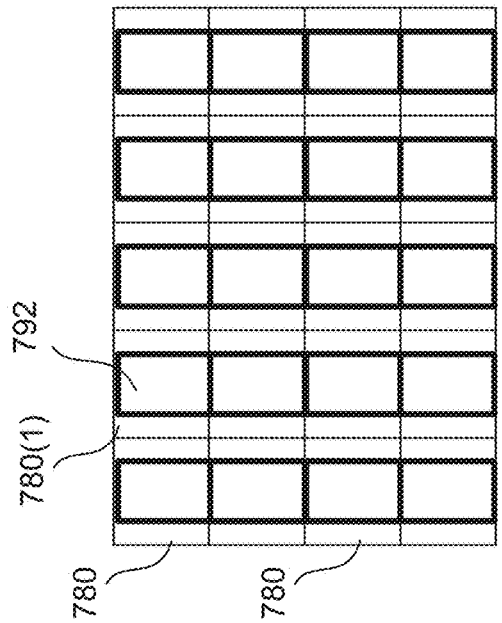
Fig. 7M

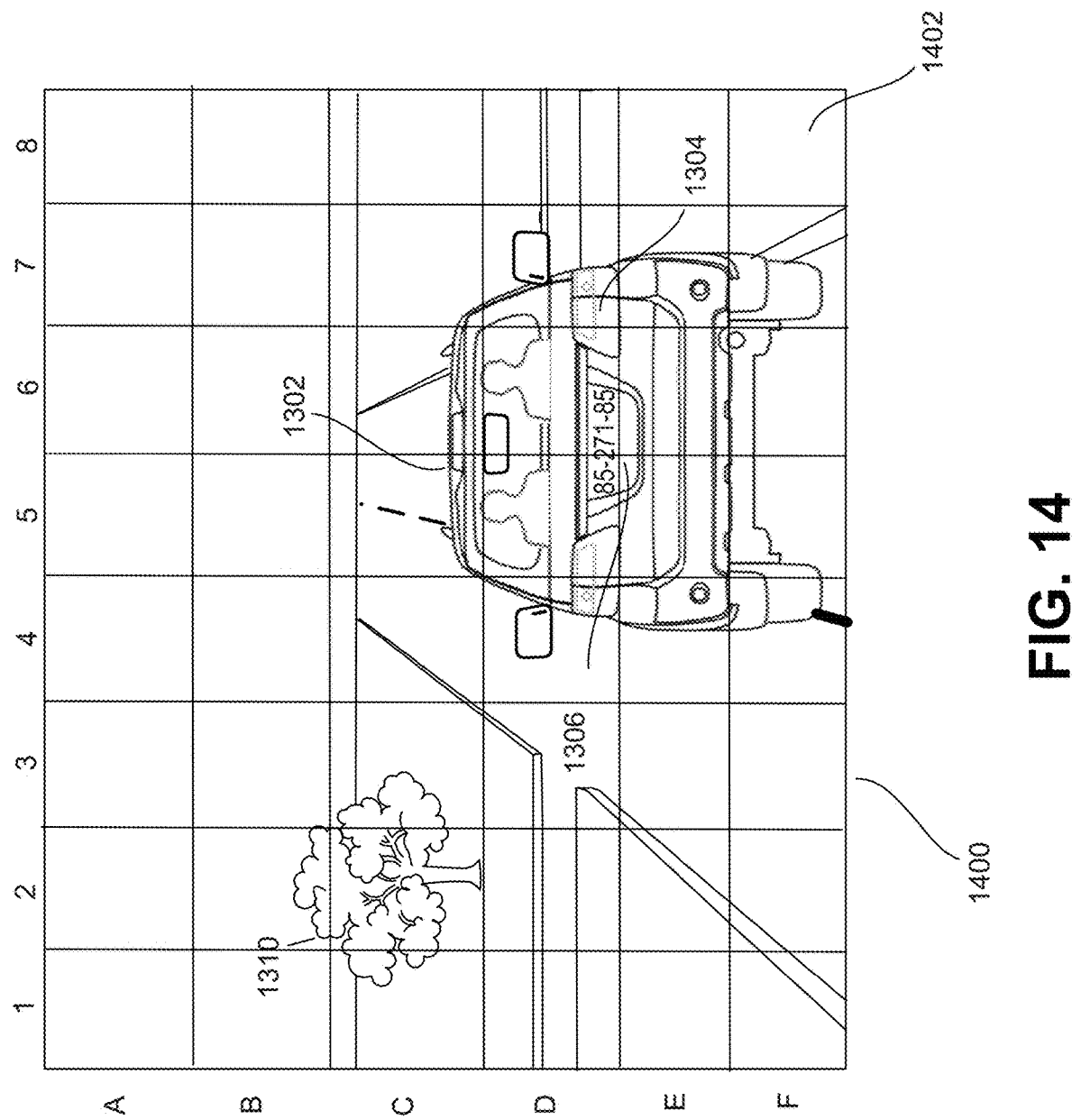

1500

1502 — Activate a light source to emit a light emission directed toward the field of view 1504 — Receive, from one or more sensors, data associated with the reflection of the light emission from one or more objects in the field of view 1506 — Activate the light source to emit a second light emission directed toward the field of view 1508 — Alter the amplification setting associated with the one or more sensors 1510 — Receive, from the one or more sensors at the altered amplification setting, data associated with the reflection of the second light emission from one or more objects in the field of view 1512 — Determine distances to objects in the field of view based on the data associated with the reflections of the light emissions

FIG. 15

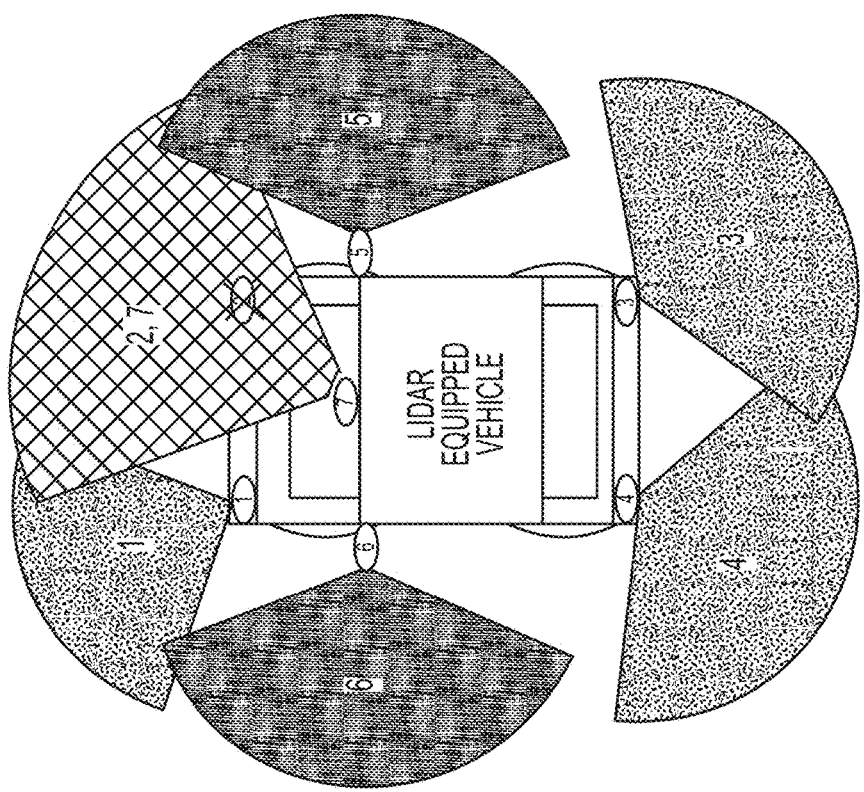
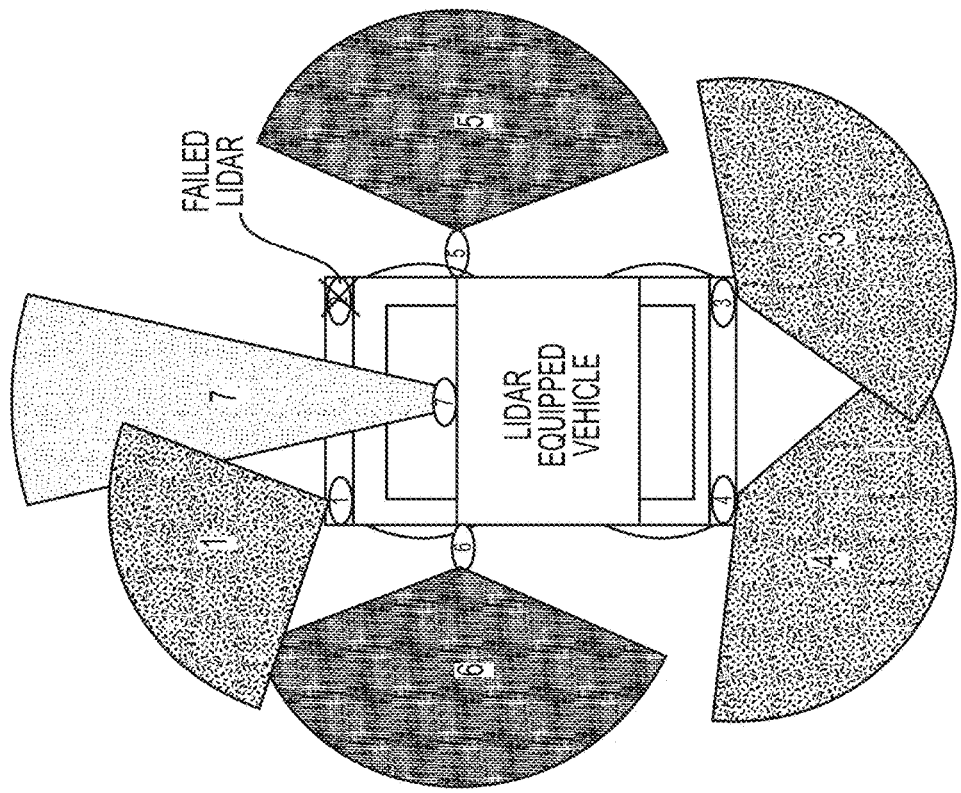
FIG. 18

VARYING DETECTION SENSITIVITY BETWEEN DETECTIONS IN LIDAR SYSTEMS

CROSS REFERENCES TO RELATED APPLICATIONS

This application is a continuation of U.S. application Ser. No. 16/411,582, filed May 14, 2019, which is a continuation of International Application No. PCT/IB2017/001569, filed Nov. 16, 2017, which claims the benefit of priority of U.S. Provisional Patent Application No. 62/422,602, filed Nov. 16, 2016; U.S. Provisional Patent Application No. 62/425,089, filed Nov. 22, 2016; U.S. Provisional Patent Application No. 62/441,574, filed Jan. 3, 2017; U.S. Provisional Patent Application No. 62/441,578, filed Jan. 3, 2017; U.S. Provisional Patent Application No. 62/441,581, filed Jan. 3, 2017; U.S. Provisional Patent Application No. 62/441,583, filed Jan. 3, 2017; U.S. Provisional Patent Application No. 62/441,606, filed Jan. 3, 2017; U.S. Provisional Patent Application No. 62/441,610, filed Jan. 3, 2017; U.S. Provisional Patent Application No. 62/441,611, filed Jan. 3, 2017; U.S. Provisional Patent Application No. 62/455,627, filed Feb. 7, 2017; U.S. Provisional Patent Application No. 62/456,691, filed Feb. 9, 2017; U.S. Provisional Patent Application No. 62/461,802, filed Feb. 22, 2017; U.S. Provisional Patent Application No. 62/516,694, filed Jun. 8, 2017; U.S. Provisional Patent Application No. 62/521,450, filed Jun. 18, 2017; U.S. Provisional Patent Application No. 62/560,985, filed Sep. 20, 2017; U.S. Provisional Patent Application No. 62/563,367, filed Sep. 26, 2017; and U.S. Provisional Patent Application No. 62/567,692, filed Oct. 3, 2017. All of the foregoing applications are incorporated herein by reference in their entirety.

BACKGROUND

I. Technical Field

The present disclosure relates generally to surveying technology for scanning a surrounding environment, and, more specifically, to systems and methods that use LIDAR technology to detect objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. As with any sensing system, in order for a LIDAR-based sensing system to be fully adopted by the automotive industry, the system should provide reliable data enabling detection of far-away objects. Currently, however, the maximum illumination power of LIDAR systems is limited by the need to make the LIDAR systems eye-safe (i.e., so that they will not damage the human eye which can occur when a projected light emission is absorbed in the eye's cornea and lens, causing thermal damage to the retina.)

The systems and methods of the present disclosure are directed towards improving performance of LIDAR systems while complying with eye safety regulations.

SUMMARY

Embodiments consistent with the present disclosure provide systems and methods for using LIDAR technology to detect objects in the surrounding environment.

Consistent with a disclosed embodiment, a LIDAR system includes at least one processor configured to: control activation of at least one light source for illuminating a field of view; receive from at least one sensor having a plurality of detection elements reflections signals indicative of light reflected from objects in the field of view; dynamically allocate a first subset of the plurality of detection elements to constitute a first pixel; dynamically allocate a second subset of the plurality of detection elements to constitute a second pixel; following processing of the first pixel and the second pixel, dynamically allocate a third subset of the plurality of detection elements to constitute a third pixel, the third subset overlapping with at least one of the first subset and the second subset, and differing from each of the first subset and the second subset; and following processing of the first pixel and the second pixel, dynamically allocate a fourth subset of the plurality of detection elements to constitute a fourth pixel, the fourth subset overlapping with at least one of the first subset, the second subset, and the third subset, and differing from each of the first subset, the second subset, and the third subset.

Consistent with a disclosed embodiment, a vehicle includes a body; and at least one processor within the body and configured to: control activation of at least one light source for illuminating a field of view in front of the body; receive from at least one sensor having a plurality of detection elements reflections signals indicative of light reflected from objects in the field of view; dynamically allocate a first subset of the plurality of detection elements to constitute a first pixel; dynamically allocate a second subset of the plurality of detection elements to constitute a second pixel; following processing of the first pixel and the second pixel, dynamically allocate a third subset of the plurality of detection elements to constitute a third pixel, the third subset overlapping with at least one of the first subset and the second subset, and differing from each of the first subset and the second subset; and following processing of the first pixel and the second pixel, dynamically allocate a fourth subset of the plurality of detection elements to constitute a fourth pixel, the fourth subset overlapping with at least one of the first subset, the second subset, and the third subset, and differing from each of the first subset, the second subset, and the third subset.

Consistent with a disclosed embodiment, a method obtains data from a sensor of a LIDAR system. The method includes controlling activation of at least one light source for illuminating a field of view; receiving from at least one sensor having a plurality of detection elements reflections signals indicative of light reflected from objects in the field of view; dynamically allocating a first subset of the plurality of detection elements to constitute a first pixel; dynamically allocating a second subset of the plurality of detection elements to constitute a second pixel; following processing of the first pixel and the second pixel, dynamically allocating a third subset of the plurality of detection elements to constitute a third pixel, the third subset overlapping with at least one of the first subset and the second subset, and differing from each of the first subset and the second subset; and following processing of the first pixel and the second pixel, dynamically allocating a fourth subset of the plurality of detection elements to constitute a fourth pixel, the fourth subset overlapping with at least one of the first subset, the second subset, and the third subset, and differing from each of the first subset, the second subset, and the third subset.

Consistent with a disclosed embodiment, a LIDAR system includes at least one processor configured to: control activation of at least one light source for illuminating a field of view (FOV) portion which is at least 10 square degrees; receive from at least one sensor having a plurality of detection elements reflections signals indicative of light reflected from objects in the FOV portion; dynamically apply a first grouping scheme for the plurality of detection elements to provide a plurality of first detection elements group comprising a first number of groups; obtain from the at least one sensor a plurality of first output signals, each of the first output signals corresponding to another first detection elements group; process the plurality of first output signals to provide a first point cloud having a first point density across the FOV portion, wherein each of the points of the first point cloud corresponds to another first detection elements group; dynamically apply a second grouping scheme for the plurality of detection elements to provide a plurality of second detection elements group comprising a second number of groups, wherein the second number is larger than the first number; obtain from the at least one sensor a plurality of second output signals, each of the second output signals corresponding to another second detection elements group; and process the plurality of second output signals to provide a second point cloud having a second point density across the FOV portion, wherein each of the points of the second point cloud corresponds to another second detection elements group; wherein the second point density is at least twice as dense as the first point density.

Consistent with a disclosed embodiment, a LIDAR system includes at least one processor configured to: control activation of at least one light source for illuminating a field of view; receive from at least one sensor a reflection signal associated with an object in the field of view, wherein a time lapse between light leaving the at least one light source and reflection impinging on the least one sensor constitutes a time of flight; and alter an amplification parameter associated with the at least one sensor during the time of flight.

Consistent with a disclosed embodiment, a LIDAR method includes controlling activation of at least one light source for illuminating a field of view; receiving from at least one sensor a reflection signal associated with an object in the field of view, wherein a time lapse between light leaving the at least one light source and reflection impinging on the least one sensor constitutes a time of flight; and altering an amplification parameter associated with the at least one sensor during the time of flight.

Consistent with a disclosed embodiment, a vehicle includes a body; at least one processor located within the body and configured to: control activation of at least one light source for illuminating a field of view ahead of the body; receive from a least one sensor a reflection signal associated with an object in the field of view, wherein a time lapse between light leaving the at least one light source and reflection impinging on the least one sensor constitutes a time of flight; and alter an amplification parameter associated with the at least one sensor during the time of flight.

Consistent with a disclosed embodiment, a LIDAR system includes at least one processor configured to: control activation of at least one light source to emit a first light emission directed toward a field of view; receive, from at least one sensor at a first amplification setting, data associated with one or more reflections of the first light emission from one or more objects in the field of view; control activation of the at least one light source to emit a second light emission directed toward the field of view; alter an amplification setting associated with the at least one sensor, to a second amplification setting, different from the first amplification setting; receive, from the at least one sensor at the second amplification setting, data associated with one or more reflections of the second light emission from one or more objects in the field of view; and determine distances to objects in the field of view based on analysis of the data associated with the one or more reflections of the first light emission and the data associated with the one or more reflections of the second light emission.

Consistent with a disclosed embodiment, a LIDAR method for determining distances to objects includes emitting a first light emission directed toward a field of view; receiving, from at least one sensor at a first amplification setting, data associated with one or more reflections of the first light emission from one or more objects in the field of view; emitting a second light emission directed toward the field of view; altering an amplification setting associated with the at least one sensor, to a second amplification setting, different from the first amplification setting; receiving, from the at least one sensor at the second amplification setting, data associated with one or more reflections of the second light emission from one or more objects in the field of view; and determining distances to objects in the field of view by analyzing the data associated with the one or more reflections of the first light emission and the data associated with the one or more reflections of the second light emission.

Consistent with a disclosed embodiment, a LIDAR system includes at least one processor configured to: access an optical budget stored in memory, the optical budget being associated with at least one light source and defining an amount of light that is emittable in a predetermined time period by the at least one light source; receive information indicative of a platform condition for the LIDAR system; based on the received information, dynamically apportion the optical budget to a field of view of the LIDAR system based on at least two of: scanning rates, scanning patterns, scanning angles, spatial light distribution, and temporal light distribution; and output signals for controlling the at least one light source in a manner enabling light flux to vary over scanning of the field of view in accordance with the dynamically apportioned optical budget. The at least one processor is further configured to: control activation of the at least one light source for illuminating a field of view; receive from at least one sensor having a plurality of detection elements reflections signals indicative of light reflected from objects in the field of view; dynamically allocate a first subset of the plurality of detection elements to constitute a first pixel; dynamically allocate a second subset of the plurality of detection elements to constitute a second pixel; following processing of the first pixel and the second pixel, dynamically allocate a third subset of the plurality of detection elements to constitute a third pixel, the third subset overlapping with at least one of the first subset and the second subset, and differing from each of the first subset and the second subset; and following processing of the first pixel and the second pixel, dynamically allocate a fourth subset of the plurality of detection elements to constitute a fourth pixel, the fourth subset overlapping with at least one of the first subset, the second subset, and the third subset, and differing from each of the first subset, the second subset, and the third subset.

Consistent with other disclosed embodiments, a method may include one or more steps of any of the processor-executed steps above and/or include any of the steps described herein.

Consistent with yet other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 5B includes three example diagrams illustrating emission scheme in a single frame-time for the whole field of view.

FIGS. 6A-6C are diagrams illustrating a first example implementation consistent with some embodiments of the present disclosure.

FIG. 7A is a diagram illustrating a grid of detection elements used for pixel allocation consistent with some embodiments of the present disclosure.

FIG. 7B-H are diagrams illustrating various examples of pixel allocation of detection elements of FIG. 7A consistent with some embodiments of the present disclosure.

FIG. 7I is a diagram illustrating different pixel allocation concepts in a scene consistent with some embodiments of the present disclosure.

FIGS. 7J-M are diagrams illustrating examples of varying a pixel allocation consistent with some embodiments of the present disclosure.

FIG. 14 illustrates possible configurations of the field of view, consistent with disclosed embodiments.

FIG. 15 is a flow chart of an exemplary process for assigning amplification parameters to different portions of the field of view, consistent with disclosed embodiments.

FIG. 18 provides a diagrammatic example of a situation that may justify apportionment of an optical budget in a non-uniform manner consistent with presently disclosed embodiments.

DETAILED DESCRIPTION

Figure 1A:
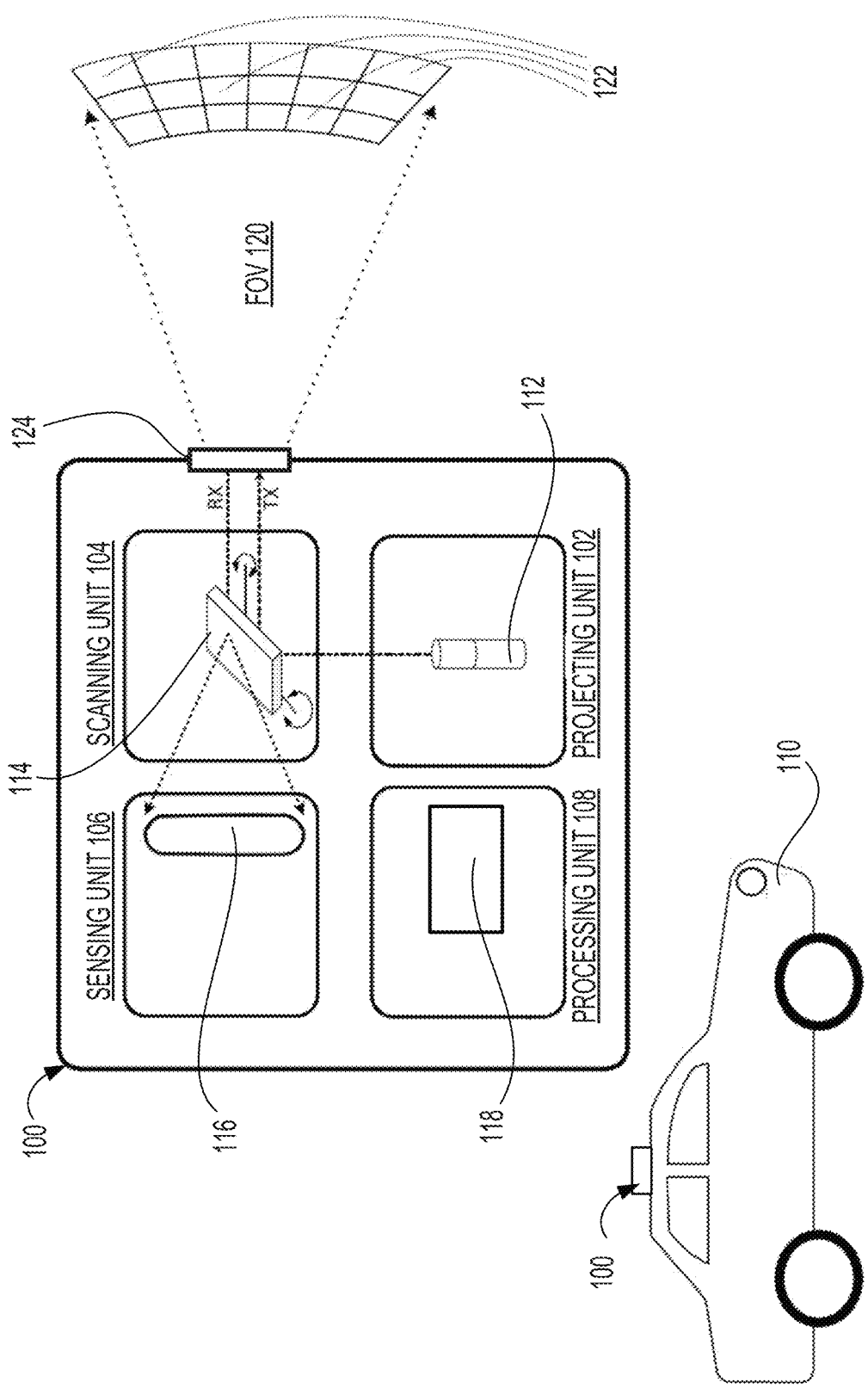
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°-20°, ±90° or 0°-90°).

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm$^3$), and whose location may be described by the point cloud model using a set of coordinates (e.g. (X,Y,Z), (r,$\phi$,$\theta$)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree a, change deflection angle by Aa, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g. along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.).

In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted, that the one or more LIDAR systems 100 do not have to provide a complete 360° field of view, and that narrower fields of view may be useful in some situations. For example, vehicle 110 may require a first LIDAR system 100 having an field of view of 75° looking ahead of the vehicle, and possibly a second LIDAR system 100 with a similar FOV looking backward (optionally with a lower detection range). It is also noted that different vertical field of view angles may also be implemented.

Figure 1B:
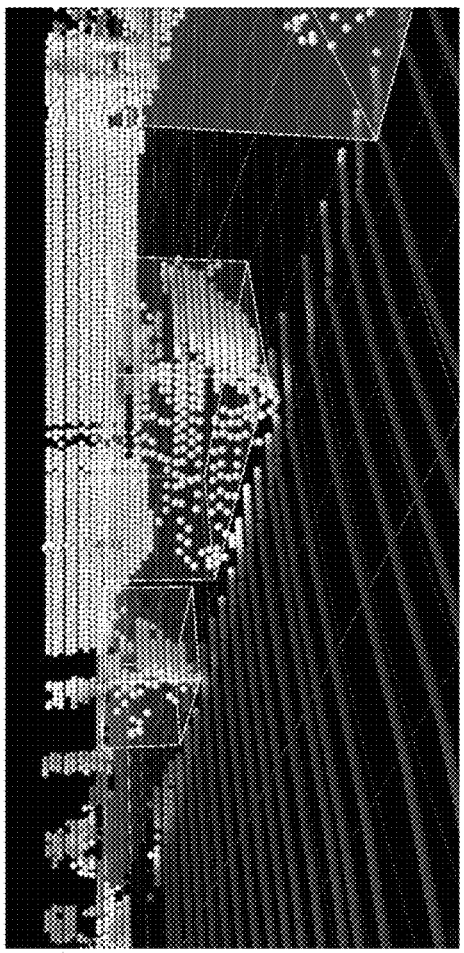
FIG. 1B is an image showing an exemplary output of single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
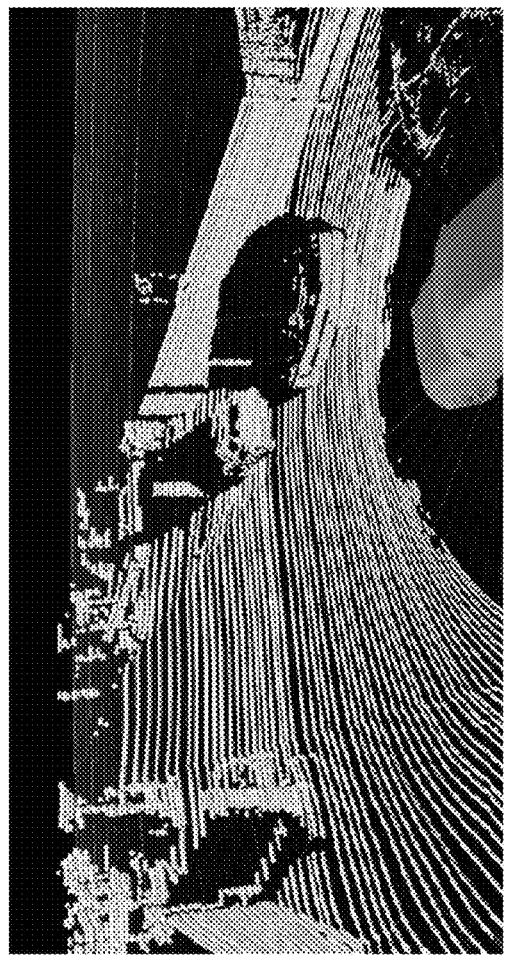
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
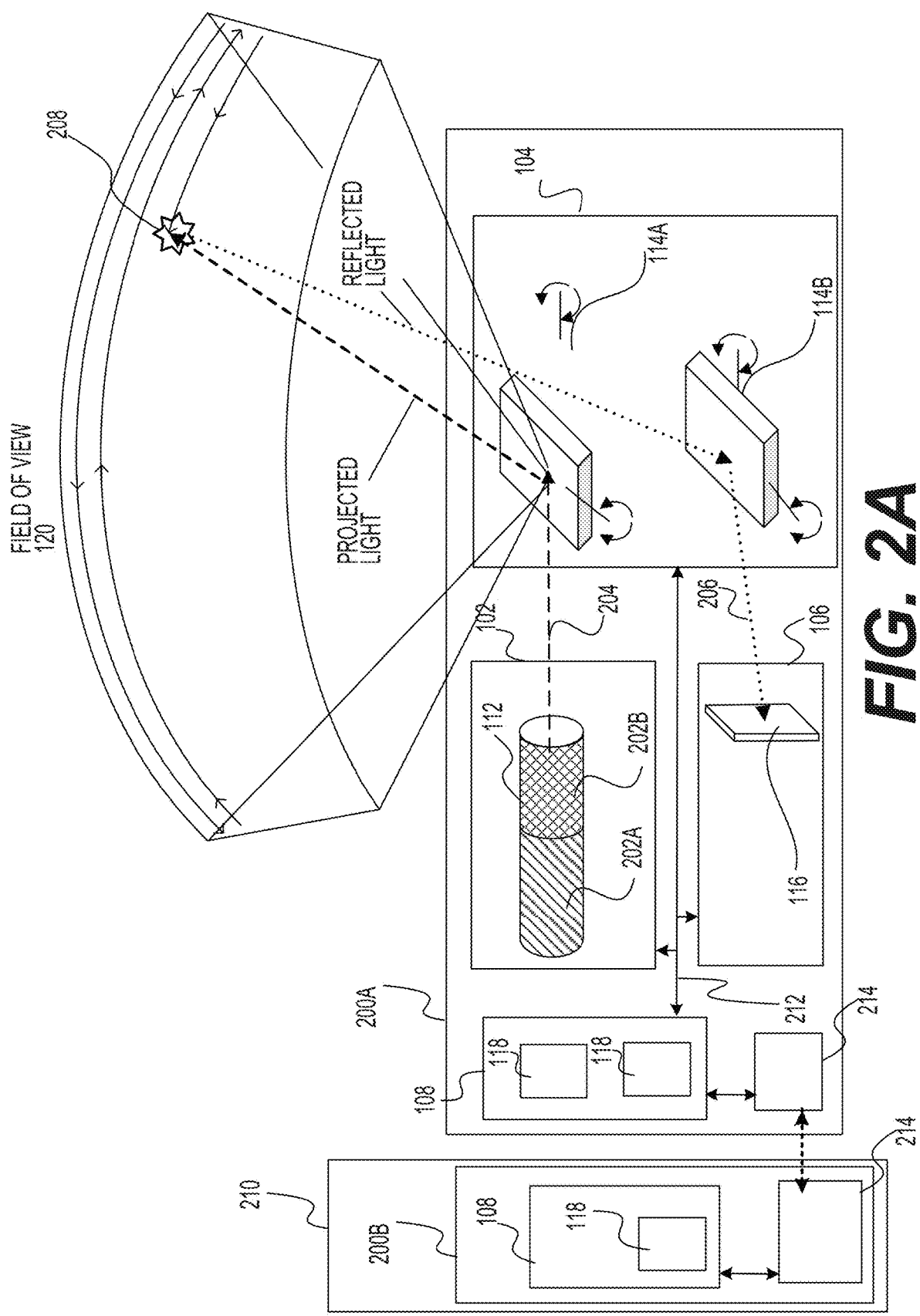
FIGS. 2A-2D are diagrams illustrating different configurations of projecting units in accordance with some embodiments of the present disclosure.
Figure 2B:
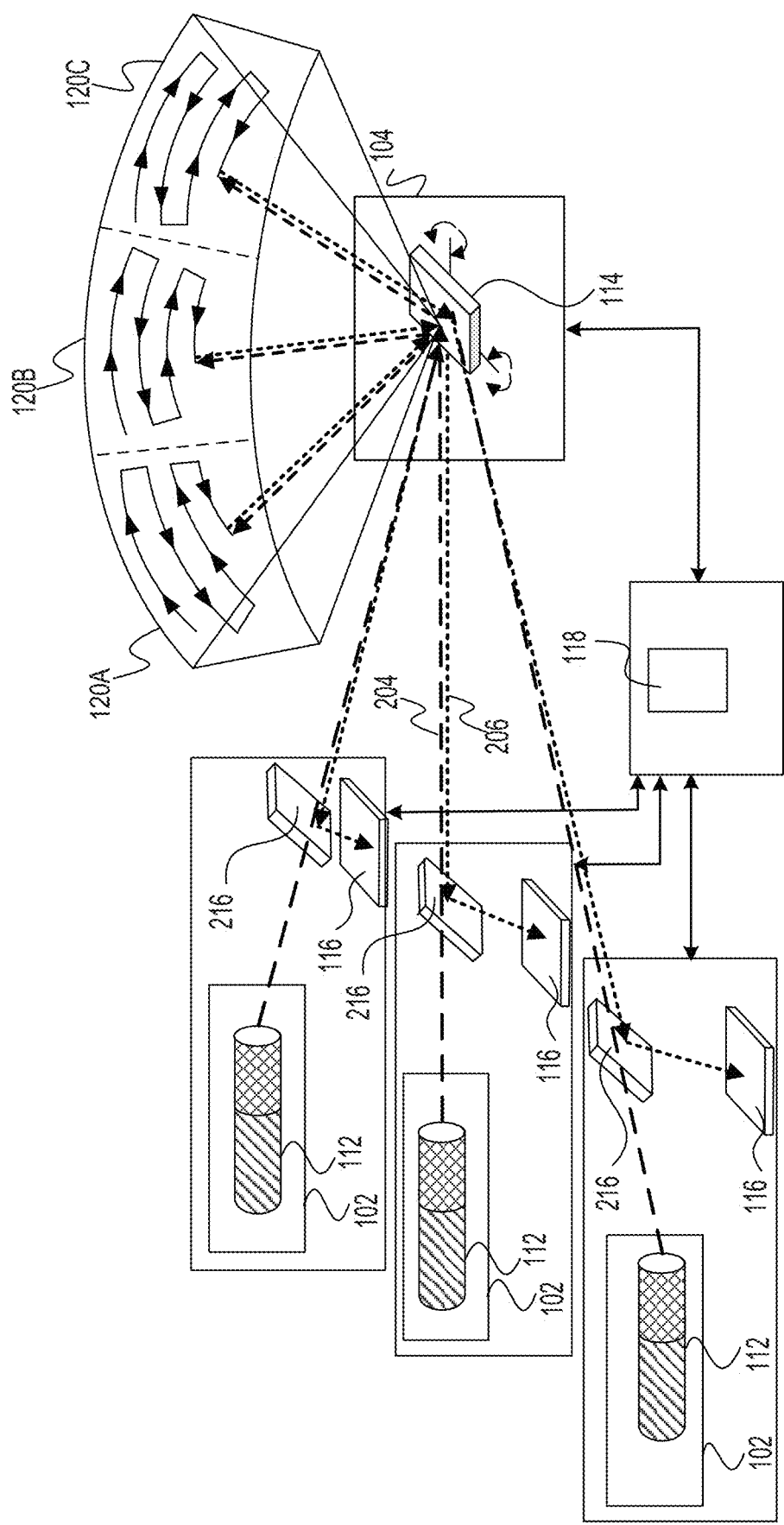
Figure 2C:
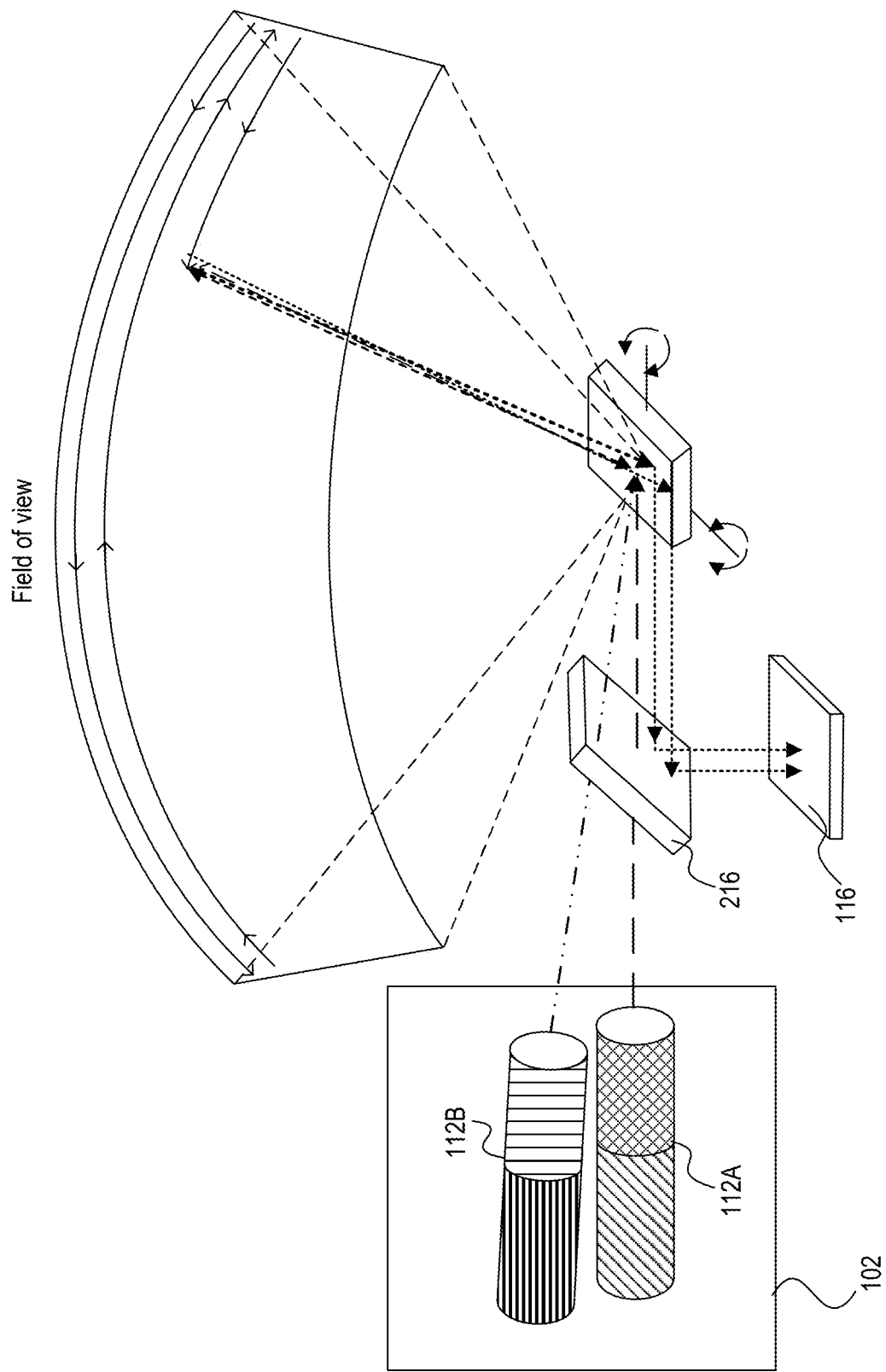
Figure 2D:
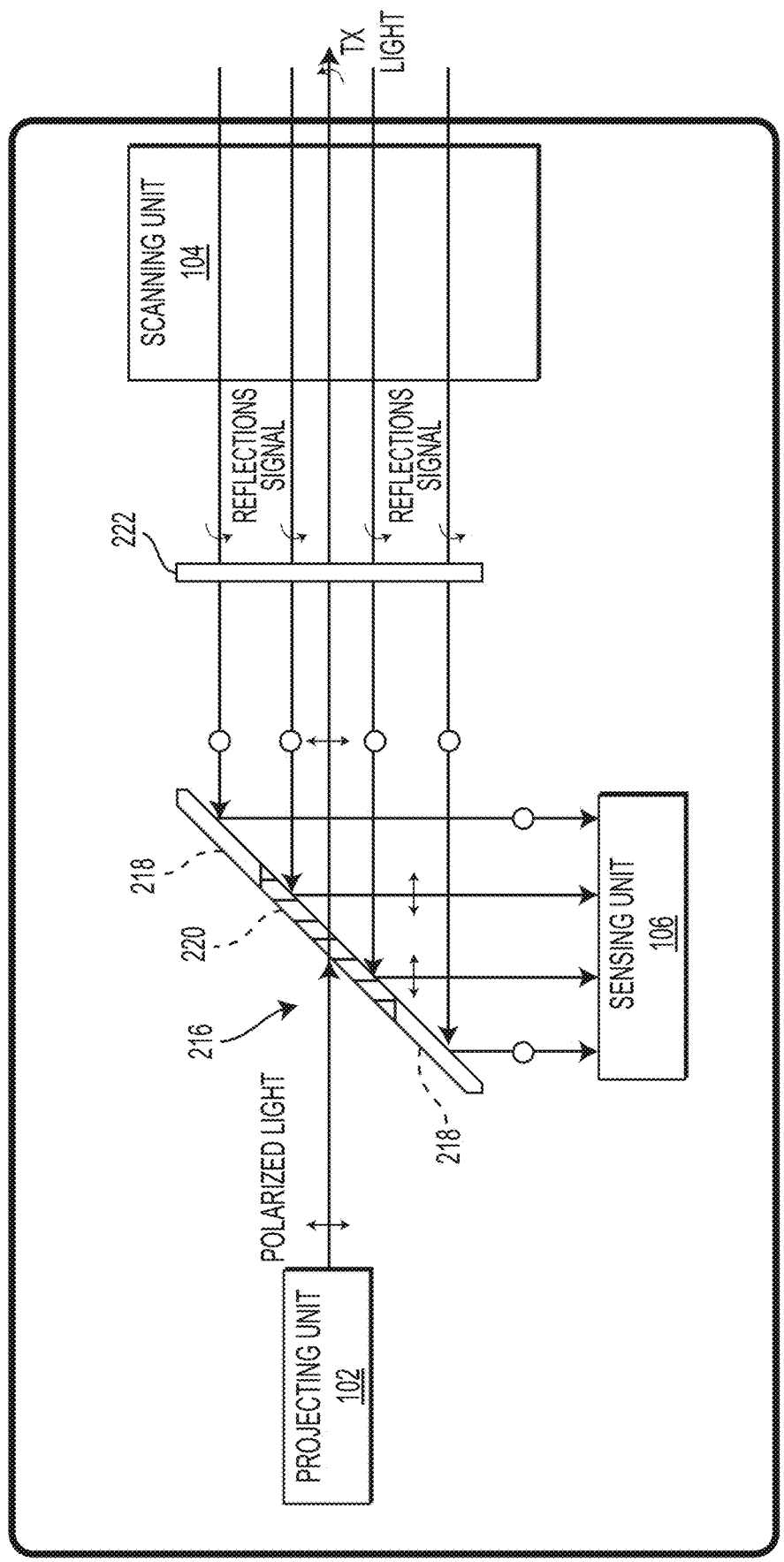

FIGS. 2A-2D depict various configurations of projecting unit 102 and its role in LIDAR system 100. Specifically, FIG. 2A is a diagram illustrating projecting unit 102 with a single light source, FIG. 2B is a diagram illustrating a plurality of projecting units 102 with a plurality of light sources aimed at a common light deflector 114, FIG. 2C is a diagram illustrating projecting unit 102 with a primary and a secondary light sources 112, and FIG. 2D is a diagram illustrating an asymmetrical deflector used in some configurations of projecting unit 102. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through different optical channels. Specifically, the outbound light radiation may pass through a first optical window (not shown) and the inbound light radiation may pass through another optical window (not shown). In the example depicted in FIG. 2A, the Bi-static configuration includes a configuration where scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In such a configuration the inbound and outbound paths differ.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" 210 refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system. This embodiment is described in greater detail below with reference to FIG. 7.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated services digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR systems configurations in which the projected light exiting from the LIDAR system and the reflected light entering the LIDAR system pass through at least a partially shared optical path. In one example, the outbound light beam and the inbound light beam may share at least one optical assembly through which both light beams. In another example, the outbound light radiation may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g. as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-waveplate/wave-retarder which changes the emitted signal from a polarized signal to a linear signal (or vice versa) so that subsequently reflected beams cannot travel through the one-directional slit.

The Scanning Unit

Figure 3A:
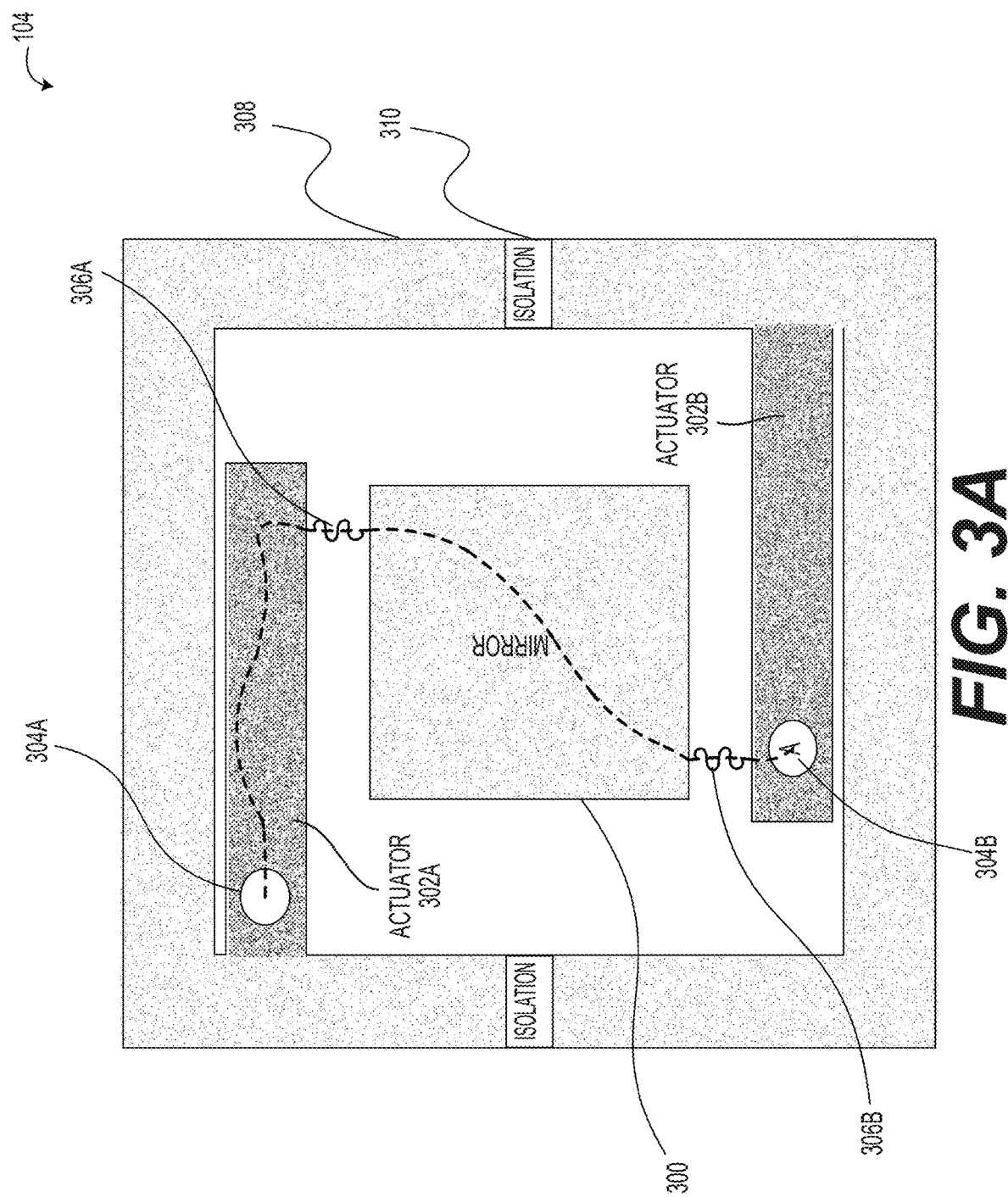
FIGS. 3A-3D are diagrams illustrating different configurations of scanning units in accordance with some embodiments of the present disclosure.
Figure 3B:
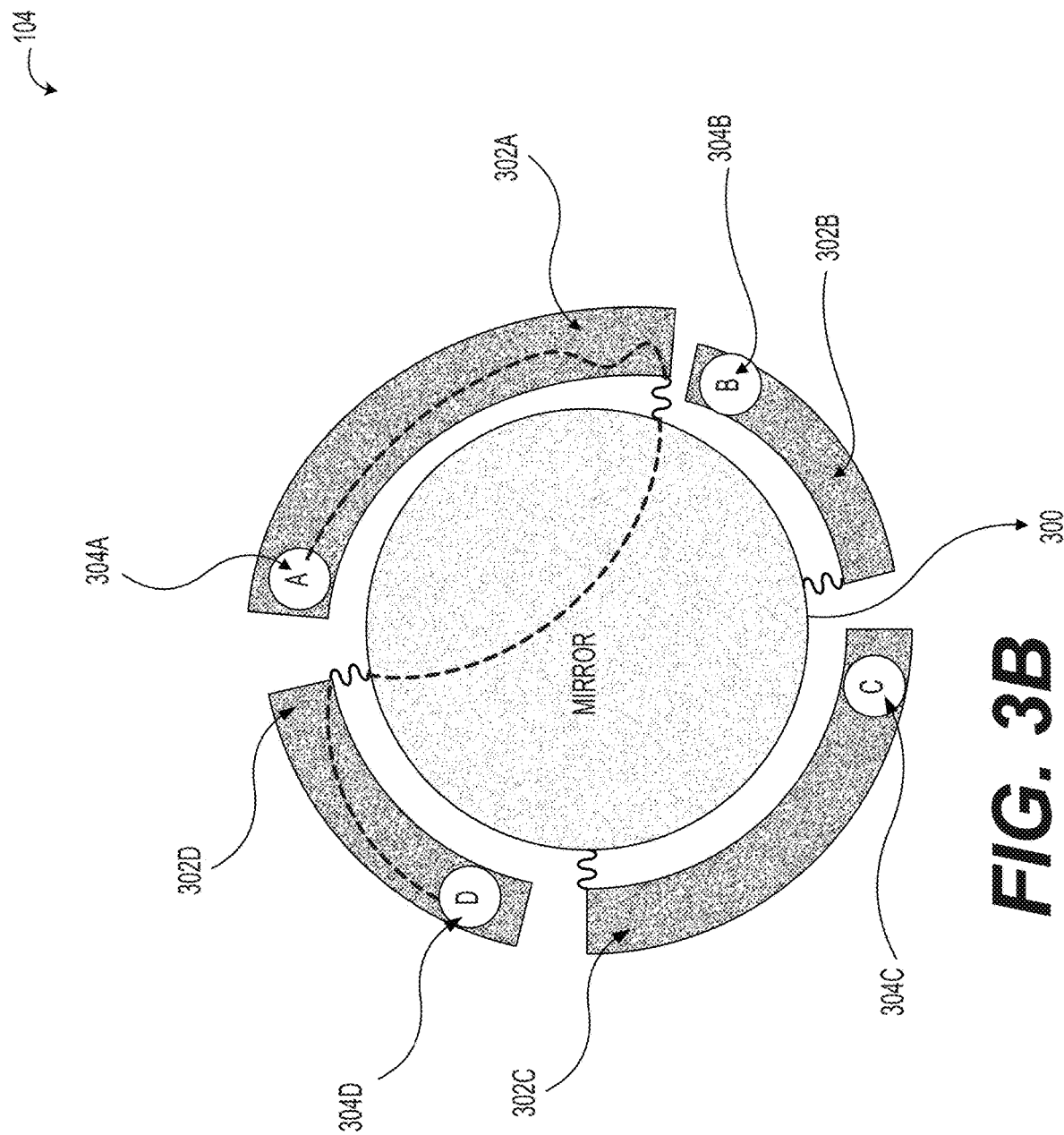
Figure 3C:
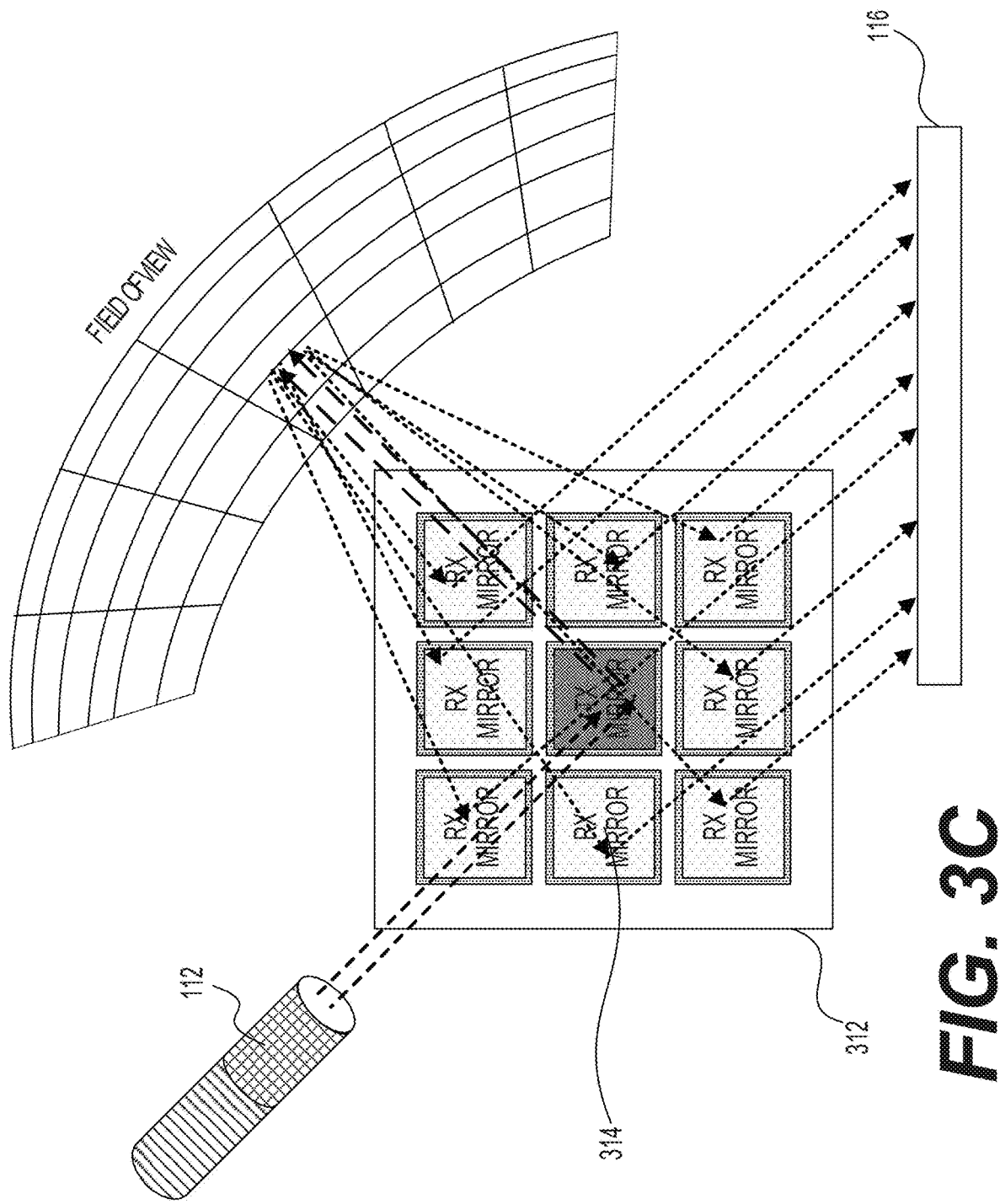
Figure 3D:
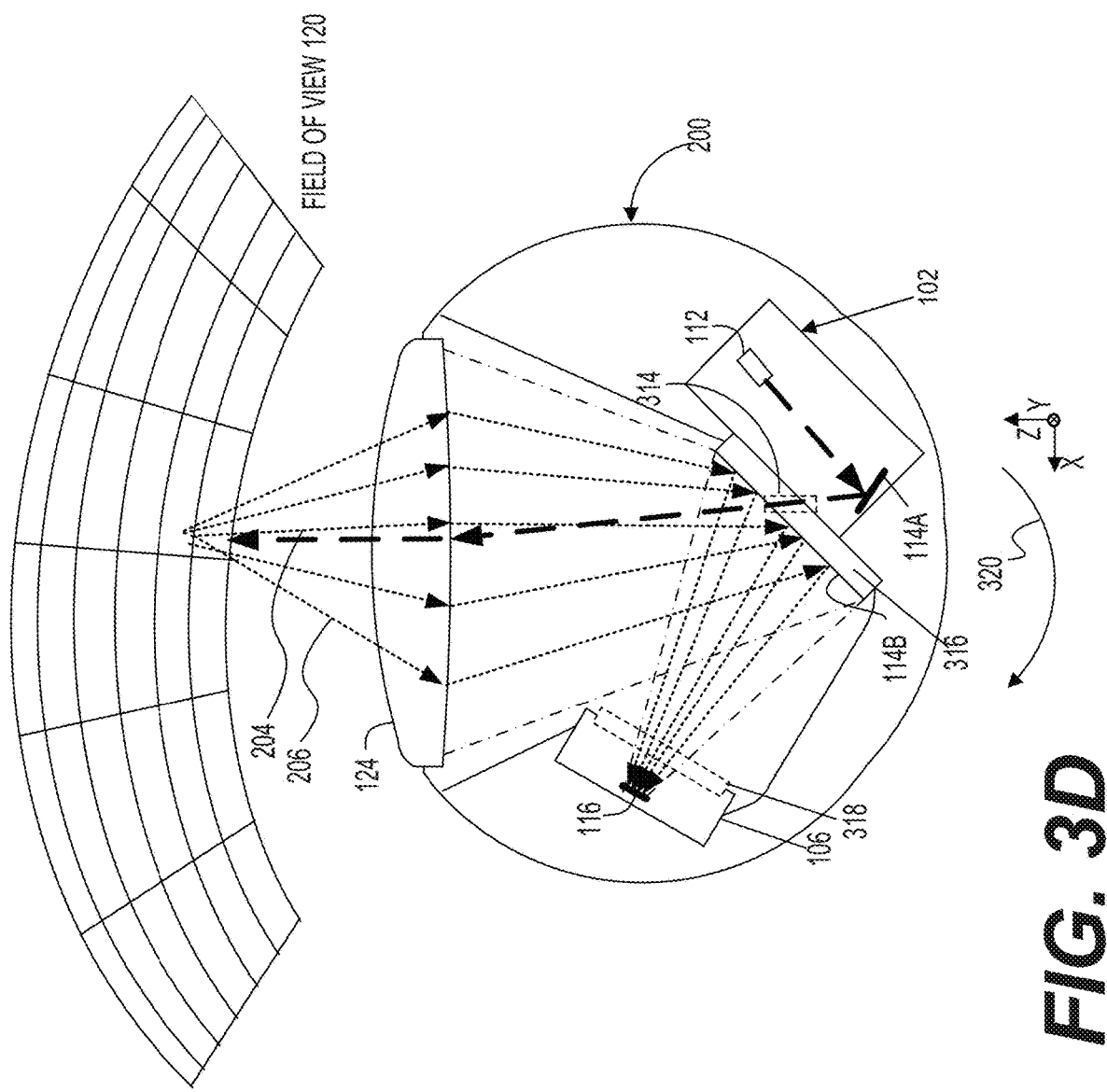

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 maybe connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm², where each reflector units 314 may have a width of about 10 m and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
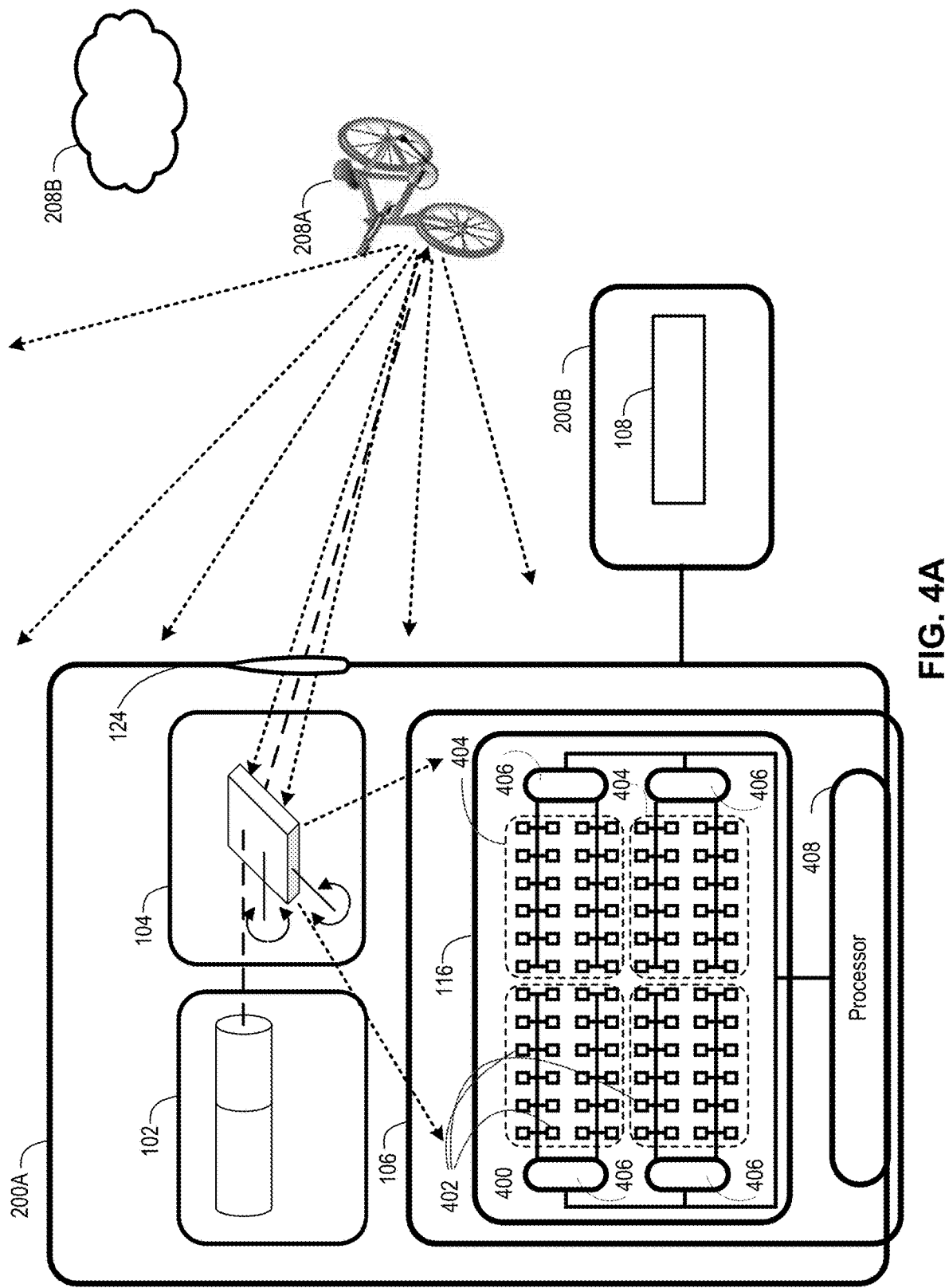
FIGS. 4A-4E are diagrams illustrating different configurations of sensing units in accordance with some embodiments of the present disclosure.
Figure 4B:
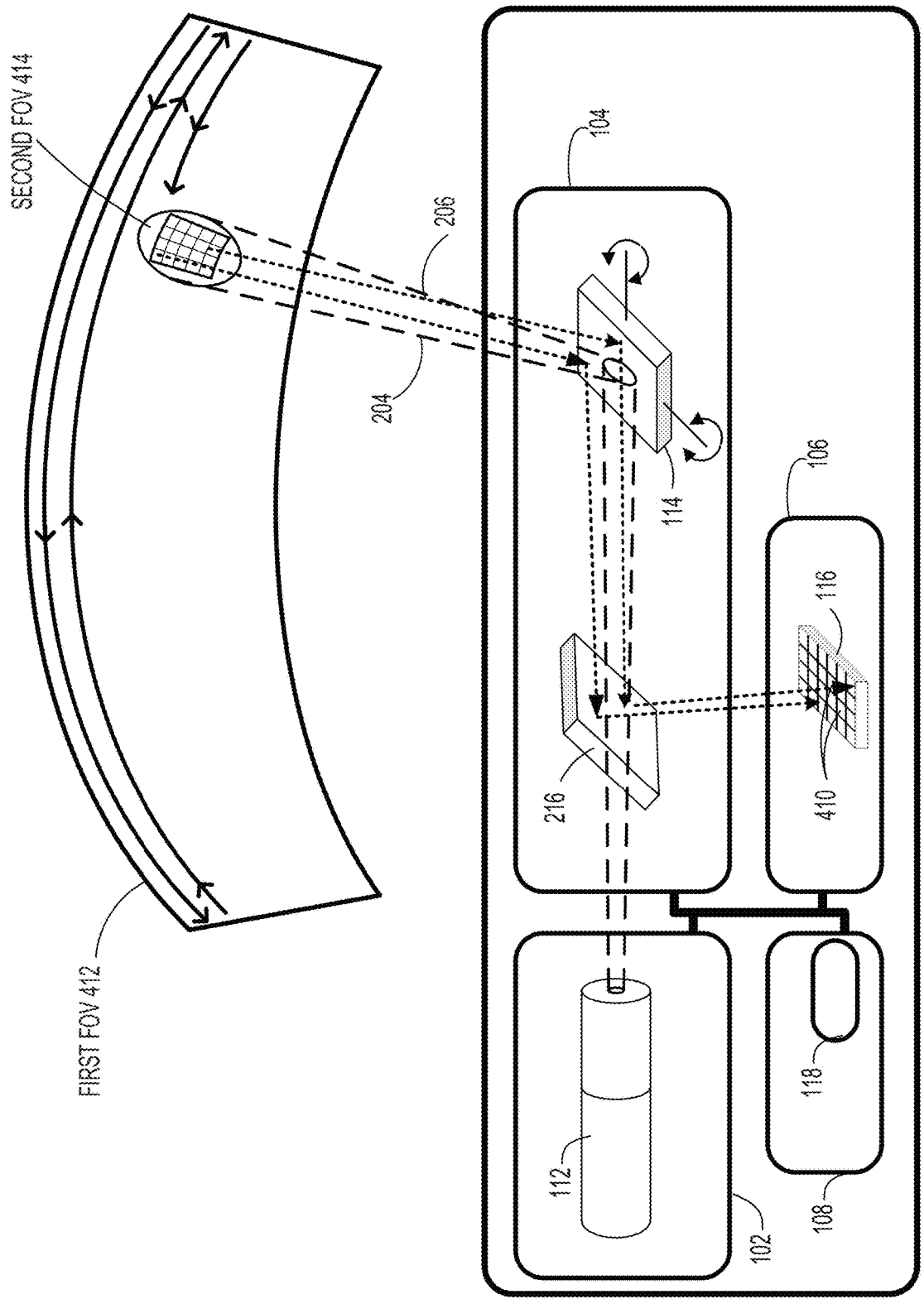
Figure 4C:
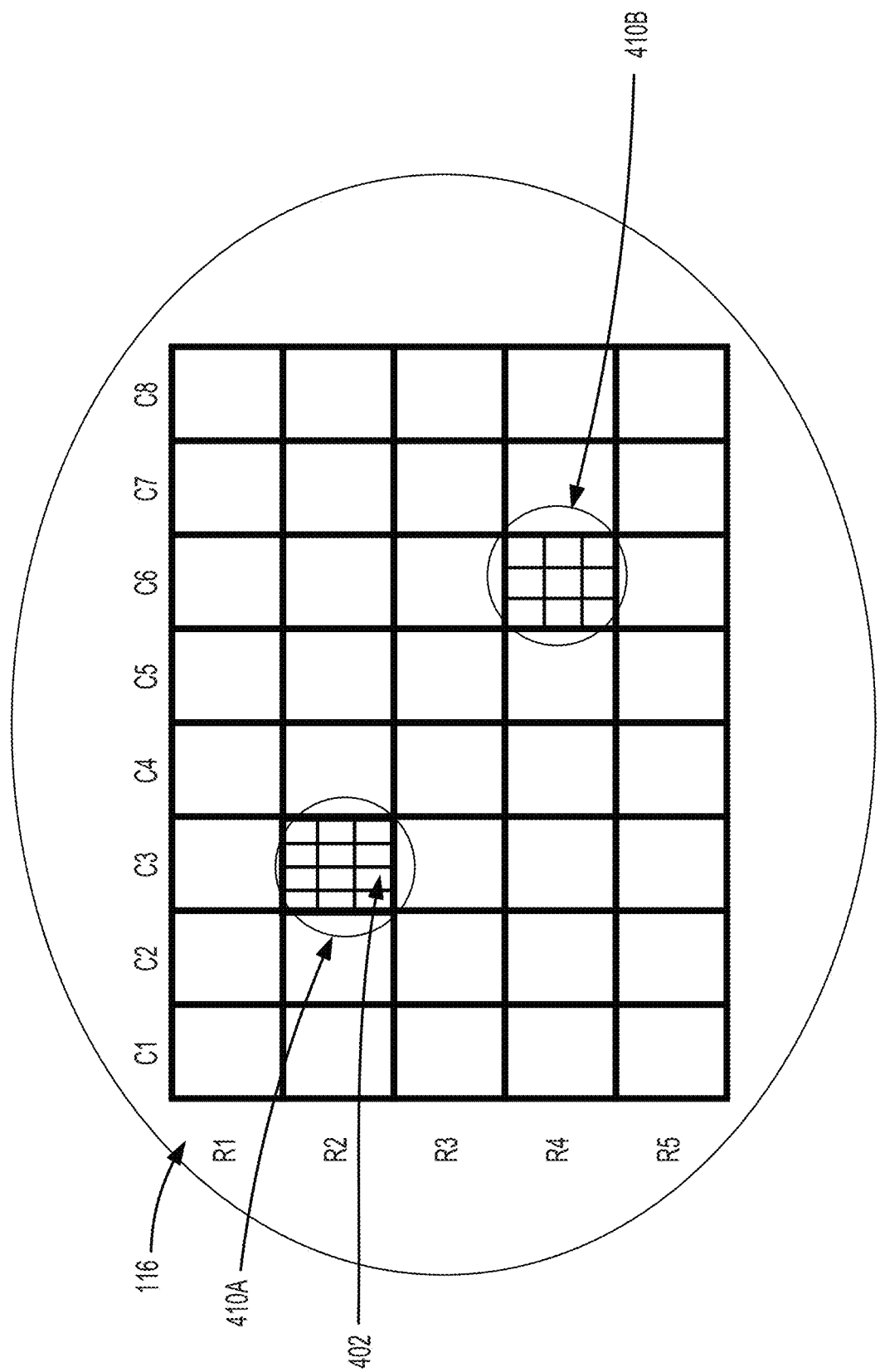
Figure 4D:
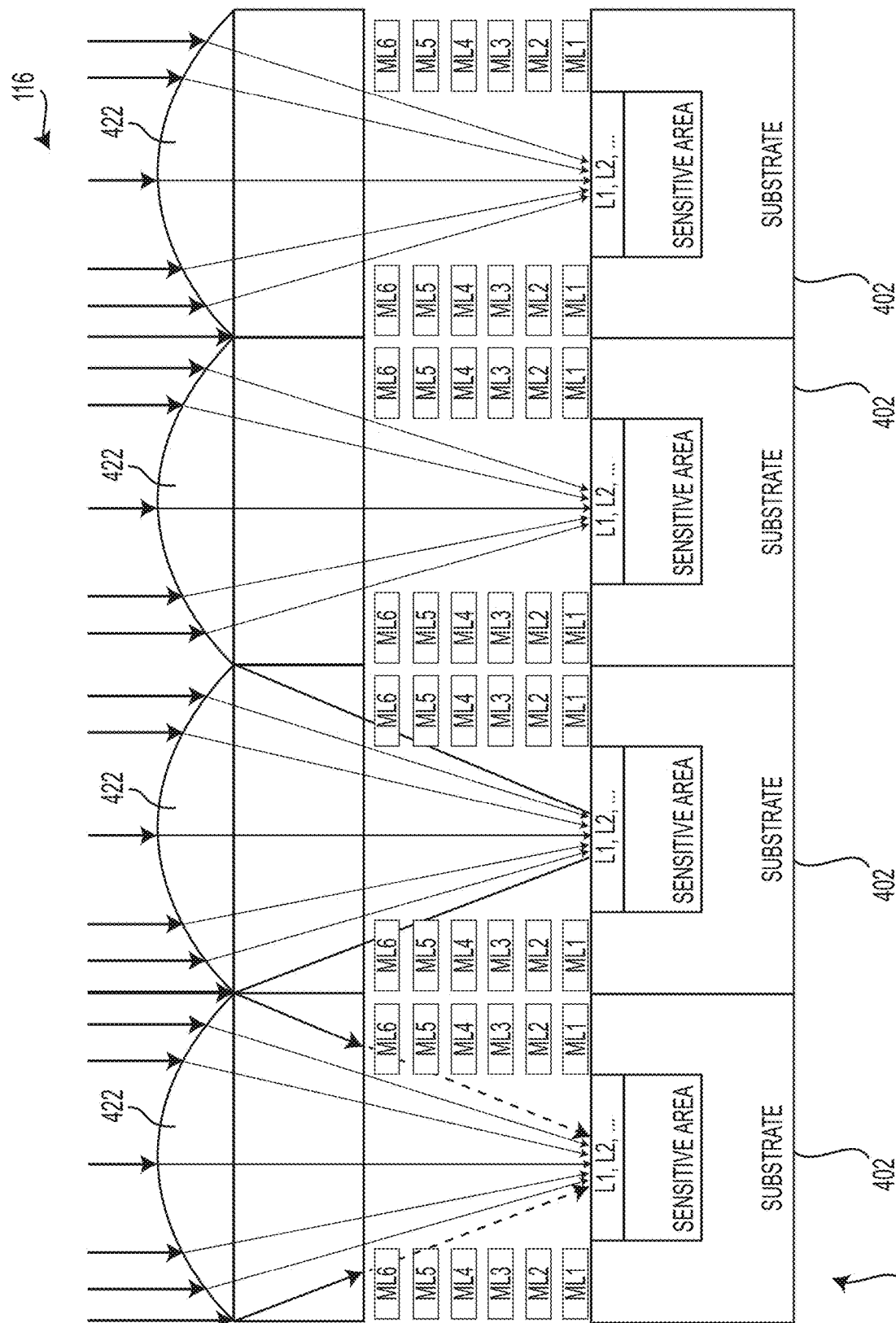

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement. Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diode (SPAD, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g. summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
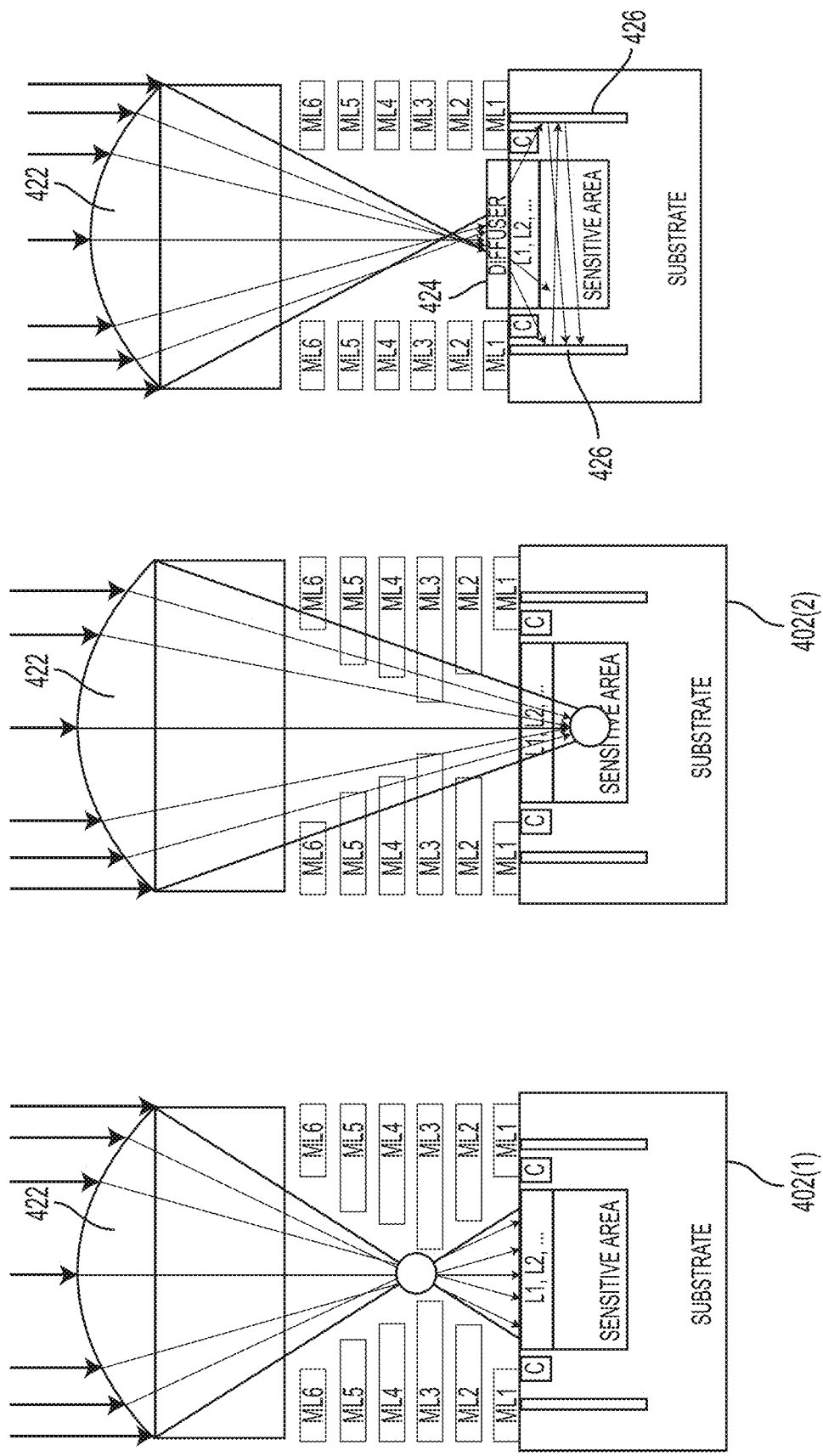

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

The Processing Unit

Figure 5A:
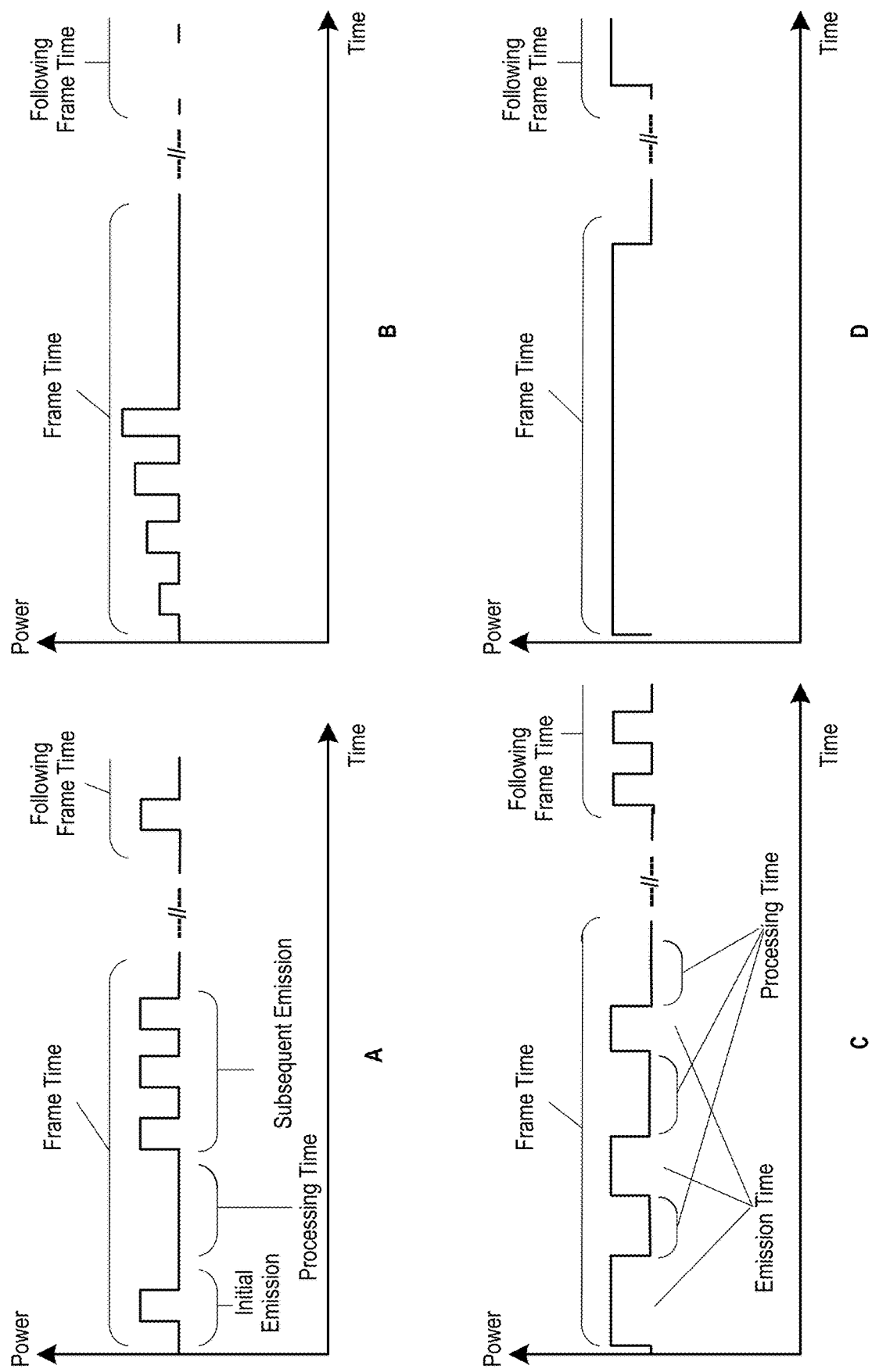
FIG. 5A includes four example diagrams illustrating emission patterns in a single frame-time for a single portion of the field of view.
Figure 5C:
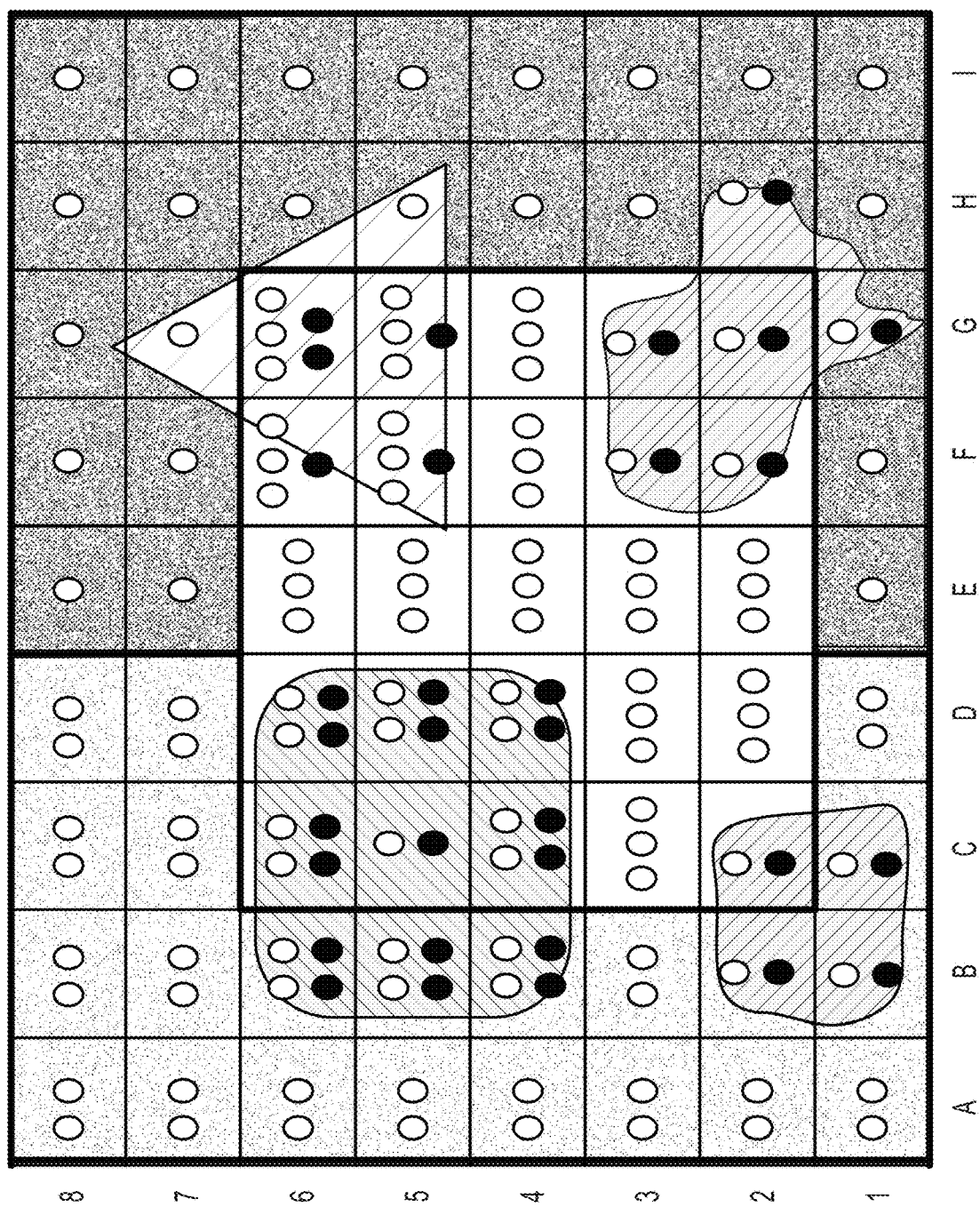
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and. FIG. 5C is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame). This embodiment is described in greater detail below with reference to FIGS. 23-25.

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following.
  a. Overall energy of the subsequent emission.
  b. Energy profile of the subsequent emission.
  c. A number of light-pulse-repetition per frame.
  d. Light modulation characteristics such as duration, rate, peak, average power, and pulse shape.
  e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. This embodiment is described in greater detail below with reference to FIGS. 11-13. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. This embodiment is described in greater detail below with reference to FIGS. 20-22. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. This embodiment is described in greater detail below with reference to FIGS. 23-25. Allocation of less than maximal amount of pulses may also be a result of other considerations. For examples, in at least some regions, detection of object at a first distance (e.g. a near field object) may result in reducing an overall amount of light emitted to this portion of field of view 120. This embodiment is described in greater detail below with reference to FIGS. 14-16. Other reasons to for determining power allocation to different portions is discussed below with respect to FIGS. 29-31, FIGS. 53-55, and FIGS. 50-52.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range and accuracy in the overlap zone and beyond it, as well as redundancy in sensitive parts of the FOV (e.g. the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
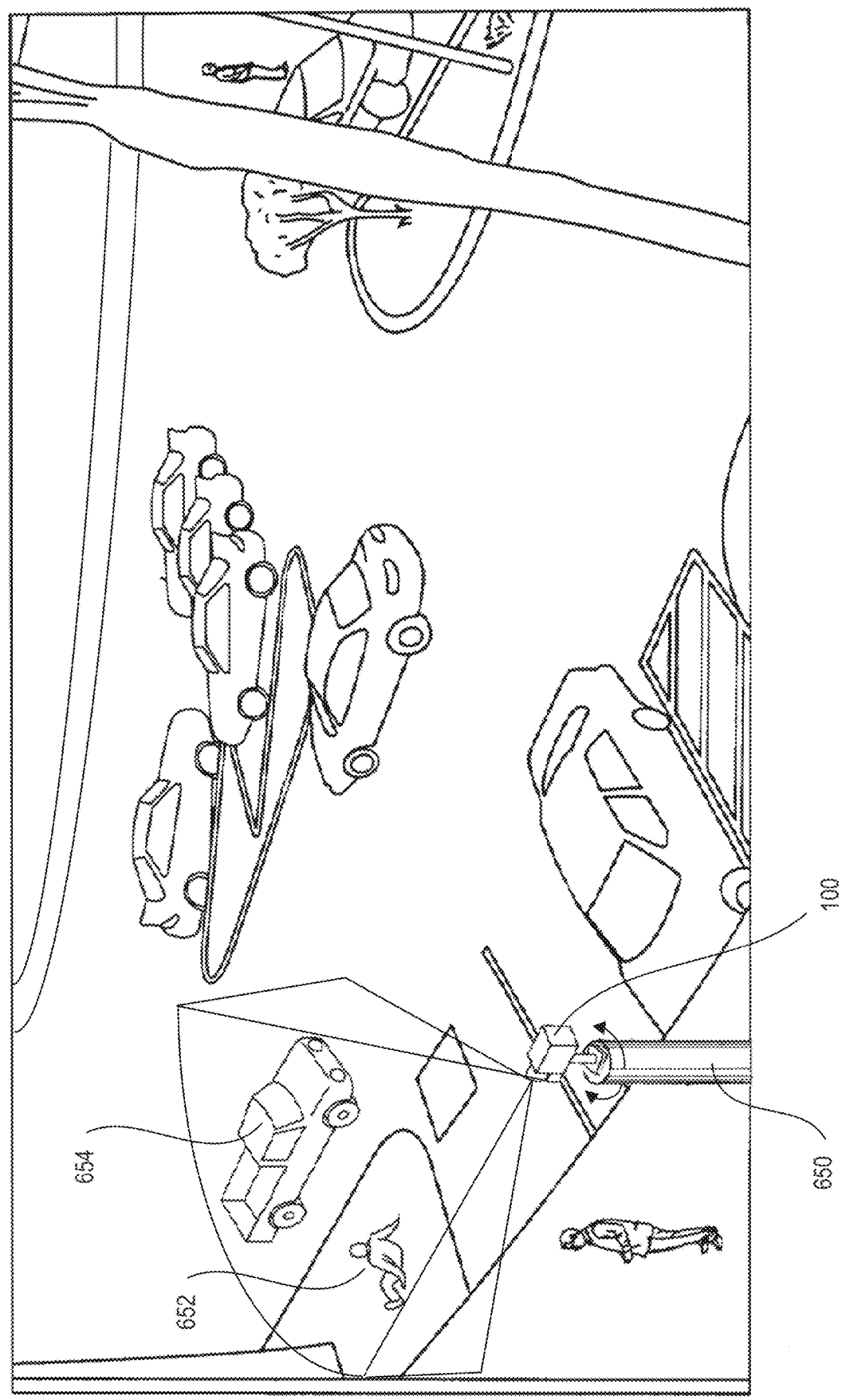
FIG. 6D is a diagram illustrating a second example implementation consistent with some embodiments of the present disclosure.
Figure 71:
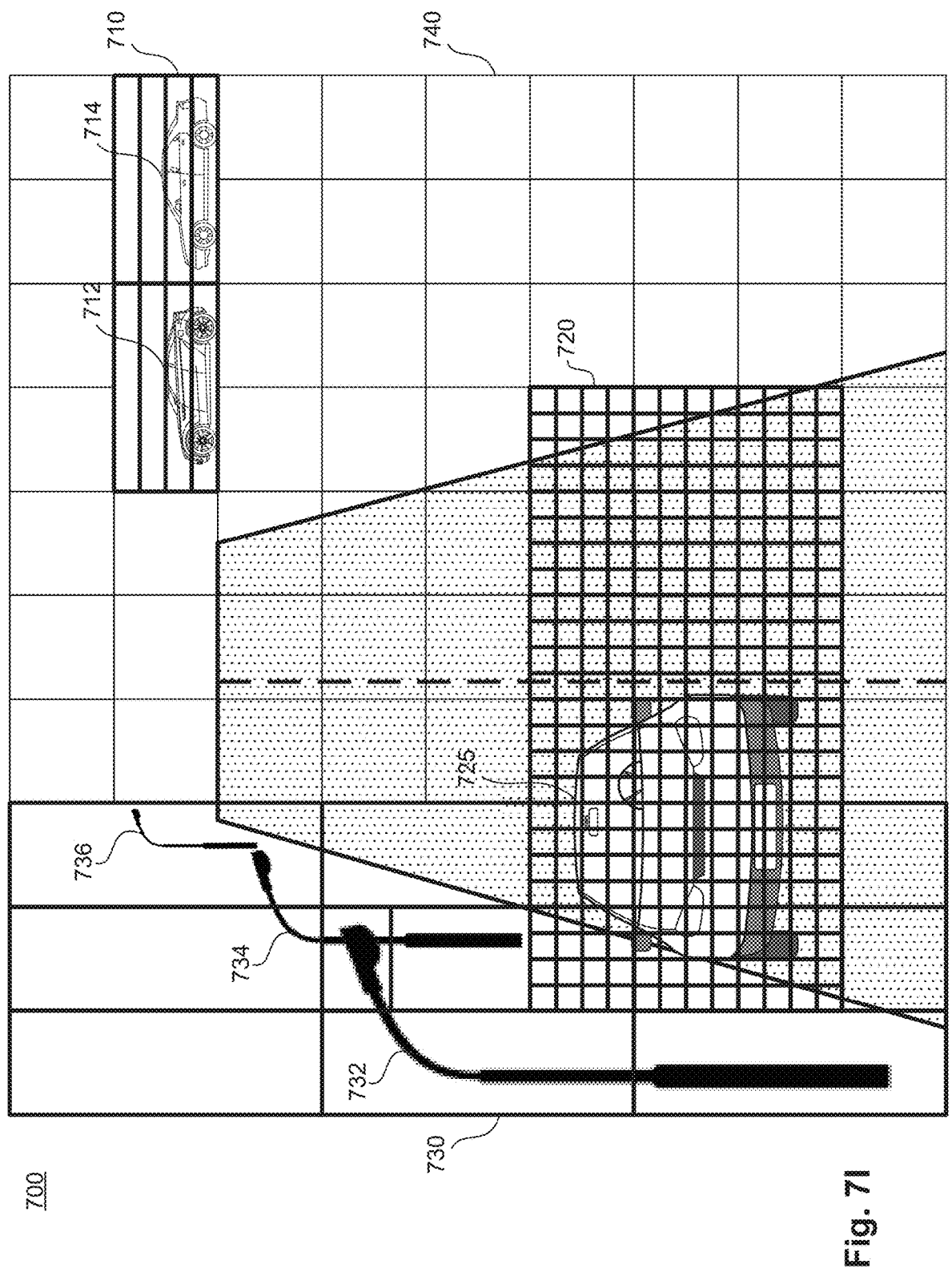

FIG. 6D illustrates the implementation of LIDAR system 100 in a surveillance system. As mentioned above, LIDAR system 100 may be fixed to a stationary object 650 that may include a motor or other mechanisms for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

Dynamically Allocating Detection Elements to Pixels in LIDAR Systems

Various operational parameters of LIDAR system 100 may be varied in order to adjust the performance characteristics of the system. In some cases, at least some of the operational parameters associated with how incident light is delivered to a FOV of LIDAR system 100 may be varied. In other cases, operational parameters associated with how light reflected from a scene is collected, sensed, and/or analyzed may be varied. For example, in some embodiments, sensor 116 may include a plurality of detection elements, such as a plurality of single photon avalanche diodes (SPADs) or any other suitable type of detection elements sensitive to light (e.g. APD or any of the detector types mentioned above).

Various pixels (e.g., one or more segments of sensor 116 from which light may be collected and analyzed) may be associated with sensor 116. In some cases, a single pixel may be associated with a single light detection element present in sensor 116. In other cases, a single pixel may be associated with a plurality of light detection elements present in sensor 116. It may even be useful in some situations for a single pixel associated with sensor 116 to include most or even all of the detection elements present in sensor 116. While not necessarily so, each pixel may output a combined output, based on a plurality of detections elements which are allocated to that pixel. While not necessarily so, a pixel may be the most basic level of information which is used by the at least one processor 118 to generate detection information (e.g. a point cloud model), and no sub-pixel information is used. Optionally, however, sub pixel information may be used for some types of processing (e.g. for calibration of the sensor parameters).

The relationship between pixels and associated detection elements need not remain fixed. Rather, in some embodiments, the assignment of detection elements to one pixel or another may be changed dynamically, e.g., at any time during operation of LIDAR system 100 or at any other suitable time. Such dynamic assignment of detection elements to pixels may be performed, for example, during a scan of a particular FOV, during a scan of a particular FOV sub-region, between scans of a FOV, or at any other suitable time. In some cases, a time lapse between light leaving the at least one light source of LIDAR system 100 (e.g. a single pulse of laser emission) and one or more reflections of that light impinging on the least one sensor constitutes a time of flight (TOF). In some cases, the at least one processor may be configured to dynamically allocate a subset of detection elements during the time of flight. Pixel allocation may even begin or may be triggered after reflected light begins impinging upon sensor 116. In some embodiments, a group of detection elements may be allocated into first and second pixels in a first scanning cycle, and that group of detection elements (or any portion thereof) may be dynamically allocated into third and fourth pixels in a subsequent scanning cycle. In other embodiments, processor 118 may dynamically allocate detection elements into first and second pixels in a current scanning cycle when the at least one light source of LIDAR system 100 illuminates a first portion of the LIDAR FOV. Processor 118 may then dynamically allocate the same or different detection elements to third and fourth pixels in the current scanning cycle when the at least one light source illuminates a second portion of the field of view Dynamically defining pixels to include one or more detection elements (e.g., SPADs) may possibly result in pixels having any number of detection elements between one and the total number of available detection elements present in sensor 116. Additionally, the detection elements included within a particular pixel may have any suitable arrangement. In some embodiments, a dynamically defined pixel may include a detection element group having a rectangular shape (i.e. having the same number of detection elements in each row, and in each column, such as an n-by-m array, where n may possibly be equal to m)). In other embodiments, a dynamically defined pixel may include a detection element group in a non-regular arrangement, such as an L-shaped grouping, a hexagonal-shaped grouping, a ring-shaped group, a noncontinuous shape, a continuous shape with one or more omitted detection elements, or any other suitable arrangement.

As discussed in more detail below, the allocation of detection elements per pixel may be based on a wide variety of factors. Just a few examples of factors that may be used in the dynamic allocation of detection elements to pixels include: sensed driving conditions (e.g., velocity, urban/rural environments, etc.); sensed objects in a particular area of a FOV; sensed features of an object; range information; GPS location information; navigation information; map information; a determined region of interest within a FOV, etc. it is noted that other factors may be used in addition and/or instead of the examples above.

Dynamic allocation of pixels relative to groups of detection elements may be performed for a variety of purposes. For example, changing the number of available pixels and the number of detection elements associated with each pixel may impact the potential resolution of LIDAR system 100 and/or the sensitivity of sensor 116 to light reflected from a scene overlapping a FOV of LIDAR system 100. In some cases, LIDAR system 100 may enable an increase in point cloud resolution by increasing the number of available pixels. Increases in the number of assigned pixels may involve a corresponding reduction in the number of detection elements allocated per pixel. For example, a maximal resolution for sensor 116 or at least a portion of sensor 116 may correspond to an allocation of one detection element per pixel. In other cases, the maximal resolution may correspond to allocation of another minimal number of detection elements per pixel, such as 100, 200 or 500 SPADs.

Additionally or alternatively, the number of detection elements associated with a particular pixel may impact the sensitivity of the pixel to reflected light. For example, a particular pixel to which N detection elements were allocated (e.g. N=2,000) may have a sensitivity to reflected light that is lower than a sensitivity offered by another pixel to which 4·N detection elements were allocated. While the system may increase sensitivity associated with sensor 116 by increasing the number of detection elements per pixel, such an allocation may reduce the overall number of available pixels. In general, there may exist a balance between sensor sensitivity and resolution. LIDAR system 100 may increase the detection elements per pixel, thereby increasing sensor sensitivity per pixel, or increase the number of pixels by decreasing the number of detection elements per pixel, which may increase sensor resolution. It is noted that other parameters of detection of the different pixels (and of the entire sensor 116) may also change with the change in detection element allocation, such as resolution, dynamic range, memory requirements, data rate, processing requirements, susceptibility to noise, and so on.

There may be many situations in which it may be desirable to allocate a plurality of detection elements to a particular pixel or otherwise increase a number of detection elements allocated to pixels in at least one part of the FOV (whether to particular pixels or as a general redistribution of the detection elements in that part of the FOV). For example, in some cases, distant and/or small objects may appear in the FOV of LIDAR system 100. While incident light from LIDAR system 100 may reflect from these objects, the amount of reflected light from these objects may be less (and sometimes significantly less) than the amount of incident light that may be reflected from larger or closer objects. As a result, while the light reflected from small and/or distant objects may reach sensor 116, if each pixel associated with sensor 116 is allocated only one or a relatively small plurality of detection element, the amount of reflected light from a small or distant object that is incident on individual pixels may have a signal-to-noise ratio (SNR) insufficient to enable LIDAR system 100 to accurately detect the small or distant objects or to resolve features associated with those objects.

One technique for increasing the likelihood of detection (e.g. by increasing the SNR), which can lead to more accurate detections of objects, may include the dynamic allocation of additional detection elements to one or more pixels associated with sensor 116. That is, the available detection elements may be allocated to fewer pixels such that the re-allocated pixels having increased numbers of detection elements may offer a higher likelihood of object detection and/or classification. The re-allocation of detection elements to pixels need not encompass the entire light sensitive area of sensor 116. Rather, in some cases, only those detection elements overlapping with a particular ROI in the FOV (e.g., where a small or distant object is located in the FOV) may be re-allocated into pixels having greater numbers of detection elements. In this way, the aggregation of outputs from an increased number of detection elements may increase the probability of an accurate detection of small and/or distant objects. While resolution of fine details of a target object may become more difficult with fewer available pixels, the technique of dynamically increasing the number of detection elements allocated to certain pixels may enable detection of objects (especially those with low reflectance characteristics) that would otherwise have gone undetected. And especially for distant objects, it may be more important to detect the presence of the object than to resolve fine features of those objects.

Similarly, there may be many situations in which it may be desirable to allocate fewer detection elements to pixels in at least one part of the FOV (whether to particular pixels or as a general redistribution of the detection elements in that part of the FOV). For example, in some situations certain objects (e.g., large objects, objects close to LIDAR system 100, or objects that otherwise exhibit significant reflectance characteristics) may cause reflection of enough of the incident light from LIDAR system 100 to provide suitable probability of detection by sensor 116 (e.g. sufficient SNR). In such cases, dynamic pixel allocation may include pixel allocations that result in the reduction of the number of detection elements per pixel for one or more pixels associated with sensor 116. While such, reallocation may result in a reduction in SNR, the tradeoff may be an increase in system resolution relative to one or more regions of the FOV. As a result, finer details associated with certain objects may be resolved more easily.

In an example, LIDAR system 100 may allocate many detection elements for pixels associated with sensor 116 that overlap regions of the FOV including potential target objects at long range (e.g., 50 m, 100 m, 200 m or more). Such an allocation may increase a likelihood that a long-distance object is accurately detected. On the other hand, LIDAR system 100 may allocate fewer detection elements for pixels associated with sensor 116 that overlap regions of the FOV that include potential target objects at shorter ranges. This type of allocation may enable not only accurate detection of close-in objects, but also resolution of fine details, such as the accurate detection of the object's envelope (e.g., outer edges of a vehicle; location and shape of a sideview mirror of a target vehicle; a facing direction of a pedestrian; etc.). Such fine details may be especially important when the target objects are located close to, e.g., a host vehicle on which LIDAR system 100 resides, as near-term navigational decisions may depend on those details.

As will be described in more detail below, the various detection elements of sensor 116 may be allocated evenly across pixels (e.g., all pixels associated with sensor 116 may include the same or substantially the same number of detection elements) or may be allocated such that different pixels are associated with different numbers of detection elements (e.g., some pixels may offer higher sensitivity and lower resolution capabilities, while other pixels may offer higher resolution capabilities, but lower light sensitivity values). And the pixels associated with sensor 116 may be defined to have different shapes and sizes relative to one another. Further, the allocation of detection elements to pixels may be performed at any time during the operation of LIDAR system 100.

For example, in a LIDAR system consistent with embodiments of the present disclosure, a processor may control activation of at least one light source for illuminating a field of view, receive from at least one sensor having a plurality of detection elements reflections signals indicative of light reflected from objects in the field of view, dynamically allocate a first subset of the plurality of detection elements to constitute a first pixel, dynamically allocate a second subset of the plurality of detection elements to constitute a second pixel. Following processing of the first pixel and the second pixel, the processor may dynamically allocate a third subset of the plurality of detection elements to constitute a third pixel, the third subset overlapping with at least one of the first subset and the second subset, and differing from each of the first subset and the second subset, and following processing of the first pixel and the second pixel, dynamically allocate a fourth subset of the plurality of detection elements to constitute a fourth pixel, the fourth subset overlapping with at least one of the first subset, the second subset, and the third subset, and differing from each of the first subset, the second subset, and the third subset.

In this manner, LIDAR system 100 may selectively increase the point cloud resolution by increasing the number of pixels and, in turn, decreasing a number of detection elements per pixel. Alternatively, LIDAR system 100 may selectively increase sensitivity of the sensor by increasing the number of detection elements per pixel which, in turn, may result in a smaller number of pixels.

Figures 7A, 7B, 7C, 7D, 7E, 7F, 7G, 7H:
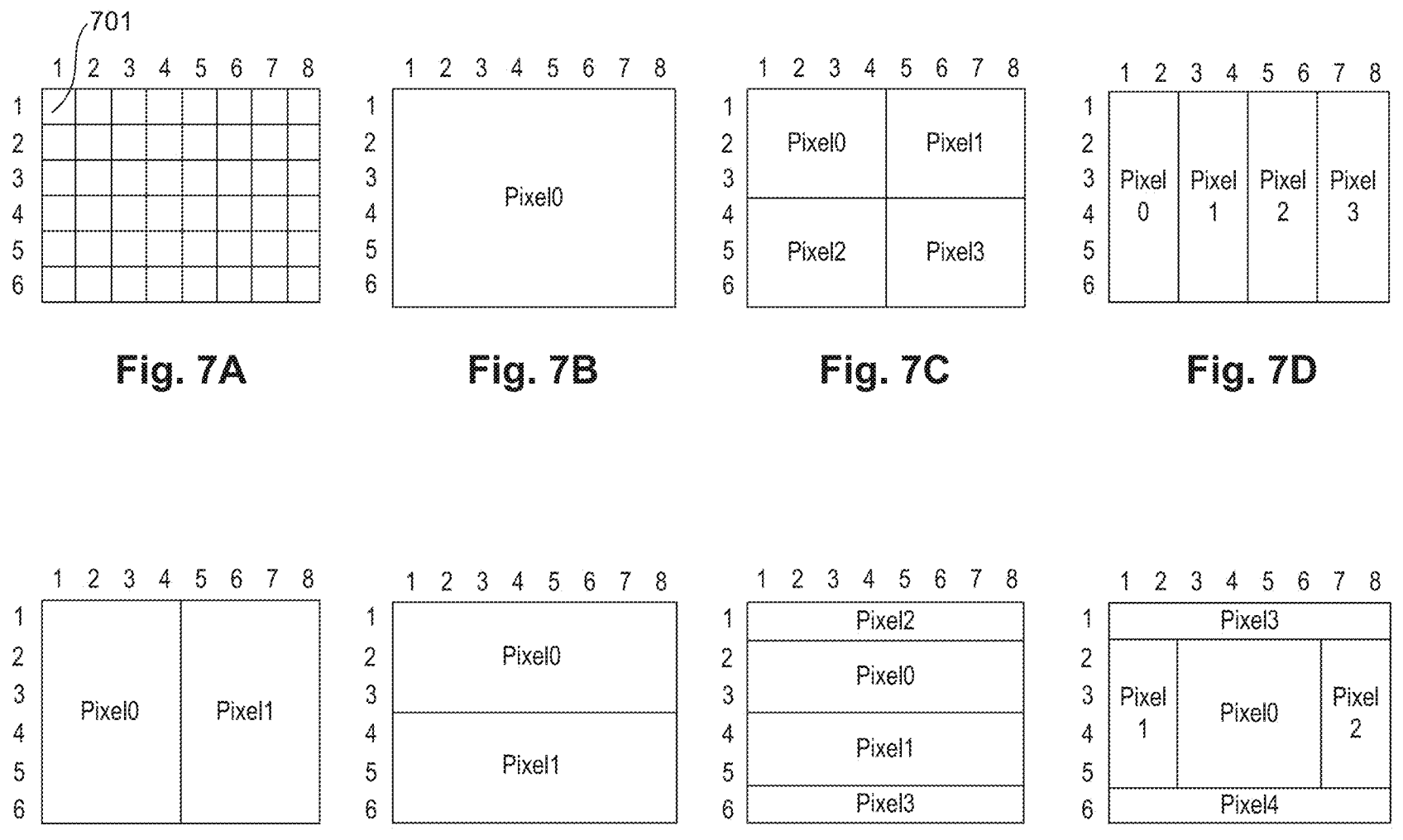

FIGS. 7A-7H illustrate several examples of pixel allocations and combinations of detection elements. For example, each cell of the 6×8 matrix depicted in FIG. 7A may represent an individual detection element. Specifically, FIG. 7A depicts detection element 701, one of 48 detection elements depicted in FIG. 7A. Of course, sensor 116 may include any number of detection elements, and the actual number of detection elements may include hundreds, thousands, or millions of detection elements, or more. The matrix of FIG. 7A may also represent a part of the detection elements of sensor 116 (a part whose allocation into pixels may optionally be replicated several times to different parts of sensor 116). The processor (e.g., processor 118 of processing unit 108 of LIDAR system 100 as exemplified in FIG. 1A and/or a plurality of processors 118 of processing unit 108 of the LIDAR system as exemplified in FIG. 2A) may allocate groups of detection elements of FIG. 7A as various pixels groups depicted in FIGS. 7B-7H. It should be noted that FIG. 7A may also represent an exemplary pixel allocation that includes one pixel per available detection element.

In FIG. 7B, illustrating a first example of pixel allocation of detection elements of FIG. 7A, the full 6×8 matrix is allocated for Pixel0. The pixel allocation depicted in FIG. 7B includes all 48 detection elements of FIG. 7A allocated to a single pixel. In such an embodiment, a decrease in available resolution may be accompanied by an increase in light sensitivity per pixel.

FIG. 7C illustrates another example of pixel allocation of detection elements of FIG. 7A. In this example, the 6×8 matrix of FIG. 7A has been allocated into four pixels each have the same size and shape and each including a similar number of detection elements. For example, each of Pixel0, Pixel1, Pixel2, and Pixel3 includes a 3×4 arrangement of detection elements.

FIG. 7D illustrates another example of pixel allocation that may be performed dynamically by LIDAR system 100. In this example, the 6×8 matrix of detection elements has again been allocated into four pixels each having a similar shape and a similar number of detection elements. In this embodiment, the pixels each include a 6×2 matrix of detection elements to provide an aspect ratio for each pixel that is longer in height than in width. In this embodiment, the width of each of Pixel0, Pixel1, Pixel2, and Pixel3 includes two detection elements (or one quarter of the width of sensor 116), and the height of each pixel includes six detection elements, or the full height of sensor 116.

FIG. 7E illustrates a fourth example of pixel allocation of the detection elements of FIG. 7A. In this embodiment, the 6×8 matrix of detection elements has been allocated into two pixels each including a 6×4 arrangement of detection elements. Similarly, in the allocation shown in FIG. 7F, the 6×8 matrix of detection elements of FIG. 7A has been allocated into two pixels, each including a 3×8 arrangement of detection elements.

In the pixel allocation represented by FIG. 7G, the 6×8 matrix of detection elements of FIG. 7A has been allocated among four pixels. However, the pixels shown in FIG. 7G differ in size. For example, Pixel0 and Pixel1 both include a 2×8 arrangement of detection elements. On the other hand, Pixel2 and Pixel3 include 1×8 arrangements of detection elements.

FIG. 7H represents a pixel allocation having four pixels of three different sizes. For example, Pixel 1 and Pixel2 each include a 4×2 arrangement of detection elements, Pixel3 and Pixel4 each include a 1×8 arrangement of detection elements, and Pixel0 includes a 4×4 arrangement of detection elements.

There may be many possible pixel configurations having various allocations of detection elements. FIGS. 7A-7H show just a small number of possible configurations. It is important to note that these different pixel configurations may be established on the fly during operation of LIDAR system 100. For example, during one scan of a FOV of LIDAR system 100, sensor 116 may be associated with a pixel configuration such as that depicted in FIG. 7C. During a second scan of the FOV, and based on various types of information available to the system (discussed further below), the pixel configuration may be dynamically changed, for example, to one shown in FIG. 7D. Any pixel configuration associated with sensor 116 may be changed to any other pixel configuration during operation of LIDAR system 100 either between scans of a FOV or during scans of the FOV.

Additionally, it should be noted that a suitable allocation of detection elements to pixels may be employed. In some cases, one pixel may include a first subset of the available detection elements that is greater in number than a number of detection elements included in a second subset of detection elements associated with a different pixel. In other embodiments, two or more different pixels (e.g., three, four, or more) may be allocated with an identical number of detection elements. And, detection elements associated with certain pixels during a first scan or portion of a scan may be reallocated at any time such that those detection elements are allocated to different pixels. In some embodiments the pixels into which the detection elements are reallocated may fully or partially overlap with one or more earlier pixels into which the detection elements were allocated.

In other words, in a first allocation, a first pixel may be associated with a first subset of detection elements, and a second pixel may be associated with a second subset of detection elements. The number of detection elements in the first subset and in the second subset may be identical or different. A second pixel allocation may include a third pixel and a fourth pixel, where the third and fourth pixels together include the same number of detection elements as the first and/or second pixels of the first pixel allocation. The third pixel and the fourth pixel may overlap with at least one of the first and second pixels of the first allocation. Additionally, where the fourth pixel is part of a later allocation, the fourth pixel may overlap with the third pixel.

Any allocated pixels may have a similar number of detection elements. For example, the first pixel in a first pixel allocation may include a similar number of detection elements as a third pixel in a second pixel allocation, even where the first and third pixels have different shapes, have no overlap, or at least partially overlap. On the other hand, the first and third pixels may have different numbers of detection elements (e.g., the first pixel may have a greater number of detection elements than the third pixel). In some embodiments, an aspect ratio of the third pixel may be greater than an aspect ratio of the first pixel.

FIG. 7I includes a diagram 700 representing a scene within a FOV of LIDAR system 100 along with various pixel configurations that may be used in conjunction with sensor 116. In some embodiments, LIDAR system 100 may be included on a host vehicle (e.g., an autonomous or semi-autonomous vehicle), and in such embodiments, the FOV of LIDAR system 100 may include objects typically encountered while navigating along one or more roadways. For example, as shown in FIG. 7I, a vehicle 725 may be detected. Vehicle 725 may represent a vehicle driving along the same roadway as the host vehicle, but in a different lane and in a different direction relative to the host vehicle. In the example shown in FIG. 7I, vehicle 725 may be approaching the host vehicle, but may be traveling in a different lane parallel to a lane in which the host vehicle drives.

As shown in diagram 700, the FOV of LIDAR system 100 may include other objects as well. For example, the FOV may include vehicles 712 and 714 traveling from right to left relative to the host vehicle and on a roadway that intersects the road on which the host vehicle travels. The FOV may also include stationary objects, such as street lights 732, 734, and 736. The FOV may also include the surface of the road on which the host vehicle travels, pedestrians, objects in the roadway, lane barriers, traffic lights, buildings, debris, and/or any other types of objects that may be present in the environment of a host vehicle.

Diagram 700 may represent a snapshot of a pixel allocation taken at any time during operation of LIDAR system 100, either during a FOV scan or between FOV scans. As represented in FIG. 7I, various regions of the FOV/sensor 116 are associated with pixels allocated with varying number of detection elements and having differing shapes. Each different allocation of detection elements to pixels, and each different pixel shape, may be selected based on information available to LIDAR system 100 at any given time. For example, in some situations, regions of the FOV that overlap with close range objects may be associated with a greater number of pixels that may be both smaller and have fewer detection elements than pixels associated with regions of the FOV overlapping more distant objects. Additionally, certain regions identified as regions of interest (e.g., a region including oncoming vehicle 725) may be associated with a greater number of pixels having fewer detection elements. Regions determined to include objects moving horizontally within the FOV (e.g., regions including vehicles 712 and 714) may include pixels having aspect ratios longer in width than in height. And regions determined or expected to include stationary objects (e.g., street lights 732, 734, and 736) may be assigned pixels having aspect ratios determined based on the shapes of objects experienced or expected in those regions (e.g., aspect ratios longer in height than in width).

More specifically, as the host vehicle drives along a roadway, there may be an interest in capturing high resolution information from a region of the FOV of LIDAR system 100 that overlaps with a range of distances close in to the host vehicle. For example, as shown in FIG. 7I, a region of the FOV overlapping a range of distances close to the host vehicle (e.g., a range of 1 meter to 50 meters ahead of the host vehicle, or at any other suitable range of distances) may be associated with a higher number of allocated pixels than other regions of the FOV. As shown in FIG. 7I, this region may include a pixel allocation 720 that includes a higher number of pixels per unit of area (and potentially also a lower number of allocated detection elements) as compared to other regions of the FOV. The pixel allocation 720 may, therefore, offer a potential for higher resolution detections as compared to other regions of the FOV. As a result, not only may vehicle 725 be detected, but the fact that vehicle 725 is overlaid by multiple pixels may enable detection and resolution of fine features of vehicle 725, such as the location, depth, and envelope of features such as the tires, side view mirrors, roof, bumper, vehicle edges, etc. Additionally, more accurate depth information may be determined for various parts of vehicle 725 as the number of pixels overlapping vehicle 725 increases. In some embodiments, each pixel of pixel allocation 720 may include a single detection element. In other cases, each pixel of allocation 720 may include multiple detection elements.

In some embodiments, regions of the FOV associated with distances further from the host vehicle or associated with regions of lower interest (e.g., regions overlapping areas outside the roadway on which the host vehicle travels) may be assigned pixels allocated with a higher number of detection elements as compared to regions of higher interest (e.g., the region associated with pixel allocation 720). For example, regions of lower interest may be associated with a pixel allocation 740 having a lower pixel density as compared, for example to pixel allocation 720. In the example shown in FIG. 7I, each pixel of pixel allocation 740 may include 16 times the area of the pixels associated with allocation 720. If each pixel in allocation 720 is assumed to have one detection element, then as illustrated, each pixel of allocation 740 would include sixteen detection elements. The pixels in allocation 740 may offer lower resolution capabilities, but higher sensitivity to reflected light, which may enable detection of distant objects on the roadway ahead of the host vehicle. Associating a particular region of the LIDAR system FOV with fewer number of pixels may also reduce an amount of computing resources needed for processing detection information associated with that region. This may free up computing resources for allocation to higher priority regions, such as the region overlapping pixel allocation 720, including the region just ahead of the host vehicle, or the region overlapping pixel allocation 710, including detected crossing vehicles.

The dynamic allocation of detection elements to pixels may depend on a variety of factors. In general, for regions of a FOV where there may be a desire to enhance detection sensitivity, more detection elements may be allocated per pixel. On the other hand, in regions of a FOV in which there may be a desire to increase a detection resolution, fewer detection elements may be allocated per pixel to enable a greater number of pixels to correspond to the particular FOV region. And as previously noted, the size, shape, and/or number of pixels per area of the FOV may be dynamically determined on the fly during operation of the LIDAR system 100 and based on information available to the system. For example, in some situations, dynamic pixel allocation may depend on range relative to the LIDAR system. Regions of the FOV that overlap with ranges closer to the LIDAR system may be allocated with larger numbers of pixels including fewer numbers of detection elements as compared to regions of the FOV overlapping more distant ranges.

Additionally, pixel allocation may depend on more transient regions of interest (e.g., not just those regions of interest established based on range from the host vehicle, for example). In one example, the system may be operate in a "low resolution" mode (e.g., according to allocation 740) and may detect an object (e.g., a vehicle, object in the road, etc.) ahead of the host vehicle. As a result of the detection in the low resolution mode, LIDAR system 100 may define as a region of interest the region including the detected object. As a result, during an ongoing scan or during one or more subsequent scans of the LIDAR FOV, the region of the FOV overlapping with the detected object may be allocated with a larger number of pixels in order to gain information about the object in a higher resolution mode.

Pixel allocation may also depend on the shape and size of detected objects and/or be based on the shape and size of objects expected to be detected in a certain region of the FOV. For example, as depicted in diagram 700 of FIG. 7I, street light 732, street light 734, and street light 736 are positioned along the side of the road. Pixel allocation 730 may be allocated to encompass street lights 732, 734, and 736. Pixels of pixel allocation 730 may be larger than pixels of pixel allocation 720, as there may be less need for high-resolution detections associated with non-moving objects outside the roadway on which the host vehicle travels. As also demonstrated in FIG. 7I, areas corresponding to ambient light sources may possibly be allocated with relatively small pixels and/or subtracted from larger pixels, in order to limit the flooding of light arriving from such sources, to blind only small parts of the detection array.

In some embodiments, the processor may determine the shape of pixels allocated to a particular region of the FOV based on the size, shape, and/or any other characteristic of objects detected or expected in the particular region of the FOV. For example, in one embodiment, the pixels of pixel allocation 730 may have aspect ratios resulting in vertically elongated and horizontally narrow pixels generally relating to the shape of the encountered street lights, 732, 734, and 736. This way, for example, pixel allocation 730 may improve separation between light posts at different distances, while still providing a sufficient number of detection elements for each pixel in the pixel allocation 730. In some embodiments, allocated pixels may be L-shaped, roughly circular, ring-like, or any other suitable shape. Such shapes of allocated pixels may depend, for example, on the configuration of detected or expected objects in various regions of the FOV of the LIDAR system.

Pixel allocation may also depend on other characteristics, such as detected or expected motion and motion direction of one or more objects within a FOV of the LIDAR system 100 and/or of motion of components of LIDAR system 100 (such as the at least one deflector 114). For example, as shown in FIG. 7I, pixel allocations 710 associated with regions of the FOV that overlap vehicles 712 and 714 that are moving from right to left and that may cross a path of the host vehicle may be allocated with pixels having aspect ratios longer in width than in height. Such pixel shapes, for example, may at least partially compensate for the effects of potential distortions occurring as a result of a continuously scanning mirror collecting reflected light from a moving object. For example, because the system may include a continuously scanning mirror (or another type of deflector), the reflected image on the sensor may be stretched in at least one direction if the detected object is moving relative to the LIDAR system 100. For example, a circular object moving from right to left relative to the LIDAR system may appear at the sensor as having a more elongated/elliptical shape (especially if several light pulses issued over a span of time are used for the detection of each pixel). To at least partially counteract such effects, a pixel allocation may be established that includes rectangular (or otherwise elongated) pixels rather than pixels having square shapes.

Pixel allocation may also depend on a host of other factors. In some embodiments, pixel allocation may depend on sensed driving parameters of the host vehicle (e.g., velocity, acceleration, distance from another vehicle, etc.) sensed environments (e.g., highway vs. urban settings), etc. Pixel allocation may also depend on any other information available to the LIDAR system 100, including, e.g., map data, GPS location information, host navigation instructions, etc. Various system changes associated with LIDAR system 100 may also prompt certain pixel allocations or changes in pixel allocations. Such system changes may include variations to the emitted pulses or light flux of the system, changes to the beam spot size, modifications to a focus area of reflected light impinging on sensor 116, changes to the scanning scheme, scanning speed of the deflector, etc.

As noted, pixel allocation may depend on sensed driving parameters. For example, as velocity of the host vehicle increases, the vehicle will cover a greater range of distances in a certain amount of time. Accordingly, there may be a need for higher resolution detection capability extending to further ranges ahead of the host vehicle. In the context of FIG. 7I, a sensed increase in the velocity of the host vehicle may prompt a reallocation of pixels either during or between scans of the FOV resulting in pixel allocation 720 being enlarged to include regions of the environment at a longer range from the host vehicle. For example, in some embodiments, pixel allocation 720 may extend further down the road based on the increased velocity. In contrast, a sensed slowing of the host vehicle may result in a reduction in the size of pixel allocation region 720 to include only regions of the FOV overlapping with distance ranges closer to the host vehicle. Additionally, sensed turns by the host vehicle may result in pixel allocations including greater numbers of pixels in regions of the FOV (e.g., to either side of the host vehicle's current heading direction) into which the host vehicle is predicted to be entering. The shape of the allocated pixels may also resemble those of pixel allocation 710 in order to at least partially account for lateral motion of the FOV relative to the surrounding environment of the host vehicle.

In some embodiments, pixel allocation may vary based on sensed environment. For example, the system may have different modes for driving on a highway, rural, or urban setting. When driving on a highway, objects may generally be expected to occur at larger distances from a host vehicle, but speeds are higher, for example, than in urban environments. Thus, pixel allocations providing higher resolution capability may be assigned to regions of the FOV that overlap with mid to long range distances from the host vehicle (e.g., 20 m to 100 m, or any other suitable range). And, pixel allocations aimed at increasing detection sensitivity with fewer pixels may be assigned to regions of the FOV at very long distances (e.g., greater than 100 m, 200 m, etc.). On the other hand, urban driving may be slower than highway driving and may involve a much greater density of target objects in the environment of the host vehicle. As a result, pixel allocations offering higher resolutions may be assigned to regions of the FOV overlapping with close in ranges relative to the host vehicle (e.g., between 1 m and 20 m). Beyond the close in regions, and especially including regions overlapping a roadway, pixel allocations may be assigned in order to increase sensitivity (e.g., to facilitate detection of low reflectance objects, such as pedestrians, that may be detected entering a roadway in a path of the host vehicle). And in rural environments, few target objects are expected in the path of the host vehicle. Thus, pixel allocations may be developed to favor sensitivity rather than resolution in order to enable detections of short and long range objects (e.g., a cow in the road).

As noted, pixel allocation may depend on object detections, which may establish one or more regions of interest. In some embodiments, the sensor may receive a reflection indicating that it is from an object that is in a certain location and range within the FOV. If the object is relatively close to the host vehicle, a pixel reallocation may involve increasing the number of pixels overlapping the detected object in order to increase the resolution of subsequent detections associated with the object. On the other hand, if the detected object is located further from the host vehicle, then a pixel reallocation may involve a decrease in a number of pixels overlapping the object in order to enhance detection sensitivity (e.g. by increasing SNR). As a distance between the host vehicle and a detected object decreases, pixel reallocation may involve sequential increases in the numbers of pixels overlapping a region including the detected object. Of course, some of the increases in numbers of pixels associated with a detected object may occur naturally as the object approaches LIDAR system 100. Even together with such natural effects, system 100 may reallocate pixels to greater densities during ongoing scans or between scans such that the pixel density associated with a detected object is made to be higher than what would occur naturally as a result of closing distance between the target object and host vehicle.

In some embodiments, pixel allocation may depend on GPS location information, map data, or host vehicle navigation instructions, or any other source of information. For example, if the system recognizes where a host vehicle is located and oriented relative to an environment, the system may base pixel allocations on expected features or changes in the environment. For example, if a host vehicle is determined to be approaching a turn (based on navigational instructions, map data, and location information), the system may use this knowledge or expectation to allocate pixels based on the expected conditions. For example, the system may allocate a higher number of pixels, or pixels of a certain shape, based on an expectation of making a turn to the right during one or more upcoming scans of the FOV. If the system is aware that the autonomous vehicle is approaching an intersection, then the system may increase resolution by increasing the number of pixels in the region or regions of the FOV where features of the intersection are expected to appear. Conversely, if the system has identified that the next turn is in 30 kilometers along a rural road, then the system may allocate pixels to favor detection sensitivity by increasing the number of detection elements per pixel.

Pixel allocation may also depend on internal diagnostics. For example, in some cases, processor 118 may recognize or identify at least one defective or inoperative detection element. Once identified, processor 118 may avoid allocating the defective or inoperative detection element to subsequently allocated pixels. Additionally, or alternatively, processor 118 may reduce a gain level associated with one or more defective detection elements after identifying such defective detection elements. Possibly, not all detection elements associated with a particular pixel may be relied upon. For example, based on various conditions (e.g., the identification of a defective detection element, etc.) processor 118 can effectively ignore at least one detection element during processing.

FIGS. 7J and 7K are diagrams illustrating examples of varying a pixel allocation during or between FOV scans consistent with some embodiments of the present disclosure. As shown in FIGS. 7J and 7K, during operation of LIDAR system 100, the number, size, shape, aspect ratio, and/or orientation of allocated pixels, among other characteristics, may be altered during an ongoing scan or between scans of the FOV. It is noted that any combination of such one or more characteristics may be changed between different pixel allocations, while possibly preserving another combination of one or more those characteristics. For example, processor 118 may reallocate pixels for a certain FOV from the pixel allocation shown on the left of FIGS. 7J and 7K, to the pixel allocation shown on the right of the figures, and vice versa. In some embodiments, processor 118 may change the pixel allocation between three or more different configurations. And, as shown in FIG. 7I, the allocation of pixels need not be uniform over a FOV.

FIG. 7L is a diagram illustrating an example of varying a pixel allocation based on a determined region of interest. For example, in some cases, a detection of an object may occur in a region of the FOV associated with the middle two pixels shown on the left side of FIG. 7L. As a result, processor 118 may change from the pixel allocation on the left, to the pixel allocation on the right, where there the region of interest including the detected object is provided with a greater number of smaller pixels. Such pixel reallocation may enable subsequent detections of the object in that region at higher resolution.

Pixel allocation may also depend on a scanning direction of the system. For example, FIG. 7M is a diagram illustrating an example of varying a pixel allocation according to scanning direction, consistent with some embodiments of the present disclosure. It is noted that individual detection elements are not illustrated in the example of diagram 7M, for simplicity of the illustration. In the illustrated example, the light sensitive area of sensor 116 is divided into a plurality of logical pixels 780. A logical pixel in the present context means that the outputs of such a logical pixel are associated to the entire logical pixel, even if only part of the detection elements in corresponding locations on sensor 116 are selected for combining their outputs. In some examples, the logical pixel may even be associated in some points in time with detection elements whose position corresponds to another logical pixel. If the deflector 114 moves during the capturing of a single logical pixel 780 (as may be the case in some examples), it is possible to assign different groups of detection elements to a single logical pixel 780 at different times during a capturing of that single logical pixel. For example, the processor may allocate, to a single logical pixel, different groups of detection elements for different light pulses, and combine (e.g. sum) the detection outputs of the different groups. In other example, the processor may allocate to a single logical pixel different groups of detection elements while the deflector scans during a continuous illumination of a corresponding part of the FOV. Referring to the illustrated example, a first group of detection elements (denoted 792) is allocated to the logical pixel 780(1) at a first point in time, and a second group of detection elements (denoted 794) is allocated to logical pixel 780(1) at a second point in time, after the deflector moved to a somewhat different position (e.g. a somewhat different angle of a scanning mirror). The outputs of groups 792 and 794 may be combined to a single output (e.g. a scalar, a vector, or any other form of output which may be processed by processor 118 to provide detection result. It is noted that more than two subgroups of detection elements may be associated to the same logical pixel at different times. It is also noted that while the example of FIG. 7M illustrated movement of the deflector 114 (and therefore also of the selection of the groups of detection elements) over a single axis, 2D scanning of the deflector (and therefore also of the selection of the groups of detection elements) may also be implemented.

Figure 8:
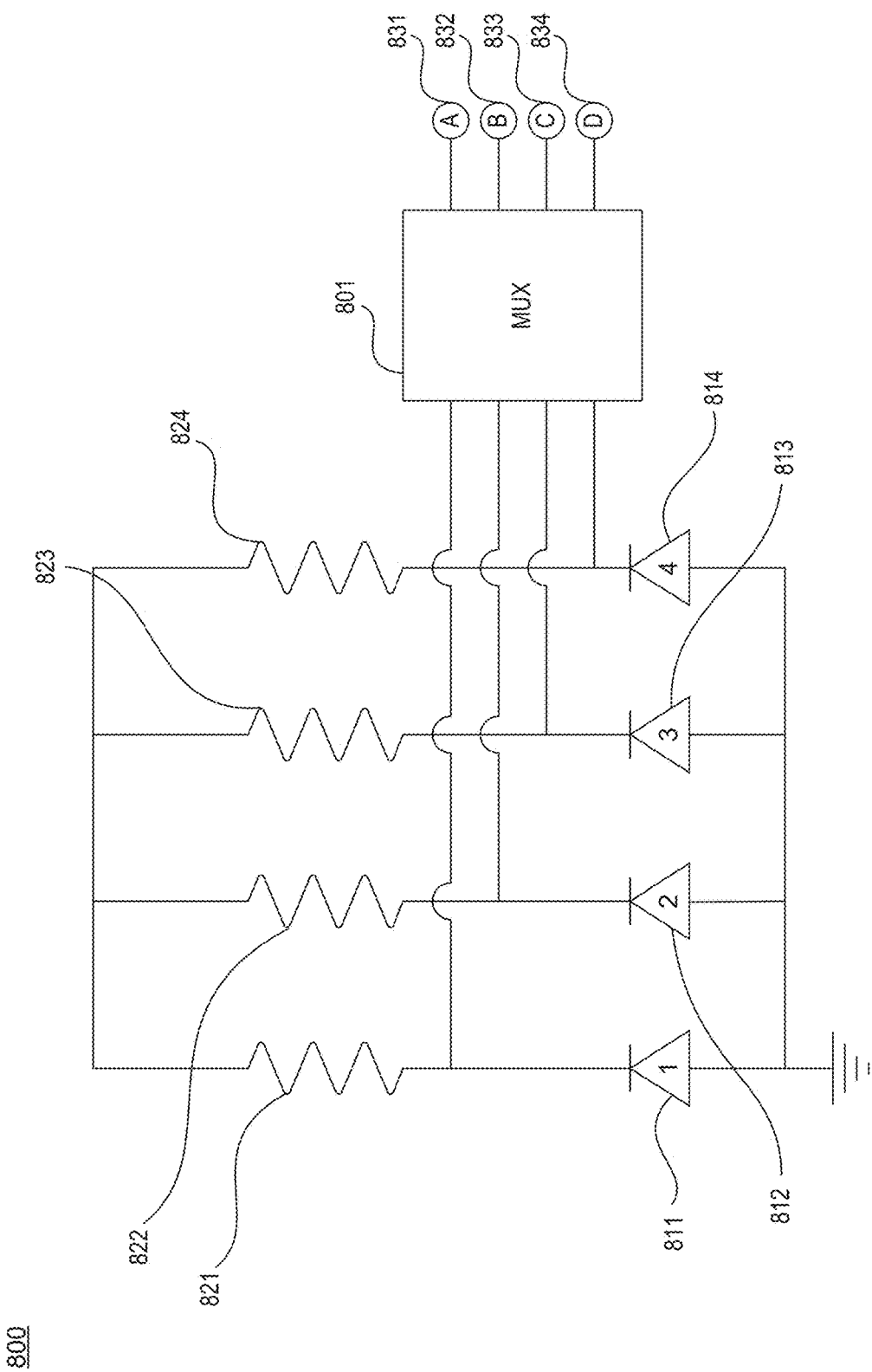
FIG. 8 is exemplary circuitry for pixel allocation consistent with some embodiments of the present disclosure.

FIG. 8 illustrates an example of circuitry 800 that may be associated with sensor 116. Such circuitry 800 may include light sensitive detection elements for collecting light reflected from objects within a FOV of LIDAR system 100. In some embodiments, each detection element may include a light sensitive device, such as diodes, 811, 812, 813, or 814. Each diode may be associated with a corresponding resistor 821, 822, 823, and 824. The light sensitive pixels may include single photon avalanche diodes (SPADs), avalanche photo diodes (APDs), PIN diodes, etc. Circuit 800 may be used in the type of pixel allocation described above. For example, a MUX 801 may be connected to the cathode of diodes 811, 812, 813, and 814 and may be used to sample the current through each of the photodiodes, which may indicate an amount of light incident on each individual photodiode. While only four photodiodes are shown, any number of photodiodes may be employed (e.g., hundreds, thousands, millions, or more).

As described above, pixels associated with sensor 116 may be allocated to include one or more detection elements. Relative to the circuitry shown in FIG. 8, a pixel associated with sensor 116 may include a single photodiode, such as diode 811, and another pixel may include a single photodiode such as diode 812. The four photodiodes shown in FIG. 8 may be included in four separate pixels. Alternatively, two or more of the photodiodes may be grouped together into a single pixel. For example, in some embodiments, the photodiodes shown in FIG. 8 may be incorporated into two different pixels—e.g., photodiodes 811 and 812 being associated with a first pixel, and photodiodes 813 and 814 being associated with a second pixel. Further still, all of the photodiodes 811, 812, 813, and 814 may be aggregated together into a single pixel associated with sensor 116.

MUX 801 may be used in the allocation of detection elements (e.g., diodes) into one or more different pixels. For example, in an embodiment where each photodiode 811, 812, 813, and 814 is associated with a different pixel, MUX 801 may provide values to outputs 831, 832, 833, and 834 indicative of the current through each individual, respective photodiode 811, 812, 813, and 814. On the other hand, where all of the photodiodes 811, 812, 813, and 814 are to be allocated to a single pixel, MUX 801 may sample the current values through each of photodiodes 811, 812, 813, and 814 and provide an aggregated output to any of outputs 831, 832, 833, or 834. Circuitry 800 may also include a plurality of switches for dynamically allocating detection elements to different subsets associated with different pixels.

Of course, such allocation of detection elements to pixels may also be accomplished by processor 118. For example, processor 118 may receive inputs indicative of current in each individual detection element (e.g., through time multiplexed sampling of an array of detection elements). Processor 118 can then accomplish the logical groupings of detection elements to pixels by aggregating the detection element outputs associated with each uniquely defined pixel. System 100 may also include a plurality of decoders configured to decode reflections signals received from the plurality of detection elements.

Figure 9A:
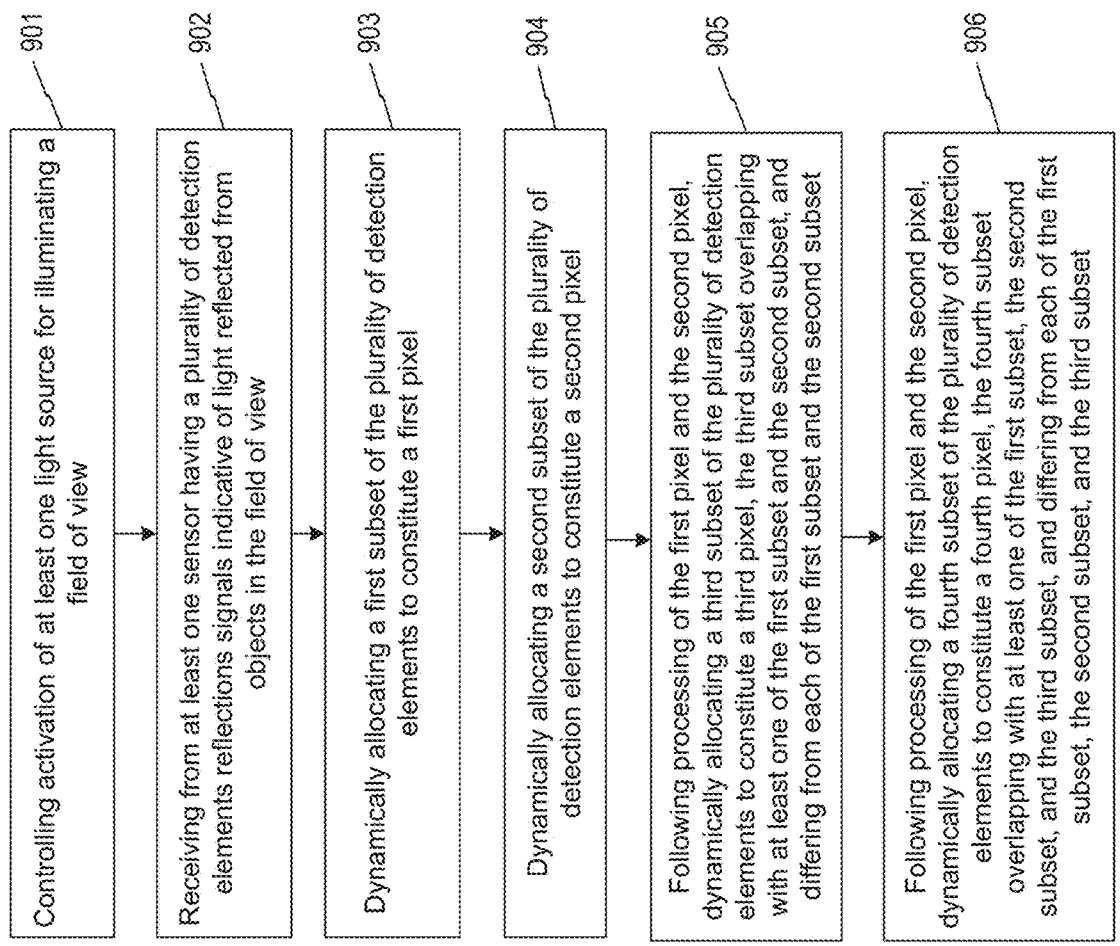
FIG. 9A is a flowchart illustrating an example method for dynamically defining pixels by groups of detection elements consistent with some embodiments of the present disclosure.

FIG. 9A includes an example flowchart representation of a method 900 for dynamically allocating groups of detection elements (e.g., SPADs) to different pixels. Method 900 may be performed by at least one processor (e.g., processor 118 of processing unit 108 of LIDAR system 100 as depicted in FIG. 1A and/or a plurality of processors 118 of processing unit 108 of the LIDAR system as depicted in FIG. 2A). At step 901, processor 118 controls activation of at least one light source (e.g., light source 112 of FIG. 1A, laser diode 202 of light source 112 of FIG. 2A, and/or plurality of light sources 102 of FIG. 2B) for illuminating a field of view (e.g., field of view 120 of FIGS. 1A and 2A).

Step 902 may further include receiving, from at least one sensor having a plurality of detection elements, reflections signals indicative of light reflected from objects in the field of view (e.g., field of view 120 of FIGS. 1A and 2A). Step 903 includes dynamically allocating a first subset of the plurality of detection elements to constitute a first pixel. Examples of first pixels are discussed above with references to FIGS. 7B-7H. Step 904 includes dynamically allocating a second subset of the plurality of detection elements to constitute a second pixel. Examples of second pixels are discussed above with references to FIGS. 7C-7H. It is noted that steps 901 and 902 may be repeated more than once, and that iterations of step 901 and/or 902 may be executed between any of the steps of method 900 discussed below and/or concurrently with one or more of these steps.

Step 905, which is executed after the processing of the first pixel and the second pixel, includes dynamically allocating a third subset of the plurality of detection elements to constitute a third pixel, the third subset overlapping with at least one of the first subset and the second subset, and differing from each of the first subset and the second subset. Examples of third pixels are discussed above with references to FIGS. 7C, 7D, 7G, and 7H.

Step 906, which is executed after the processing of the first pixel and the second pixel, includes dynamically allocating a fourth subset of the plurality of detection elements to constitute a fourth pixel, the fourth subset overlapping with at least one of the first subset, the second subset, and the third subset, and differing from each of the first subset, the second subset, and the third subset. Examples of fourth pixels are discussed above with references to FIGS. 7C, 7D, 7G, and 7H.

As previously noted, LIDAR system 100 may be incorporated onto any suitable platform. In some embodiments, LIDAR system 100 may be incorporated onto a vehicle (e.g., an autonomous or semi-autonomous vehicle) having a body and at least one processor configured to perform any of the types of pixel allocations described above. And signals associated with one or more of the allocated pixels may be used to determine various types of information. For example, the at least one processor 118 may determine distance information to at least one object based on signals collected from pixels (e.g., first and second pixels, or more) associated with sensor 116. Additional pixels may provide additional information about a detected object. For example, signals from third or fourth pixels from the same pixel allocation or a different pixel allocation that included first and second pixels may provide additional depth information or may provide information regarding structural details associated with an object (e.g., presence of a side view mirror, locations of wheel edges, etc.).

In some cases, the at least one processor 118 may determine an absence of objects in at least a portion of the LIDAR FOV based on the processing of a first pixel and a second pixel (e.g., where the first and second pixels include a number of detection elements having an SNR insufficient to positively identify an object). The at least one processor 118 may determine, however, an existence of at least one object in the portion of the FOV based on the processing of a third pixel and a fourth pixel (e.g., where the third and fourth pixels are allocated with a number of detection elements favoring sensitivity over resolution under the experienced conditions). Indeed, the at least one processor 118 may dynamically allocate detection elements to the third and fourth pixels following a determination of the absence of objects in the at least a portion of the FOV based on the processing of the first pixel and the second pixel.

Figure 9B:
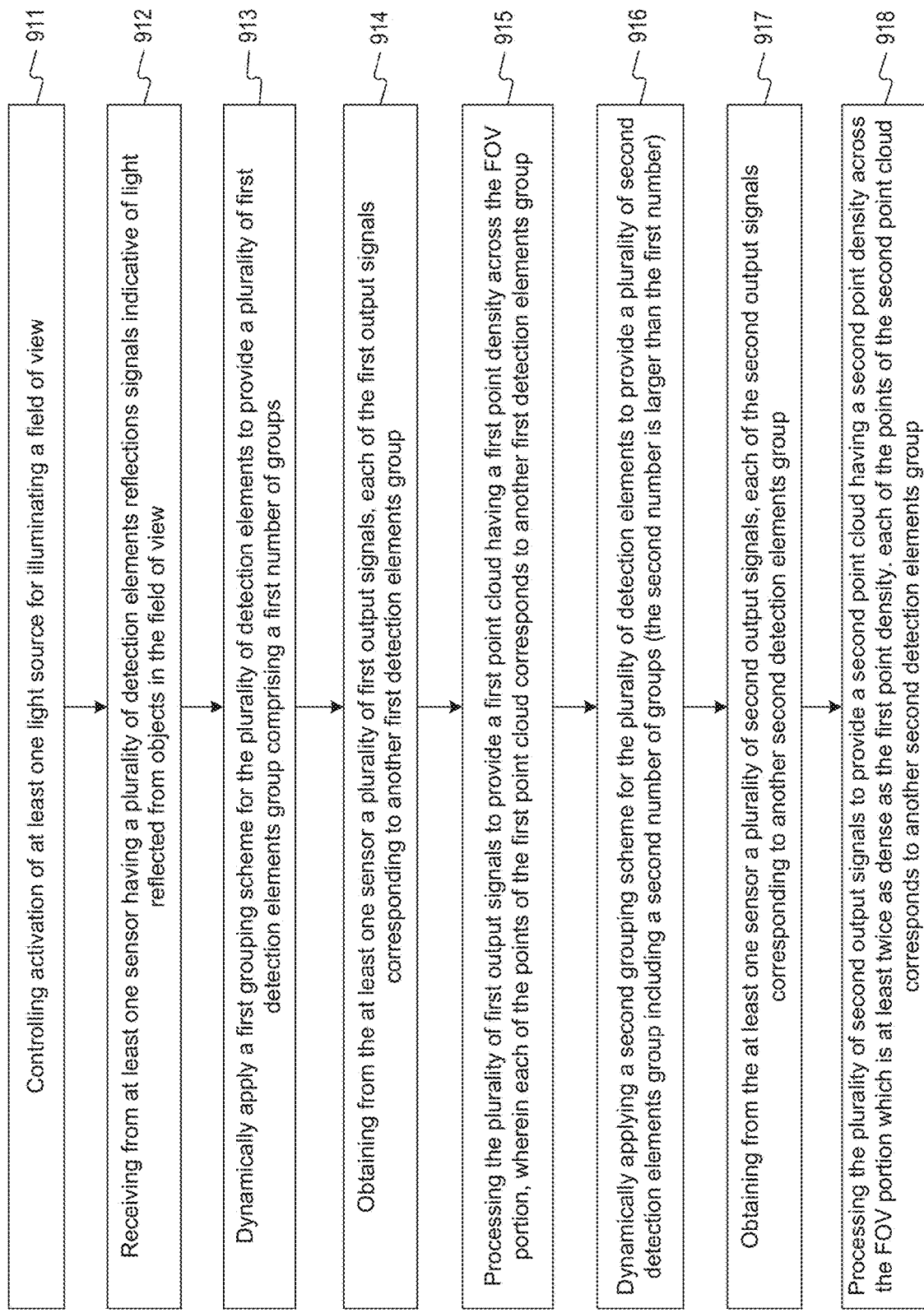
FIG. 9B is a flowchart illustrating method 910 for LIDAR imaging, in accordance with examples of the presently disclosed subject matter.

FIG. 9B is a flowchart illustrating method 910 for LIDAR imaging. Method 910 may be executed by one or more processors of a LIDAR system. Referring to the examples set forth with respect to the previous drawings, method 910 may be executed by LIDAR system 100. Referring to the examples set forth with respect to the previous drawings, method 910 may be executed by one or more processors 116 of LIDAR system 100.

Method 910 may include step 911 of controlling activation of at least one light source for illuminating a field of view portion (FOV portion). Method 910 may be executed for a FOV portion which is at least 10 square degrees (e.g. 2° by 2.5°). It is noted that optionally, method 910 may be executed for significantly larger FOV portions (e.g. 100 square degrees, 1,000 square degrees), and may be executed for the entire FOV of the LIDAR system, or only for one or more parts of it. While not necessarily so, the FOV portion may be a continuous FOV portion. It is noted that optionally, method 910 may be executed for FOV portions smaller than 10 square degrees.

Method 910 also includes step 912 of receiving from at least one sensor having a plurality of detection elements reflections signals indicative of light reflected from objects in the FOV portion. It is noted that steps 911 and 912 may be repeated more than once, and that iterations of step 911 and/or 912 may be executed between any of the steps of method 910 discussed below and/or concurrently with one or more of these steps.

Step 913 of method 910 includes dynamically applying a first grouping scheme for the plurality of detection elements to provide a plurality of first detection elements group including a first number of groups. Referring to the examples provided with respect to the previous drawings, the detections elements may be detection elements of one or more sensors 118 of LIDAR system 100. Each group of detection elements may constitute a pixel, as discussed above in greater detail. It is noted that each group of detection elements may include only neighboring or otherwise spatially connected detection elements, but this is not necessarily so. The different first group may be of the same size and/or include substantially number of detection elements, but this is not necessarily so. Any other variation discussed above with respect to the different pixels is applicable also to the first groups of detection elements.

Step 914 of method 910 includes obtaining from the at least one sensor a plurality of first output signals, each of the first output signals corresponding to another first detection elements group. It is noted that the output signals may be analog and/or digital, may include a single value or a group of values (e.g. a vector), and may correspond to one or more points in time and/or to one or more spans of time.

Step 915 of method 910 includes processing the plurality of first output signals to provide a first point cloud having a first point density across the FOV portion. In this case, each of the points of the first point cloud corresponds to another first detection element group. A point density of the point cloud in the context of method 910 refers to the number of point clouds for a square degree of the FOV. For example, if each first group of detection elements corresponds to a segment of 0.2° by 0.2°, the first point density is 25 points per square degree. It is noted that the point cloud density may also be measured using other metrics (e.g. a 1D density across one of the axes, etc.).

Step 916 of method 910 includes dynamically applying a second grouping scheme for the plurality of detection elements to provide a plurality of second detection elements group including a second number of groups (the second number is larger than the first number). Any other variation discussed above with respect to the different pixels is applicable also to the first groups of detection elements. Any variation discussed above with respect to differences between pixels of different allocation schemes is applicable also to the differences between the second groups and the first groups of detection elements.

Step 917 of method 910 includes obtaining from the at least one sensor a plurality of second output signals, each of the second output signals corresponding to another second detection elements group. Any variation discussed above with respect to step 914 is applicable to step 917.

Step 918 of method 910 includes processing the plurality of second output signals to provide a second point cloud having a second point density across the FOV portion—the second point density is at least twice as dense as the first point density. Each of the points of the second point cloud corresponds to another second detection elements group. Any variation discussed above with respect to step 914 is applicable=to step 918.

It is noted that optionally, a ratio between the first point density and the second point density is not an integer (e.g. at least 0.15 off from the closest integer, i.e. between N+0.15 to N+0.85, where N is an integer). Moreover, the ratio between the first point density and the second point density is defined to be the larger of these two point densities divided by the smaller of these two point densities.

Optionally, a ratio between a 1D point density of the first point cloud and a 1D point density of the second point cloud is not an integer (e.g. at least 0.15 off from the closest integer, i.e. between N+0.15 to N+0.85, where N is an integer). Moreover, the ratio between these point densities is defined to be the larger of these two 1D point densities divided by the smaller of these 1D two point densities.

As discussed with respect to the aforementioned systems and methods, the changing of the allocation of the detection elements into different groups/pixels may be executed between different scans of the FOV, during a single scan of the FOV, etc.

Method 910 may optionally be executed by a method 910 may, and more specifically, by a processor of a LIDAR system. A processor of a LIDAR system is therefore disclosed, which is operable and configured to:
 a. control activation of at least one light source for illuminating a field of view (FOV) portion which is at least 10 square degrees;
 b. receive from at least one sensor having a plurality of detection elements reflections signals indicative of light reflected from objects in the FOV portion;
 c. dynamically apply a first grouping scheme for the plurality of detection elements to provide a plurality of first detection elements group including a first number of groups;
 d. obtain from the at least one sensor a plurality of first output signals, each of the first output signals corresponding to another first detection elements group;
 e. process the plurality of first output signals to provide a first point cloud having a first point density across the FOV portion (each of the points of the first point cloud corresponds to another first detection elements group);
 f. dynamically apply a second grouping scheme for the plurality of detection elements to provide a plurality of second detection elements group including a second number of groups (the second number being larger than the first number);
 g. obtain from the at least one sensor a plurality of second output signals, each of the second output signals corresponding to another second detection elements group; and
 h. process the plurality of second output signals to provide a second point cloud having a second point density across the FOV portion, (each of the points of the second point cloud corresponds to another second detection elements group), where the second point density is at least twice as dense as the first point density.

Referring to all of the methods and systems discussed above, it is noted that not all of the detection elements of the relevant sensors are necessarily allocated in any distribution scheme (also referred to as allocation scheme) of the detection elements to pixels/groups.

Varying Detection Sensitivity During Time of Flight in LIDAR Systems

A LIDAR system (e.g., LIDAR system 100) may include at least one processor (e.g., processor 118), configured to cause activation of one or more light sources (e.g., light source 112), to emit light toward a portion of a field of view of the LIDAR system. The LIDAR system may determine information about its surroundings based on the received reflections of the light emitted by the LIDAR system. For example, light reflections received and registered by one or more sensors (e.g., sensor 116) may enable determination of information such as distance information relative to objects, object surfaces, portions of objects, road surfaces, or any other features present in an environment. It should be noted that while modifications to the amplification levels during time-of-flight of light are often exemplified below with respect to a scanning LIDAR system and to LIDAR system 100 in particular (e.g., in the paragraphs below, and with respect to FIGS. 10, 11, and 12), the present invention is not limited to such systems, and may be implemented to any type LIDAR system. Specifically, all the details and variations discussed below with respect to scanning LIDAR systems may be implemented, mutatis mutandis, to other types of LIDAR system as well (e.g. flash-type LIDAR, staring-array LIDAR, etc.).

In one example, a LIDAR system may be installed on a host vehicle and may use reflection signals received based on reflected light received from an environment of the host vehicle within the FOV of the LIDAR system to determine distances between the host vehicle and objects in the FOV. In operation, however, various sources of noise may exist that can hinder operation of the system. For example, within an FOV of the system, ambient light sources, areas of high reflectivity, sources of glare, etc. may saturate one or more portions of a sensor of the LIDAR system, resulting in "blinding" of the sensor, which can limit the system's ability to resolve objects in the FOV or to determine distance information, etc.

Possible sources of blinding may include street lamps, tail lights, headlights, highly reflective objects (e.g., license plates, signs, etc.), fog, heavy rain, wet surfaces, near-by objects, etc. Light reflected internally from one or more system components can also cause blinding. For example, internal reflections may occur when light emitted from the light source (e.g., light source 112) is reflected by one or more internal components (e.g., a steering element, splitter, and/or a LIDAR system housing). Internally reflected light emissions may reach the sensor very quickly, before any signal from an object in the field of view is expected. Blinding by such internal reflections may result in the system being unable to properly detect objects in the LIDAR system FOV (to a distance which depends on the recovery time of the sensor). Decreasing sources of blinding may increase the accuracy of the LIDAR system.

Blinding of the sensor by may be overcome by tuning various operational parameters of sensor 116. For example, in some embodiments, sensor 116 may include one or more detection elements having tunable amplification parameter. The amplification parameters may be tunable for each detection element independently, for groups of detection elements, and so on. At any time during operation of LIDAR system 100, an amplification parameter of one or more detection elements (including any subset of the available detection elements up to all of the available detection elements) present in sensor 116 may be adjusted from zero (or any other value that may render a particular detection element effectively inoperative) to a maximum available amplification level. The amplification parameter of the detector may be controlled, for example, via a gain setting applied to one or more detection elements of sensor 116. The effective amplification parameter of the detector may also be affected by adjusting a gain/amplification level associated with any component in the light reception path or processing path (e.g., analog amplifiers, analog-to-digital-converters, time-to-digital-converters, digital amplifiers, etc). In some embodiments, the effects of sensor blinding may also be reduced using a controllable filter or a controllable shutter in conjunction with sensor 116. In the described embodiments, the dynamically controlled amplification parameter may include at least one of: detector gain, amplifier gain, sensitivity level, and/or attenuation value. And, as noted, adjusting an amplification parameter of the detector may include an alteration of any or all of these parameters relative to any component present in the light reception or light processing path, including sensor 116 and other components of the LIDAR system.

Control of an amplification parameter of the detector may be performed at any suitable time during operation of LIDAR system 100. More specifically, however, the amplification parameters may be selectively altered during a time of flight of a light pulse (or other light signal, such as a CW signal) emitted from light source 112. This capability for selectively altering amplification parameters during a time of flight may improve the detection ability of the LIDAR system in different ways. For example, the capability for selectively altering amplification parameters during a time of flight may enable time gated filtering of light reflections from objects in an environment of LIDAR system 100. Such time-gated filtering may also be useful in reducing or eliminating noise contributions from ambient light sources, highly reflective surfaces, or other sources of noise. For example, if a noise producing object (such as a vehicle tail light, license plate, etc.) is determined to be located at a certain distance from LIDAR system 100, then amplification parameter values may be reduced during a time window when light reflections from the noise producing object are expected to be received at sensor 116, for example. As a result, blinding effects caused by the noise producing object may be reduced.

During its operation, processor 118 may control activation light source 112 for illuminating a field of view of LIDAR system 100. Processor 118 may receive from sensor 116 a reflection signal associated with an object in the field of view. A time lapse between light leaving light source 112 and a return reflection impinging on sensor 116 constitutes a time of flight. Processor 118 may alter an amplification parameter associated with the at least one sensor (e.g., an amplification parameter associated with one or more detection elements of sensor 116 or with any other components in the light receiving or processing paths) during the time of flight. It is noted that in some cases (for example, when the sensor is directed at the sky, toward an empty space, or toward a black object), no reflections of emitted light may be received from the scene. Therefore, the LIDAR system may wait only a predetermined time for reflection instead of waiting indefinitely. In such cases, modifications to the amplification levels may be initiated by the processor within the maximal waiting time (e.g. 2 milliseconds for 300 meters maximal detection range) allowed for propagation of specific emission of light. It is noted that the maximal waiting time may be changed from time to time, from pulse to pulse, from pixel to pixel, etc. It is further noted that in LIDAR, reflections from a single light emission (e.g. of a single pulse emitted toward a single pixel) may be reflected from different distances, and may therefore arrive at different times. The modification of amplifications setting may take place during any of the time-of-flights (in case there is more than one time-of-flight).

Such selective alteration of amplification parameter values may also have other potential benefits. These may include, for example, an ability to increase (e.g., progressively increase) detection sensitivity relative to light reflections having longer flight times, which can aid in detecting progressively more distant objects or in determining distances/depth maps relative to those objects.

As noted, time of flight may correspond to a time lapse between a light emission leaving light source 112 and when a return reflection resulting from the light emission reflecting from an object, surface, etc. in the FOV of the LIDAR system impinges on sensor 116. Time of flights may vary with the distance between LIDAR system 100 and objects in the FOV of the LIDAR system. That is, as that distance increases, so too does the time of flight. As noted, amplification parameters may be selectively adjusted during a time of flight of light emitted toward the FOV. For example, amplification parameters may be reduced or increased during a particular time window within a time of flight, which may decrease or increase sensitivity to light reflections within a range of distances corresponding to the particular time window. Additionally, amplification parameters may be varied in other ways relative to a time of flight. For example, in some embodiments, amplification parameters may be increased as a function of the time passing from an emission time (e.g., of a given pulse). Thus, as time of flight increases (e.g., corresponding to reflections from increasingly distant objects), applied amplification values may also be increased. Additionally or alternatively, the sensitivity amplification of the sensor may be dynamically adjusted based on the time at which a reflected pulse is expected to reach the detector. If reflected light from an object of interest is expected to be received at sensor 116 at a particular time or within a particular time window, then an amplification parameter value may be increased at that time or within that time window. Conversely, if reflected light from an object of low interest (e.g., a source of ambient light or other source of noise) is expected to be received at sensor 116 at a particular time or within a particular time window, then an amplification parameter value may be decreased at that time or within that time window.

Amplification parameter values may be altered in any suitable manner during a time of flight. In some embodiments, processor 118 may be configured to progressively increase an amplification parameter over a period of time of at least 300 consecutive nanoseconds. In some embodiments, processor 118 may be configured to increase an amplification level by at least 1 dB over a period of time of at least 200 consecutive nanoseconds. In some embodiments, processor 118 may be configured to increase an amplification level by at least 4 dB over a period of time of at least 300 consecutive nanoseconds.

As described herein, the modification of amplification parameters by the processor during time-of flight may also be implemented in a flash-type LIDAR system in which the entire FOV is illuminated and a corresponding image of the FOV is captured by sensor 116 during a single capture cycle. As described herein, the modification of amplification parameters by the processor during time-of flight may also be implemented in a staring-array-type LIDAR system in which the FOV is illuminated by a scanning pattern, and the reflected light signals are captured by a fixed sensor which converts an image of the entire FOV during a single capture/scan cycle. In other embodiments, LIDAR system 100 may constitute a scanning system in which a movable light deflector may be used to selectively illuminate sub-regions of the FOV and to sequentially capture images of different sub-regions of the FOV (e.g., using sensor 116) during a single scanning cycle. The described technique of altering amplification parameters during a time of flight can be used together with flash-type LIDAR systems, scanning LIDAR systems, or any other LIDAR system configuration. And as amplification parameters may be controlled relative to any relevant components in a light reception or processing path of LIDAR system 100 or relative to any individual detection elements or group of detection elements within sensor 116, different amplification schemes may be applied during a single scanning cycle. For example, where an amplification scheme may refer to an amplification profile over time for a particular system component or for a particular detection element, different components and different detection elements may all be associated with amplification schemes different from one another, even during a single scan cycle.

Additionally, in a scanning LIDAR system, processor 118 may control at least one light deflector 114 to deflect light from the at least one light source for scanning the field of view. In such systems, a scanning pattern of the field of view may include at least two different scanning directions (e.g., as shown in FIGS. 2A-2C). And processor 118 may dynamically alter an amplification parameter associated with at least some of the plurality of detection elements of sensor 116 based on a current scanning direction.

Various triggers may be used for altering amplification parameters during the time of flight of light emitted by LIDAR system 100, according to presently described embodiments. In some cases, such triggers may include feedback received during operation of LIDAR system 100. For example, a value for an amplification parameter for any system component and/or for one or more detection elements of sensor 116 may be determined based on reflection signals associated with a previous scanning cycle (or a previous pulse emitted during the same scanning cycle). Additionally or alternatively, a value for an amplification parameter for one or more detection elements of sensor 116 included within a particular pixel may be determined based on reflection signals associated with another pixel received during a same scanning cycle. Amplification parameter values may even be determined based on location information of the vehicle. For example, processor may use a determined location of a host vehicle together with map data to identify potential sources of ambient light and predicted ranges to the ambient light sources. In response, processor 118 may alter amplification parameter values for time windows corresponding to the predicted ranges.

Figure 10:
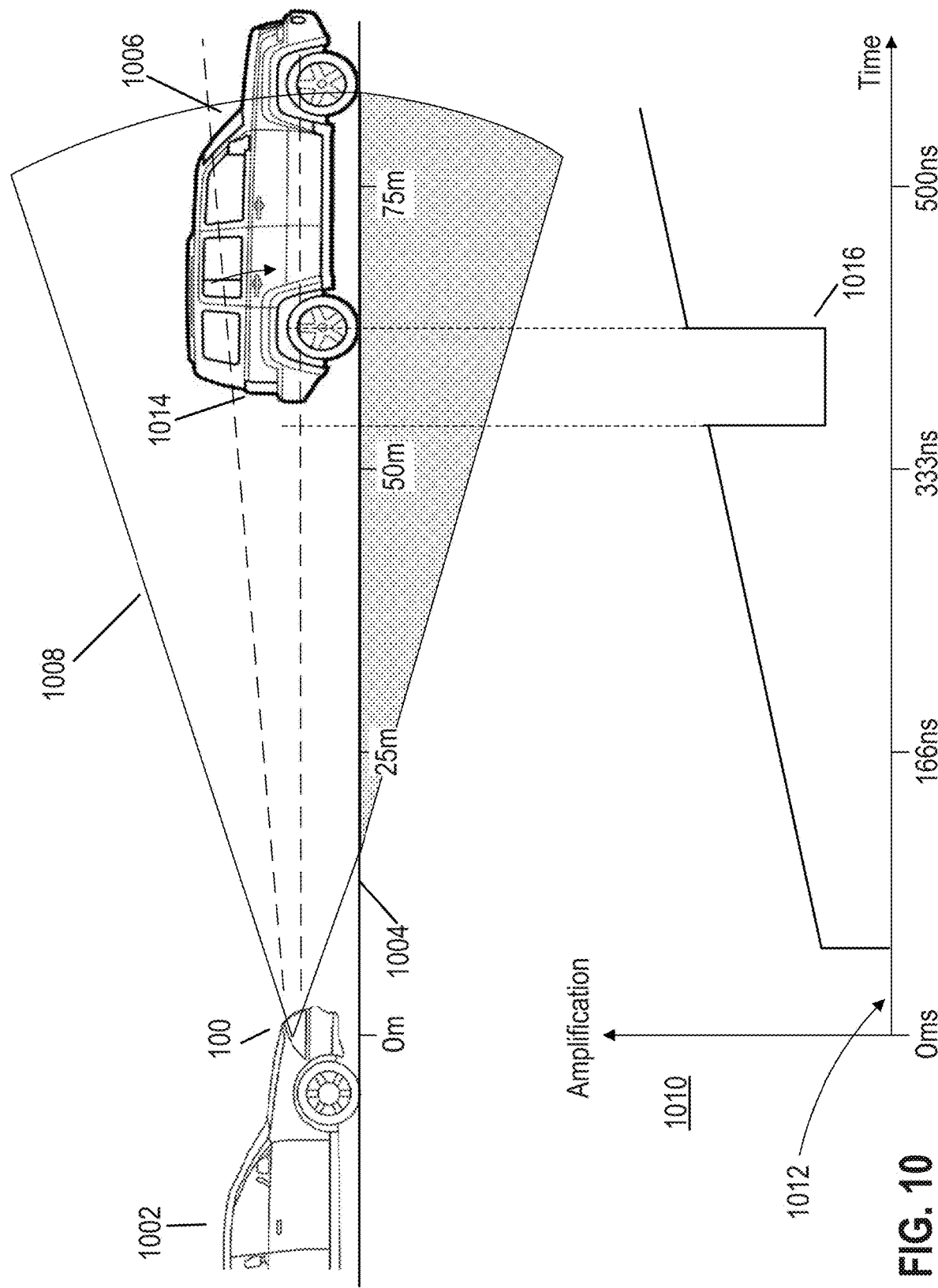
FIG. 10 is a diagram illustrating dynamic time gating of sensitivity amplification, consistent with disclosed embodiments.

In one example of using feedback to dynamically control amplification parameter values, distance information relative to one or more objects, etc. within the LIDAR system FOV may be acquired based on light emitted within the FOV. This information may be used to generate and apply an amplification scheme for one or more components or detection elements. For example, if a vehicle tail light is detected at a distance of 60 meters from LIDAR system 100 (e.g., as illustrated in the example of FIG. 10), then amplification parameter values associated with one or more detection elements that collect reflected light from a region of an FOV including the detected tail light may be reduced to reduce or eliminate a risk of blinding from illumination of the detected tail light at the relevant time window (e.g. between 370 and 430 nanoseconds from emission). Notably, the amplification parameter values of the one or more detection elements need not be reduced indefinitely. Rather, the reduction in amplification parameter values may be selectively applied only for a range (e.g., a narrow range) of flight times including the flight time of light reflections expected from the tail light (i.e., a flight time corresponding to about 400 ns).

Further, an amplification scheme for a particular system component and/or for a particular detection element may exhibit any suitable amplification profile. For example, during some time ranges, a particular amplification scheme may include amplification values set at a minimum value (e.g., zero). In other time periods, an amplification value may be maintained at a suitable constant level. And in other time periods, amplification may vary, for example, according to any suitable function relative to time (e.g., linearly increasing, linearly decreasing, exponentially increasing, exponentially decreasing, step-wise increasing, step-wise decreasing, periodically varying, etc.). In some embodiments, a first portion of a time of flight may be associated with a first amplification value, and processor 118 may cause an increase in the amplification value during a second portion of the time of flight subsequent to the first portion of the time of flight. In some cases, during the first portion of the time of flight, the amplification value may substantially equal zero. Additionally, the first portion of the time of flight may begin after the light leaving the at least one light source has traveled at least 5 meters from the at least one light source (or any other predetermined distance or equivalent time, such as 7 meters, 16 meters, etc.). And the second portion of the time of flight may begin substantially when the first portion of the time of flight ends or may begin after an intervening time window.

As noted, amplification values associated with individual detection elements or groups of detection elements may be independently controlled over a time of flight of light supplied to an environment of the LIDAR system. For example, in some embodiments, different groups of detection elements may be assigned to different pixels, and amplification parameters of each pixel and the group of corresponding detection elements therein may be independently adjusted. For example, for a pixel that collects light from an object in the FOV near to the LIDAR system, the detection elements in the pixel may be assigned low amplification values during time windows corresponding to time of flights associated with the near object. Outside of those time windows, however, the amplification values of detection elements within the pixel may be increased. In addition to controlling detection element amplification levels, processor 118 may also control the allocation of detection elements to pixels. For example, processor 118 may assign different groups of detection elements to different pixels associated with sensor 116 such that a first pixel associated with a first object located at a first distance from the LIDAR system is assigned with fewer detection elements than a second pixel associated with a second object located at a second distance from the LIDAR system greater than the first distance.

As previously noted, in some cases, amplification parameter values may be set such that internally reflected light (e.g., light having very short times of flight) is highly attenuated or not detected. In other cases, however, low-amplification detection of an internally reflected light may be useful, such as in calibration of the system, for detection of internal blockages, etc. For example, internal reflection may be used to determine translation coefficients between different pixels associated with sensor 116 and to change detector parameters/amplification based on the result. For example, one of the parameters that can be controlled is timing (e.g. because the exact emission timing is not known, if one pixel is late with respect to others, the timing of the late pixel may be adjusted).

It is noted that the modification of amplification levels by processor 118 during time of flight may be executed together with other modifications of operational parameters of the LIDAR system. For example, processor 118 may control the modification of amplification levels (during time-of-flight of the light, or otherwise) together with controlling of the grouping of detection elements into different pixels, together with modifying the illumination levels emitted to different parts of the FOV, and so on. Especially, processor 118 may control the modification of amplification levels (during time-of-flight of the light, or otherwise) in an ROI of the FOV together with controlling of the grouping of detection elements into different pixels in the ROI, together with modifying the illumination levels emitted to the ROI, and so on. Such parallel modification of operational parameters of the LIDAR system may be executed by processor 118 to achieve a synergetic effect, to balance between different considerations (e.g. power requirements vs. detection requirements), or for any other reason.

FIG. 10 is a diagram illustrating one example of how the described time-dependent amplification techniques may be used to reduce or eliminate the effects of sensor blinding. As shown LIDAR system 100 may be included on a host vehicle (e.g., an autonomous or semi-autonomous vehicle) and may be mounted in any suitable location, such as in the vicinity of a front bumper of vehicle 1002. As shown, vehicle 1002 is traveling on a flat road 1004 and following behind another vehicle 1006. LIDAR system 100 may emit light pulses to the LIDAR FOV represented by the region within cone 1008.

As previously noted, an amplification scheme may be implemented for any relevant component in the light reception or processing path or for one or more detection elements associated with sensor 116. Graph 1010 illustrates an example of one such amplification scheme and shows how amplification may vary over time (e.g., within a time of flight of at least one light emission projected toward the FOV).

As shown in graph 1010, within a time window corresponding to a range of distances close to LIDAR system 100, amplification can be set to a low value (e.g., zero as shown by section 1012 of graph 1010). As described above, light having short flight times (e.g., reflected light detected within a range of about 0 to a few nanoseconds, a few tens of nanoseconds, etc.) may result from light being reflected from one or more components of LIDAR system 100, rather than from an object in an environment of the system. As shown in section 1012 of graph 1010, amplification within this time window may be set to zero or close to zero to reduce noise that may be generated by the detection of internally reflected light. At a predetermined distance from LIDAR system 100 (e.g., 5, 10, 25 meters, or more), amplification may be increased from zero to an amplification level suitable for generating depth maps of near-by objects, which tend to generate significant levels of reflected light incident upon sensor 116 as a result of their close proximity to sensor 116.

As shown in graph 1010, amplification levels may then progressively increase until reaching a section 1016. This progressive increase may increase sensitivity to light pulses with longer flight times that have traveled a longer distances between LIDAR system 100 and objects in the FOV from which they reflect and, therefore, which may be attenuated relative to light pulses with shorter flight times. As the distance from the light source increases, the corresponding amplification increase may account for energy lost by light travelling longer distances (e.g., due to angles of reflection from the target, due to absorption, etc.).

In this example, LIDAR system 100 may detect illuminated tail lights 1014 on the vehicle 1006. As a source of ambient light, tail lights 1014 may create unwanted interference. To reduce the noise resulting from tail lights 1014, processor 118 may reduce the amplification level within a time window corresponding to the expected range of flight times expected for light traveling from LIDAR system 100 to the tail lights and back. Section 1016 of graph 1010 shows the reduction of in amplification level during this time window. Such a reduction in amplification may be applied to one or more detection elements in sensor 116. Although the graph 1010 depicts an overall linear correlation between amplification and time, in some embodiments that relationship may be non-linear.

Figure 11:
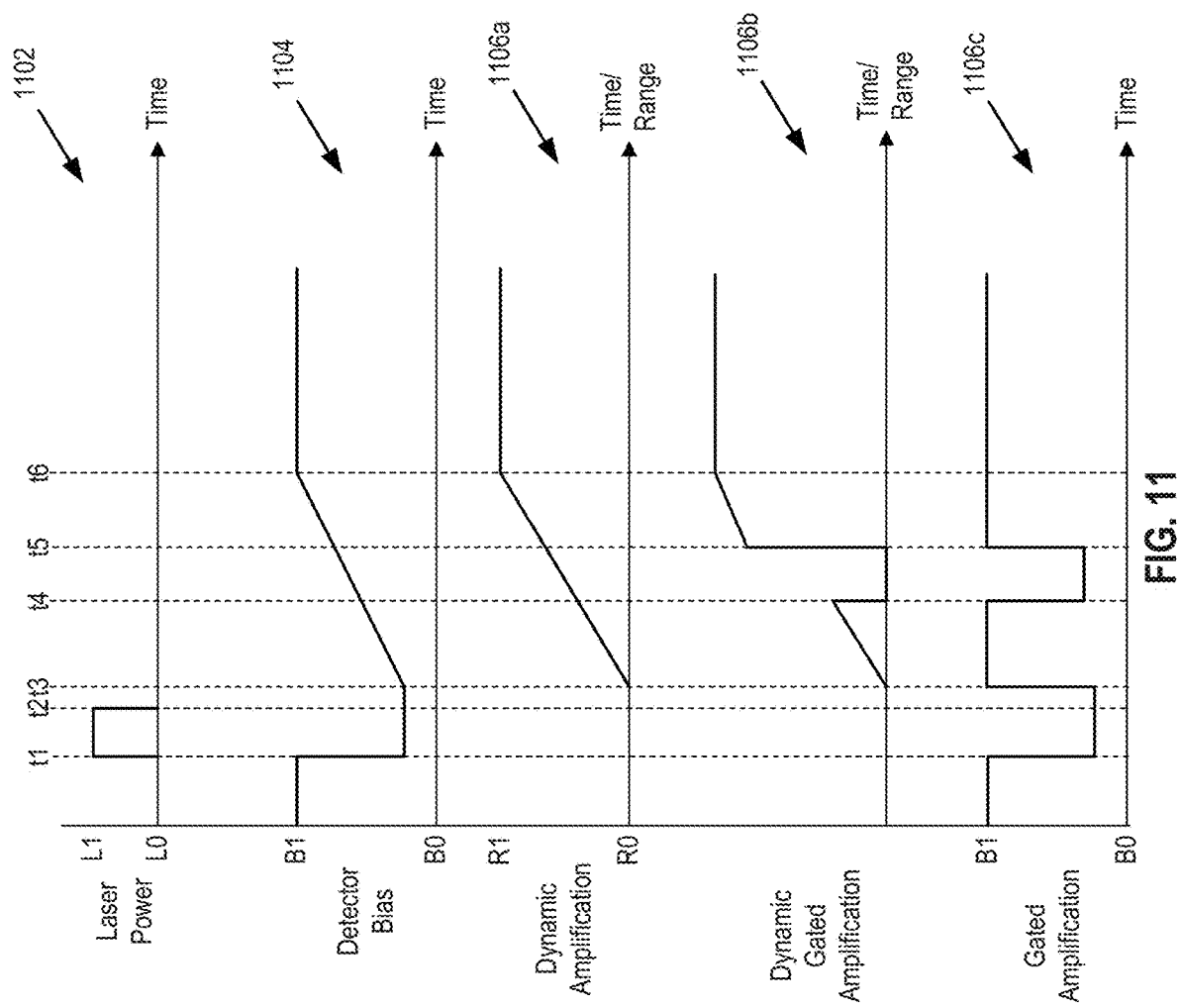
FIG. 11 includes four graphs illustrating dynamic sensitivity amplification as a function of time, consistent with disclosed embodiments.

FIG. 11 illustrates additional examples of how LIDAR system 100 may implement time dependent amplification to control detector sensitivity over time. The laser power graph 1102, indicates a pulse was emitted from a light source over the period of time between t1 and t2. During the time the pulse is emitted the detector bias may be reduced as shown in the detector bias graph 1104 such that the detector sensitivity is reduced to avoid sensing internal reflections during the pulse emission. In this example, the sensitivity in first exemplary amplification graph 1106a and second exemplary amplification graph 1106b are both zero from t1 to t2. Because internal reflections may also be received after pulse emission, the detector bias may be held at a low level until t3 to ensure no internal reflections are detected.

At t3 the detector bias may increase as initial pulse reflections are received. As previously discussed, the sensitivity may be increased to correspond to the energy of the reflected signal. Photons reaching the detector at t4 may have greater energy than photons reaching the detector at t6, meaning less signal amplification, or lower sensitivity, may be required to detect these photons with a short time of flight. Graph 1106a is an example of signal amplification as a function of time of flight, with no gating as described with reference to FIG. 10. In some embodiments, the detector bias and thus the signal amplification may be increased to a maximum amplification at t6.

Graph 1106b represents another example of amplification as a function of time, with a gate between t4 and t5. In this example, a reflective surface, for example, may be located in the field of view, reflecting the emitted pulse back to the detector at a high intensity. Here, the amplification may be decreased to zero for the illustrated time window between t4 and t5, when the high intensity photons are expected to arrive at the detector.

Graph 1106c represents another example of varying detection sensitivity over time. As shown, there are no sections of the profile for which amplification progressively changes as a function of time. There are, however, two time gates—one between times t1 and t3, and the other between times t4 and t5. In this example, a reflective surface, for example, may be located in the field of view, reflecting the emitted pulse back to the detector at a high intensity. Here, the amplification may be decreased to zero or to a lower level (as shown) for the illustrated time windows between times t1 and t3, and the other between times t4 and t5, when the high intensity photons are expected to arrive at the detector. As shown, the lower levels of amplification applied during the time windows need not have the same value in the available time windows, but rather may include different values, as shown.

Figure 12:
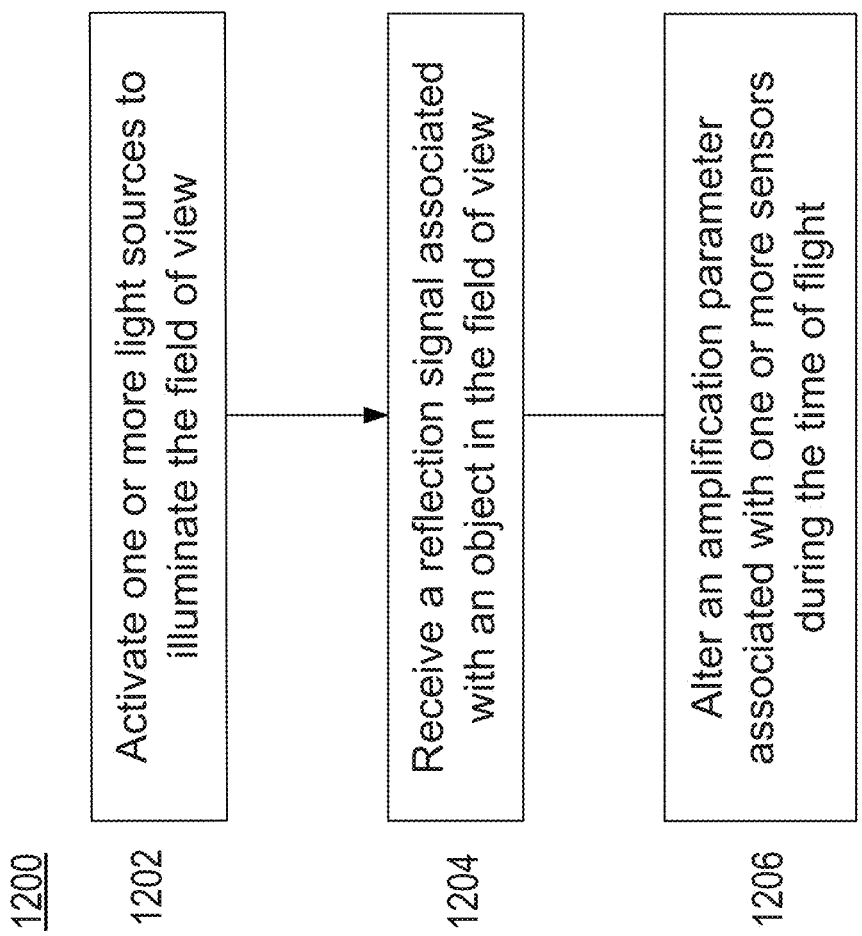
FIG. 12 is a flow chart of an exemplary process for dynamically modifying sensitivity amplification, consistent with disclosed embodiments.

FIG. 12 is a flow chart of an exemplary process 1200 for dynamically controlling the sensitivity of the detector, or sensor, during option of the LIDAR system. Initially, light may be emitted from one or more light sources (e.g., light source 112) to illuminate at least a part of the field of view (step 1202). In some embodiments the system may control one or more light deflectors to deflect light from the light source for scanning the field of view in a scanning pattern including two or more directions. The method may also include receiving from at least one sensor a reflection signal associated with an object in the field of view, wherein a time lapse between light leaving the at least one light source and reflection impinging on the least one sensor constitutes a time of flight (step 1204). During the time of flight of the emitted light, the system may alter one or more amplification parameters associated with one or more detectors or sensors (step 1206) or associated with one or more detection/reception paths. As noted, sensor 116 may include a plurality of detection elements, and altering the amplification parameter may include altering at least one amplification parameter associated with at least one detection element. Altering of the amplification level may include increasing amplification as a function of the time of flight. Altering of the amplification level may also include altering amplification levels of different detection element differently (both concurrently and non-concurrently) and altering amplification levels for different components of the reception path differently (both concurrently and non-concurrently).

During operation, processor 118 may obtain identification of at least one defective detection element. In response, processor 118 may dynamically alter at least one amplification parameter associated with a subset of the plurality of detection elements of sensor 116, such that the gain of the at least one defective detection element is substantially lower than a gain of other detection element of the sensor 116.

Varying Detection Sensitivity Between Detections in LIDAR Systems

As previously described, a LIDAR system, e.g., system 100, may include at least one processor, e.g., processor 118. The processor may activate one or more light sources, e.g., light source 112, to emit light toward a portion of the field of view. The LIDAR system may determine information about its surroundings based on the received reflections from the light emitted from the LIDAR system. For example, reflections received and registered by a sensor, e.g., sensor 116, may enable determination of information such as, for example, distance information relative to objects, object surfaces, portions of objects, road surfaces, or any other features experienced in an environment.

As LIDAR is a light-based technology, LIDAR systems may be susceptible to influences of external light sources, reflectance properties of objects in an environment of the LIDAR system, etc. For example, a LIDAR system may be susceptible to noise and/or other interferences from, for example, ambient light sources (street lights, tail lights, head lights, sun glare, etc.). Noise and other interferences may make detections and/or depth mapping difficult (e.g. by having a negative impact on signal to noise ratios). Additionally, one or more sensors of the LIDAR system may be blinded by light sources and/or highly reflective surfaces (reflective road signs, glass, water surfaces, license plates, close up objects, etc.). These light sources and/highly reflective surfaces may generate large light input to the sensor either through high reflection or from emitted light, both of which may lead to saturation of the sensor, i.e., sensor blinding.

To reduce or prevent unwanted effects of signal noise and/or blinding, as well as other interferences and other limiting factors, a processor may dynamically adjust one or more operational characteristics of a LIDAR system sensor. Such adjustment may be made based on known or observed information. For example, in some embodiments, processor 118 may gather information about the environment of a LIDAR system host and use this information to adjust parameters associated with one or more sensors, such as sensor 116. For example, the LIDAR system may emit light to its environment and monitor the reflections. Based on information obtained from the reflections, the processor may adjust sensor sensitivity, for example. The sensitivity adjustments may be made uniformly across all detection elements of the sensor. Alternatively, various different sensitivity levels may be applied across individual detection elements or groups of detection elements within sensor 116. In some embodiments, processor 118 may adjust sensor sensitivity for certain individual detection elements or groups of detection elements either during a current scan of a LIDAR system FOV or between scans of the LIDAR system FOV. Such adjustments may be based on observed light levels received from an environment of the LIDAR system at various regions of sensor 116. Such adjustments may also be based on any other suitable types of information (e.g., GPS location information, host vehicle navigation instructions, known or determined regions of interest within an FOV, etc.)

In some embodiments, the sensor may comprise discrete detection elements, including, for example, PIN diodes, SPADs, APDs, other types of photodiodes, or other photosensitive devices, etc.). Processor 118 may control the sensitivity of the detection elements using any suitable technique. In some embodiments, the sensitivity of a detection element may be adjusted by changing a gain level (e.g., amplification level, etc.) associated with the detection element.

As noted, processor 118 may adjust detection element sensitivity differently in different regions of the sensor. Certain regions of a LIDAR system FOV may be known to include or may be observed to include highly reflective objects/surfaces and/or regions determined to include external sources of light. In such cases, areas of sensor 116 that collect light from these high-light regions of the FOV may be designated with an amplification value intended to reduce the sensitivity of individual detection elements in these areas of the sensor. In contrast, other regions of a LIDAR system FOV may be known to include or may be observed to include low reflecting objects/surfaces and/or regions determined to be substantially free of external sources of light. In these instances, areas of sensor 116 that collect light from these low-light regions of the FOV may be designated with an amplification value intended to increase the sensitivity of individual detection elements in these areas of the sensor. By reducing sensitivity in certain areas of the sensor, the effects of saturation and/or blinding may be reduced or eliminated.

Processor 118 may have access to various types of controls for altering an amount of light available to certain regions of sensor 116 or for changing a sensitivity level of detection elements in certain areas of the sensor. For example, as noted above, sensitivity associated with one or more light detection elements within sensor 116 may be increased or decreased by adjusting gain levels associated with corresponding detection elements. Amplification/gain levels associated with one or more additional devices may also be used to change the sensitivity of sensor 116 or certain regions of sensor 116. For example, in some embodiments, sensitivity of sensor 116 may be controlled by altering one or more amplification parameters associated with one or more components at any point along the light reception/ processing path (e.g., analog amplifiers, analog-to-digital-converters (ADCs), time-to-digital-converters (TDCs), digital amplifiers, etc.).

In another example, the response of sensor 116 may be controlled by controlling the amount of light allowed to reach sensor 116 or certain regions of sensor 116. For example, one or more controllable filters or shutters may be employed to control an amount of light from the environment of the LIDAR system that is allowed to reach sensor 116 or certain regions of sensor 116.

Control of parameters affecting amplification and/or sensitivity of sensor 116 or regions of sensor 116 may be performed at any time during operation of LIDAR system 100. For example, in some embodiments, such control may be initiated during a current scan of the LIDAR system FOV (e.g., prior to completion of an ongoing scan). For example, as shown in FIG. 4B, a scan of a LIDAR system FOV 412 may involve the use of a movable light deflector 114 to direct light emissions (e.g., one or more light pulses) to certain regions of FOV 412 and to collect light reflections from those regions. For example, an instantaneous position of deflector 114 may enable directing of light toward second FOV 414 and collecting of reflected light from FOV 414. FOV 414, as shown, is a sub-region of the full FOV 412. As shown, sensor 116 may generate images from the reflections received from one or more light pulses delivered to each sub-region of FOV 412 (e.g., at each different instantaneous position of deflector 114) during scanning of the full FOV 412. As further noted, sensitivity levels of one or more detection elements within sensor 116 may be changed during the scan of FOV 412. For example, the detection elements of sensor 116 (e.g., a 5×4 arrangement of detection elements) may each be assigned a unique amplification value at the time that a light pulse is delivered to FOV 414. As a result, light reflections collected from FOV 414 may be processed according to these assigned amplification values. Each detection element may have a different amplification setting during collection of light reflected from FOV 414. Alternatively, groups of detection elements or all of the available detection elements may have the same amplification settings during collection of light reflected from FOV 414. Before collecting reflected light from the next sub-region of FOV 412 (e.g., just to the left of FOV 414, as shown in FIG. 4B), one or more amplification settings associated with any of the detection elements of sensor 116 may be changed. In some embodiments, processor 118 may change amplification and/or light sensitivity settings or other control parameter settings described herein within the time of flight of light to and from objects in the LIDAR FOV. Processor 118 may also change amplification and/or light sensitivity settings or other control parameter settings described herein between light pulses provided to the LIDAR FOV or to a particular portion of the FOV.

In other cases, the control of parameters affecting sensitivity of sensor 116 or regions of sensor 116 may be initiated between scans of the LIDAR system FOV. For example, after completing a scan of FOV 412 (e.g., acquiring images from each instantaneous position of deflector 114 such that collected images from the various sub-regions cover the FOV 412), processor 118 may alter an amplification setting of one or more detection elements associated with sensor 116. Such alteration may be performed before beginning the next scan of FOV 412 (e.g., prior to collecting an image of the sub-region located at the far upper right corner of FOV 412, as illustrated in FIG. 4B). Optionally, at least one processor of the LIDAR system may output point clouds (or other 3D models of the environment of the Lidar system) each of which may be generated from detection information collected while the amplification setting of each detection element is substantially constant. For example, this may be useful if the sensor of the LIDAR system is a large staring array which covers the entire FOV, or large parts thereof. Optionally, at least one processor of the LIDAR system may output point clouds (or other 3D models of the environment of the Lidar system) each of which may be generated from detection information collected while the amplification settings of different detection elements are modified by the controller, whether during the time-of-flight of a single pulse, between two pulses, or between two pixels. For example, this may be useful if the sensor is a relatively small sensor which scans the FOV (e.g. by means of a moving deflector).

As aforementioned, there may be cases where a LIDAR FOV scan may not include a moving light deflector to collect reflected light sequentially from different sub-regions of the LIDAR FOV. In some embodiments, the sensor of the LIDAR system may be used to image an entire LIDAR FOV during a single operation. For example, in flash-type LIDAR systems, one or more light pulses may be emitted to the FOV of the LIDAR system. In such embodiments, the sensor may collect reflected light from substantially the entire FOV of the LIDAR system, in response to the emitted one or more light pulses. The aforementioned sensor may include any suitable number of detection elements (e.g., tens, hundreds, thousands, millions or more) to provide desired resolution values. In such embodiments, a scan of the LIDAR FOV may include a single snapshot of the LIDAR FOV. Thus, the detection elements associated with the one or more sensors may have a first set of sensitivity levels during a first scan/snapshot. Before emitting subsequent light pulses to the LIDAR FOV (or before collecting reflected light at the sensor based on reflections from subsequent light pulses), one or more sensitivity values associated with one or more detection elements of the at least one sensor may be changed. Referring to flash-type LIDAR, and any other LIDAR systems which are not scanning or which otherwise differ from LIDAR system 100, it is noted that any variation of modification of amplification levels and/or sensitivity of the reception path (which includes the sensor and associated components) which is discussed with respect to LIDAR system 100 may also be implemented to other types of LIDAR systems (e.g. flash-type), mutatis mutandis, and that such implementations are part of the presently disclosed invention.

In operation, at least one processor (e.g. processor 118) of the LIDAR system may be configured to control activation of at least one light source (e.g. light source 112) to emit a first light emission directed toward a field of view (e.g., FOV 412 or 414 in FIG. 4B). The at least one processor may receive, from at least one sensor including one or more detection elements having a first amplification setting, data associated with one or more reflections of the first light emission from one or more objects in the field of view. The at least one processor may control activation of the at least one light source to emit a second light emission directed toward the field of view. During operation of the LIDAR system, the at least one processor may alter an amplification setting associated with the one or more detection elements of the at least one sensor (e.g. at least one sensor 116), to a second amplification setting, different from the first amplification setting. The at least one processor may receive, from the one or more detection elements of the sensor at the second amplification setting, data associated with one or more reflections of the second light emission from one or more objects in the field of view. Using this data (e.g., electrical signals associated with various characteristics of the received reflected light, including intensity, timing, etc.), the at least one processor (e.g. processor 118) may determine distances to objects (or to portions of objects or surfaces) in the field of view based on analysis of the data associated with the one or more reflections of the first light emission and the data associated with the one or more reflections of the second light emission. In some cases, the second amplification setting may be determined based one or more observed characteristics associated with reflections of the first light emission.

Several factors, alone or in combination, may trigger adjustments in sensitivity of the detection elements in one or more regions of sensor 116 or adjustments in light levels allowed to region one or more regions of sensor 116. For example, in some embodiments, processor 118 may determine an amplification setting based on factors such as the detection results of one or more preceding pulses in the same scanning cycle (whether in the same instantaneous direction or not); detection results from a previous FOV scanning cycle; definitions of regions of interest within an FOV; preexisting knowledge on ambient lighting levels, reflectivity levels, noise levels, etc.; or knowledge on likelihood of specific types of objects in different directions.

For example, based on observed detections (e.g., reflections acquired from particular regions of an FOV based on prior light pulses) or based on predetermined information (e.g., known or expected correlations between regions of an FOV and ranges to objects, surfaces, etc. within those FOV regions), processor 118 can change one or more control settings to change sensitivities of detection elements and/or to control light reaching sensor 116. In specific examples, shorter distances to an object in the FOV may favor lower sensitivity values for detection in order to avoid blinding from large numbers of reflected photons reaching the sensor. As range increases, however, amplification for relevant detection elements may be increased or filters, etc. may be controlled to allow higher reflected light flux to reach the sensor. Distances to objects in different parts of the FOV may be assessed based on previous detection results, on GPS information, maps, SLAM information (SLAM standing for Simultaneous Localization And Mapping), and so on.

The amplification may also be adjusted (e.g. by changing sensitivity or light transmission, as discussed above) based on observed or expected reflectivity levels associated with objects and/or surfaces in an environment of the LIDAR system host. Adjustment of the sensitivity may be based on observed or predicted reflectivity levels (e.g., higher sensitivity in areas of an FOV having low reflectance and lower sensitivity in areas of an FOV having higher reflectance).

Adjustment of the amplification may also be executed based on observed or predicted ambient light levels (e.g., higher sensitivity in areas of an FOV having low ambient light and lower sensitivity in areas of an FOV having higher levels of ambient light). High reflectivity levels and/or very bright ambient light may trigger the processor to lower the amplification of one or more detection elements, or even to zero the gain of one or more detection elements. Similarly, detected low reflectivity levels and/or dim ambient light may trigger the processor to increase the amplification of one or more detection elements of the sensor. In general, the sensitivity level may vary substantially inversely with respect to observed reflectance and/or ambient light. For example, in some embodiments, the LIDAR system may detect a specific source of ambient light in an FOV of the system and may downwardly adjust amplification levels associated with one or more detection elements in sensor 116 in areas of the sensor collecting light from the detected ambient light source. In some examples, processor 118 may determine the presence of vehicle tail lights or vehicle headlights in certain regions of an FOV and may reduce the sensitivity of one or more detection elements that collect light from those regions of the FOV. Similar adjustments may be made based on detected street lights, traffic lights, building lights, or any other source of ambient light.

Processor 118 may also cause adjustments in sensitivity of the detection elements in one or more regions of sensor 116 or adjustments in light levels allowed to region one or more regions of sensor 116 based on the establishment of a region of interest (ROI) in an FOV of LIDAR system 100. An ROI may be established, for example, in any region of an FOV in which there exists an object, surface, etc. for which information collection may be more important than at least one other region of the FOV. For example, LIDAR system 100 may detect vehicles, pedestrians, debris in a roadway, objects in a roadway, barriers at a road edge, traffic lights, obstacles, or any other type of object in the environment of the LIDAR system host. In turn, processor 118 may establish an area of an FOV where such objects or surfaces were previously detected or otherwise are expected to appear as an ROI. As a result, processor 118 may increase the amplification or sensitivity level associated with one or more detection elements in sensor 116 that collect light reflected from an ROI. ROIs may also be defined based on other considerations, such as importance of detection in those areas (e.g. in front of the vehicle vs. sideways from the vehicle), compensations for other type of sensors of the vehicle, and so on.

Detector element sensitivity (e.g., a term that may be used interchangeably with amplification) may also be adjusted based on location information. Based on map data, navigation instructions, and/or GPS sensor output, etc., processor 118 may adjust detection element sensitivity. For example, in addition to detecting sources of ambient light, such as street lights, traffic lights, buildings, etc., such fixed sources of light may be predicted to occur at certain regions within an FOV based on location information. Accordingly, detection element sensitivities may be adjusted even in the absence of a confirmed detection of such light sources. That is, sensitivities of one or more detection elements may be altered in expectation of features associated with an upcoming environment determined based on navigation instructions and map data, etc.

Blinding of the sensor by may be overcome by tuning an amplification parameter of one or more detection elements of a detector based on the expected intensity of the reflected pulses. The amplification parameter may include, for example, amplification, gain, etc. associated with detection elements of sensor 116. Certain detection elements may be assigned an amplification setting including an amplification parameter or sequence of amplification parameters. As previously described, each detector (e.g., sensor 116) may include one or more detection elements (e.g., detection element 402), and these detection elements may be allocated into one or more pixels associated with sensor 116. In some embodiments, different groups of detection elements may be assigned to different pixels such that the amplification parameters of detection elements corresponding to a particular pixel may all be adjusted similarly. As discussed above, the grouping of detection elements may be modified by the processor from time to time, and the amplification levels of the detection elements (and/or associated reception path) may optionally be modified in accordance with such grouping modifications.

The presently disclosed technique of adjusting detection element sensitivity may be useful in other circumstances as well. For example, processor 118 may detect the presence of one or more defective detection elements in sensor 116 (e.g., a detection element that provides a reflection signal significantly departing from signal levels of adjacent or surrounding detection elements). In such cases, processor 118 may respond by reducing the amplification associated with the one or more detection elements suspected of being defective.

As previously noted, the amplification parameters of each detection element may be controlled via the gain applied to the detection elements or by any component along the reflected light reception or processing path, such as: analog amplifiers, analog-to-digital-converters, digital amplifiers, etc. It should be noted that the gain need not be non-zero. In some cases, a reduction in gain may result in a zero gain being applied to one or more detection elements or other components, such that no appreciable signals are made available from the relevant detection elements or areas of sensor 116.

Figure 13:
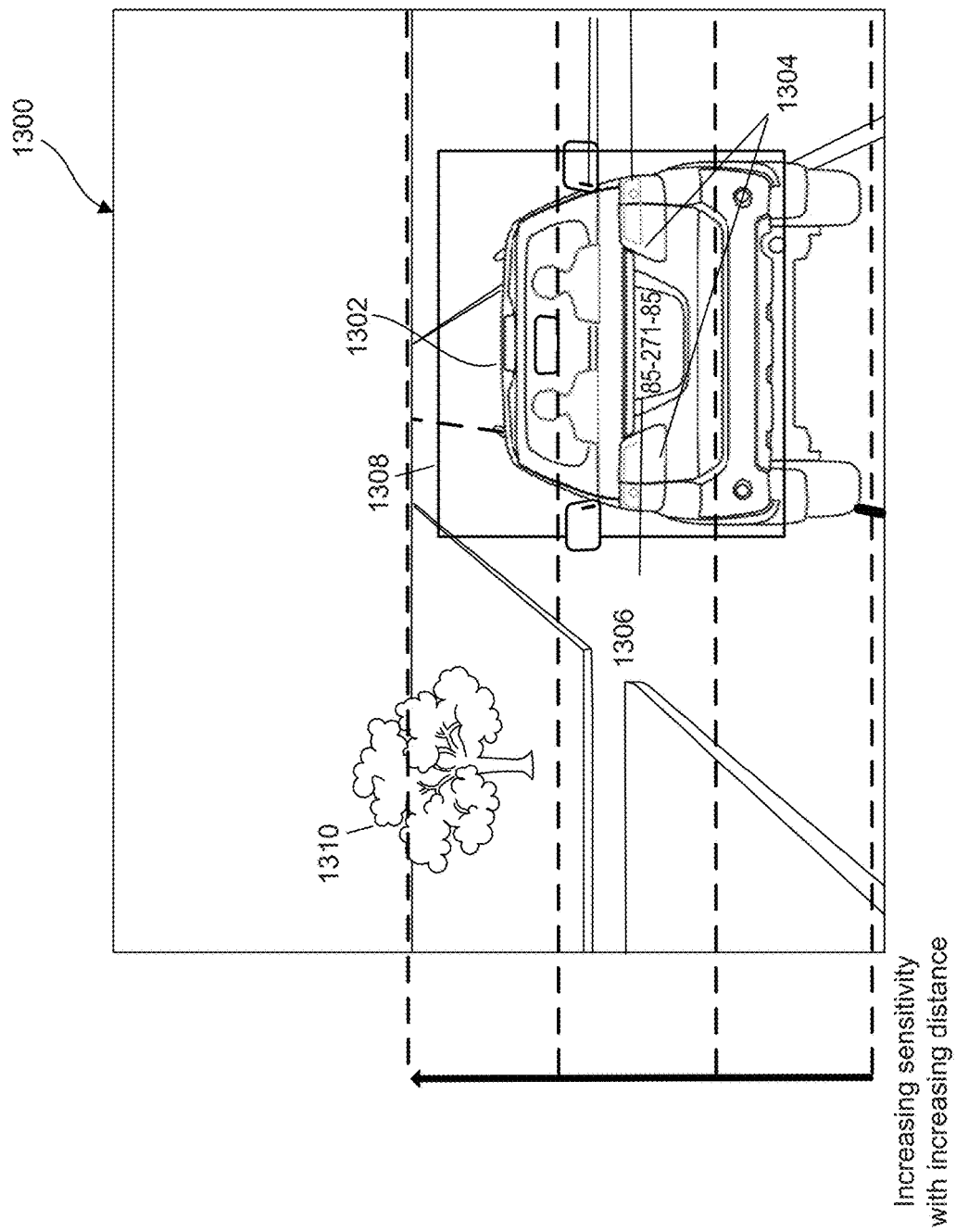
FIG. 13 is a diagram illustrating varying reflection amplification in the field of view, consistent with disclosed embodiments.

FIG. 13 is a diagram illustrating an example of how sensor sensitivity may be adjusted based on features of an encountered environment. A LIDAR system, such as LIDAR system 100, may have a field of view 1300, which may contain various objects, such as tree 1310, vehicle 1302, curbs, road surfaces, etc. Additionally, vehicle 1302 may include reflective and possibly illuminated tail lights 1304 and a highly reflective license plate 1306. During operation, processor 118 may adjust the sensitivity of detection elements that collect light from various regions of FOV 1300 in response to different features of the FOV. For example, in general, because objects or surfaces that are close to the LIDAR system may provide higher levels of reflected light than distant objects etc., processor 118 may lower the amplification of detection elements that collect light from regions of the FOV that include close range objects or surfaces. Processor 118 may progressively increase the amplification of detection elements that collect light from regions of the FOV that include more distant objects. The horizontal lines in FIG. 13 represent this progressive increase, for example, by denoting several gradations of amplification as distance to objects in the FOV increases or is expected to increase.

Once vehicle 1302 has been detected, processor 118 may designate a region of the FOV 1300, e.g., region 1308, as an ROI. While tree 1310 may be detected, it may not be designated as an ROI as it may be recognized as a stationary object and one that is not present in the roadway. Therefore, sensitivity changes may not be needed for detection elements that collect light reflected from the FOV in the area of tree 1310. Furthermore, sensitivities in this area 1310 may even be decreased. In some cases, amplification values associated with detection elements that collect light from the ROI may be increased over default levels. On the other hand, there may be cases where the amplification values associated with detection elements that collect light from the ROI may not be increased, but rather may be maintained at default levels or even reduced relative to default levels. Such cases may include, for example, where one or more objects present in the ROI are close to the LIDAR system or exhibit high reflectivity values. In these cases, increases in detection element sensitivities may result in undesirable blinding or saturation of the detection affected elements. Other objects that may justify an ROI and potential increases in detection element amplification/sensitivity may include the curbs along the sides of the roadway, any debris or obstacles detected in the roadway, pedestrians detected in the roadway or along sidewalks (especially pedestrians near the roadway that may be more likely than others to enter the roadway), the sidewalks, etc.

Sensitivity adjustments may be based on sub-regions within an ROI. For example, based on detection of tail lights 1304 and light levels emitted from those tail lights, processor 118 may reduce amplification values of detection elements that collect light from regions of the FOV including tail lights 1304 (or may otherwise cause filters, shutters, etc. to reduce reflected light levels incident on relevant detection elements). A similar treatment may also be applied relative to the region of the FOV that includes license plate 1306, as the license plate under certain conditions may reflect sufficient light to blind or at least negatively sensor 116.

It is noted that the modification of amplification levels by processor 118 with respect to parts of the sensor or of the entire sensor may be executed together with other modifications of operational parameters of the LIDAR system. For example, processor 118 may control the modification of amplification levels (during time-of-flight of the light, or otherwise) together with controlling of the grouping of detection elements into different pixels, together with modifying the illumination levels emitted to different parts of the FOV, and so on. Especially, processor 118 may control the modification of amplification levels (during time-of-flight of the light, or otherwise) in an ROI of the FOV together with controlling of the grouping of detection elements into different pixels in the ROI, together with modifying the illumination levels emitted to the ROI, and so on. Such parallel modification of operational parameters of the LIDAR system may be executed by processor 118 to achieve a synergetic effect, to balance between different considerations (e.g. power requirements vs. detection requirements), or for any other reason.

The methodologies described above, and particularly with respect to the example of FIG. 13, are applicable to scanning LIDAR systems in which sensor 116 overlaps with sub-regions of FOV 1300 at various times in order to scan the entire FOV. These described methodologies are also applicable to flash type LIDAR systems in which the sensor 116 is made to image larger portions of the FOV or even the entire FOV 1300 with each emitted light pulse.

FIG. 14 shows an exemplary arrangement of detection elements 1402 of a detector (e.g., in a flash-type or staring system), which may be applicable in a flash-type LIDAR system. Of course, similar principles discussed with respect to the example shown in FIG. 14 also apply to scanning type LIDAR systems (e.g., detector 116 for which the n×m array of detection elements sequentially collect reflected light from different sub-regions of the FOV of FIG. 14 in order to complete a full scan of the FOV). The primary difference would be that the array of detection elements in the scanning type system would be available for imaging each individually imaged sub-region of the full FOV as the full FOV is scanned (e.g., as in the technique illustrated in FIG. 4B). Returning to FIG. 14, the detector may have a plurality of detection elements 1402 arranged so as to cover different regions of the FOV, e.g., FOV 1400. For the clarity of the diagram and as an example only, a matrix of 6×8 detection element illustrated the different detection elements and the different regions of the FOV. In practice, a detector may have many more detection elements. The matrix of detection elements 1402 corresponds with the FOV, such that each detection element receives reflections from the associated portion of the FOV 1400. In an initial scan of the FOV (e.g., an initial flash of the FOV using one or more pulses of incident light provided to the FOV), each detection element may have an initial amplification setting. After the initial scanning cycle, based on the reflection signals received by sensor 116 at each of the available detection elements, processor 118 may alter the amplification level associated with one or more of the detection elements 1402 in the sensor.

In a subsequent scan of the FOV, one or more of the detection elements 1402 may each have a different amplification level than in a previous scan based on the received reflection signal from the FOV. For example, the amplification of detection elements mapped to the regions containing tail lights (elements (D, 4), (D, 5), (D, 6), and (D, 7)) may be lowered in response to prior detection of light emitted from those regions. Additionally, moving from bottom to top of FOV 1400 (in the vertical direction in FIG. 14), the amplification of the detection elements may be gradually increased, e.g., in order to account for the reduction in the number of photons of the incident light which reach the sensor.

FIG. 15 is a flow chart of an exemplary process 1500 for determining the distance to one or more objects in the field of view of a LIDAR system. Initially, a light source (e.g., light source 112) may be activated to emit a first light emission (e.g., a light pulse) toward the field of view (step 1502). In some embodiments, the first light emission may be one or more light pulses. In some embodiments the system may control one or more light deflectors to deflect light from the light source for scanning the field of view in a scanning pattern including two or more directions.

The first light emission may be reflected by an object in the field of view. Processor 118 may receive, from one or more sensors, data associated with the reflection from the object in the field of view (step 1504). Subsequently, the light source may be activated to emit a second light emission toward the field of view (step 1506). In some embodiments, the first and second light emissions may be emitted during the same scanning cycle. In other embodiments, the first and second light emissions are emitted in separate scanning cycles. In some embodiments the second light emission may be one or more light pulses. In some embodiments, the first and second light pulses may be directed towards different portions of the field of view. In other embodiments, the first and second light emissions may be directed toward the same region of the field of view (possibly within the same scan, while a movable deflector of the LIDAR system is in substantially the same instantaneous position, but not necessarily so).

In some embodiments, the second light emission includes more light pulses than the first light emission, or vice versa. In addition to increasing the amplification of the sensor, the processor may increase light to certain regions of the FOV by increasing the number of pulses to that region. Alternatively, in addition to increasing the amplification of the sensor, the processor may decrease light to certain regions of the FOV (e.g., the increase in amplification may partly compensate for reduction of illumination level). In other embodiments, the first and second light emissions may be different segments of a continuous light emission, which may be modulated. The processor may control activation of the light source such that the first light emission is associated with a light source parameter and the second light emission is associated with a different light source parameter. Light source parameters may include light flux, light intensity, power level, number of light pulses, etc.

After the first reflection is received, the amplification setting of the one or more sensors may be altered (e.g., increased or decreased) (step 1508). In some embodiments, the amplification setting may be adjusted based on the reflection data of the first light emission. For example, the amplification setting may be configured to increase or decrease the sensor sensitivity. The processor may alter the amplification setting of a subset of the detection elements included in the sensor. In some embodiments, based on the data received in step 1504, the light source may not emit a second light emission.

The second light emission may be reflected by another object or by the same object in the field of view. One or more sensors may receive data associated with the reflection of the second light emission from the object in the field of view (step 1510). Based on the received reflection data, a processor may determine the distance from the LIDAR system to the detected objects (step 1512). If, for example, two objects are detected in the field of view, the processor may determine two different distances to the objects by processing data received from the different portions of the field of view using the first and second amplification settings. In another example, two objects may be detected in the field of view and the processor may determine two different distances to the objects by processing data received from the same portion of the field of view using the first and second amplification settings. For example, the processor may calculate distance based on the time of flight of each light emission.

Optical Budget Apportionment

As described herein, one function of a LIDAR system may be to generate three-dimensional depth maps of an environment surrounding of the LIDAR system by projecting light to the environment and then collecting and analyzing light reflections from objects in the environment. In general, the usefulness of a LIDAR system and its depth maps may increase with the level of information that can be gleaned from the collected light and with the resolution of the generated depth maps. But, practical limitations may exist that may preclude the generation of higher resolution depth maps simply by ramping up the amount of light energy emitted to the environment by the LIDAR system. First, eye safety is a primary constraint that may limit an amount of light energy that can be output by the LIDAR. To ensure eye safety, and to comply with applicable regulations, a LIDAR system may be limited to light projections that do not exceed a certain energy density over a certain time period. Moreover, even if eye safety was not a concern, there may be other practical limitations that prohibit unmitigated light emission to the environment of the LIDAR. For example, the LIDAR system may have finite optical budget and/or computational budget that may limit the LIDAR system's ability to increase detection resolution simply through blanket increases in light emissions to the LIDAR FOV. Conceptually, the optical budget and computational budget may reflect maximum capabilities of the LIDAR system over a particular period of time in terms of available light output power and computing power. The LIDAR system may also be constrained by technical constrains such as power restrictions, overheating, output of the light sources, etc.

That is not to say, however, that depth maps generated by the LIDAR system must be restricted to an absolute resolution level over all areas of the LIDAR FOV. Rather, as discussed below and throughout the various sections of this disclosure, the optical budget and computational budget of a LIDAR system may be apportioned in such a way that more resources (e.g., more of the optical budget and/or computational budget) may be devoted to certain areas of the LIDAR FOV than to other areas of the LIDAR FOV. As a result, it may be possible to generate corresponding depth maps that have high resolution in some areas (e.g., areas corresponding to regions of interest) and lower resolution in other areas (e.g., regions of lower interest or non-interest). The description below and throughout many sections of the present disclosure addresses various scenarios, conditions, situations, etc. for which non-uniform apportionment of optical budget and/or computational budget may be desirable. The description below and throughout also provides examples for how the available optical budget and/or computational budget may be dynamically allocated in order to aid in the generation of depth maps potentially offering increased levels of information in one or more areas of interest covered by the depth maps.

Figure 16:
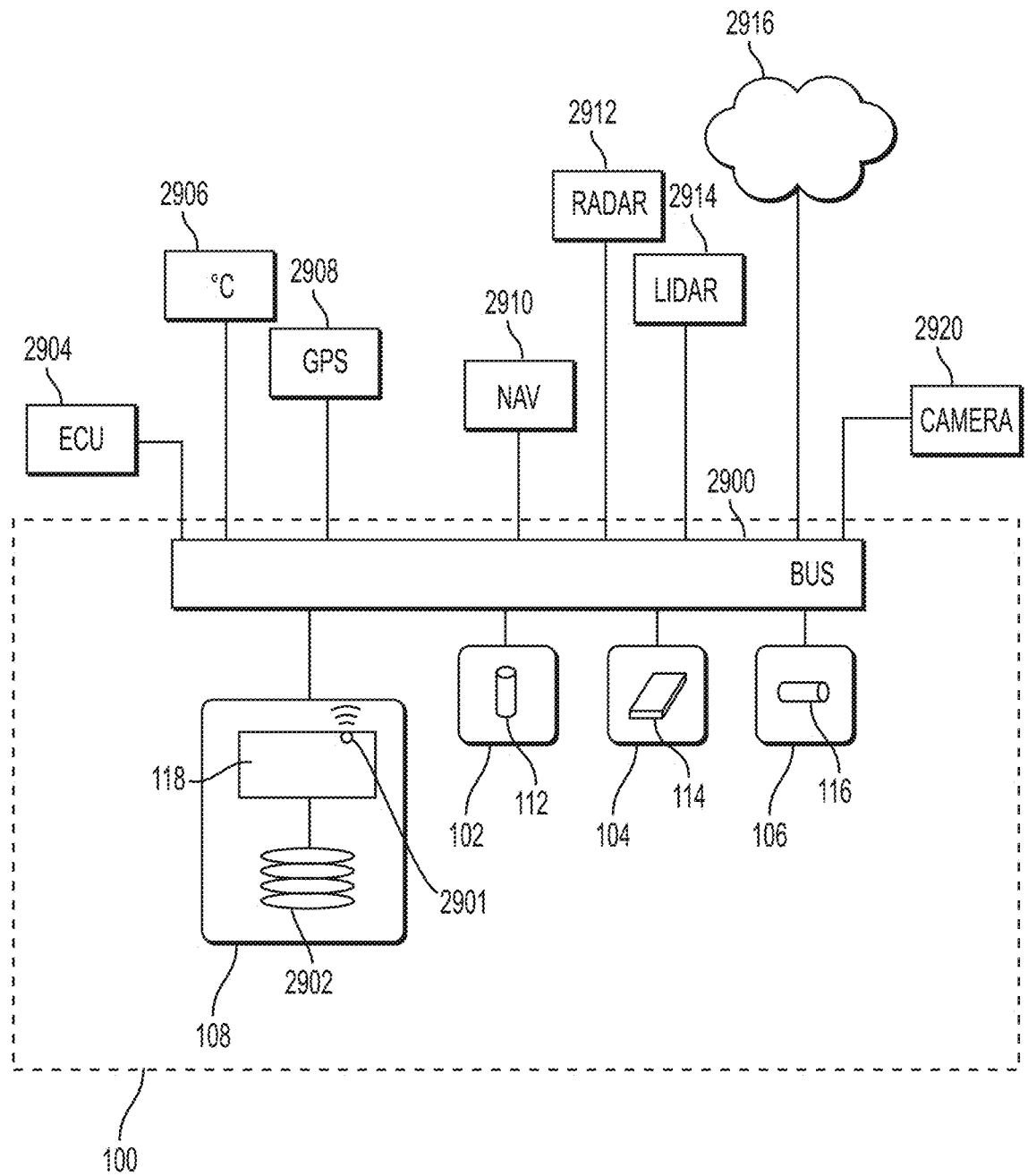
FIG. 16 provides a block diagram representation of a LIDAR system 100 along with various sources of information that LIDAR system 100 may rely upon in apportioning an available optical budget and/or computational budget.

FIG. 16 provides a block diagram representation of a LIDAR system 100 along with various sources of information that LIDAR system 100 may rely upon in apportioning an available optical budget and/or computational budget. In some embodiments, LIDAR system 100 may include at least one processor 118 configured to access an optical budget (or any information indicative of at least one aspect of an optical budget or from which an optical budget may be derived or determined) stored in memory 2902, the optical budget being associated with at least one light source 112 and defining an amount of light that is emittable in a predetermined time period by the at least one light source. Memory 2902 may be associated with processing unit 108 of LIDAR system 100, as shown in FIG. 16. In some embodiments, however, memory 2902 may be associated with a host (e.g., a vehicle, a vehicle-computer) on which LIDAR system 100 is deployed. For example, in some cases, memory 2902 may be associated with electronic control unit 2904 of a host vehicle and may be accessible by processor 118 over data bus 2900. In other embodiments, memory 2902 may be associated with a system or systems located remotely with respect to LIDAR system 100 (or its host). For example, in some embodiments, memory 2902 may be associated with a remote server (not shown) and may be accessible, e.g., via cloud 2916 (e.g., an Internet connection) or using a wireless transceiver 2901.

Processor 118 may also be configured to receive information indicative of a platform condition for the LIDAR system (e.g., from any of information sources 2904, 2906, 2908, 2910, 2912, 2914, 2916, 2918, 2920, or from any other suitable information source). A platform condition for the LIDAR system may refer to any operational parameter, parameter value, observed condition, instruction, informational item, etc., relating to one or more aspects of a LIDAR system, the environment surrounding the LIDAR system, the host on which the LIDAR system is deployed, etc. that may justify allocating more light to at least one group of LIDAR FOV portions or in one scanning cycle than is provided to another group of LIDAR FOV portions or in another scanning cycle over a particular period of time.

While the received information may be obtained from one or more sources outside of LIDAR system 100, information indicative of a platform condition for the LIDAR system may also include information obtained from sources internal to system 100 (e.g., via one or more components of the system, including light projector 112, deflector 114, detector 116, feedback elements, etc.). Based on the received information, processor 118 may dynamically apportion the optical budget to a field of view of LIDAR system 100 using, for example, two or more operational parameters associated with the light source 112 and/or deflector 114, including, for example, scanning rates, scanning patterns, scanning angles, spatial light distribution, and/or temporal light distribution. Processor 118 may further output signals for controlling light source 112 and/or deflector 114 in a manner enabling light flux to vary over scanning of the field of view of LIDAR system 100 in accordance with the dynamically apportioned optical budget.

An optical budget may be expressed relative to any parameter, value, or set of parameters or values related to an amount of light that can be emitted to a LIDAR FOV over a certain time period (e.g., in terms of LIDAR scanning cycles; time measurements in milliseconds, seconds, etc., or any other indicator of a time period). In some embodiments, an optical budget of a LIDAR system may depend on the capabilities of one or more light sources included in the LIDAR system. For example, an optical budget of LIDAR system 100 may be associated with light source 112 and may define an amount of light that is emittable in a predetermined time period by light source 112. Defining an amount of light may refer to any parameter or parameter relationship indicative of an amount of light (e.g., power, luminosity, light flux, intensity, number of photons, number of light pulses, duty cycle, pulse width, pulse amplitude, illumination duration, etc.) relative to some measure of time (e.g., microseconds, milliseconds, seconds, minutes, etc.).

In some cases, an average optical budget for light source 112 may be between about 10 milliwatts and 1,000 milliwatts. Additionally or alternatively, an optical budget may reference an amount of light emittable in a single scanning cycle of the LIDAR FOV. For example, an optical budget for LIDAR system 100 may be between 10,000 pulses per scanning cycle per light source and 50,000 pulses per scanning cycle per light source (e.g., for covering 1,000-10,000 beam locations, each associated with one or more pixels). In some embodiments, the optical budget may be expressed in terms of power available for use by light source 112 (e.g., from a vehicle or other host on which LIDAR system 100 is deployed). An optical budget may also be defined by an amount of light that is emittable by light source 112 (or any available light sources of system 100) in a standard unit of time (e.g., milliseconds, seconds, minutes, etc.).

In some cases, an optical budget may remain fixed. In other cases, an optical budget stored in memory 2902 may be modified and updated. Such modification may occur, for example, based on at least one of an operational parameter of the LIDAR system and detection information provided by the LIDAR system.

Additionally, in some embodiments an optical budget may correspond to only a single LIDAR system having a single light source. In other cases, an optical budget may refer to a single LIDAR system including a plurality of light sources. In still other cases, an optical budget may apply to a plurality of LIDAR systems deployed at different locations (e.g., at different locations around a vehicle), each including a single light source or a plurality of light sources. In any case, the optical budget may define an amount of emittable light available to be apportioned from a plurality of light sources (or plurality of LIDAR systems in the aggregate) in a predetermined time period. Processor 118 may dynamically apportion the optical budget of a single LIDAR system/light source. In other cases, processor 118 may dynamically apportion the optical budget associated with multiple light sources/LIDAR systems.

In addition to an optical budget, LIDAR system 100 (or a combination of a plurality of LIDAR systems) may have a computational budget that may be apportioned. The computational budget may refer generally to the processing capability of a LIDAR system or systems over a particular period of time. The processing capability may depend on the number of processors available (e.g., for controlling the various aspects of the LIDAR system, for receiving and processing detected reflections, for generating depth maps, for processing depth map for detecting object and other higher-level and scene-understanding information, and for performing any other function associated with a LIDAR system or group of LIDAR systems). The processing capability may depend not only on the number of processor available, but may also depend on other parameters such as the portion of processing capability of one or more processors that is dedicated to certain functions of the LIDAR system (e.g., generation of the depth maps, controlling scans of the FOV, object detection, identification and/or classification, etc.), the processing speed of one or more available processors, data transfer rates (e.g., across bus 2900), the number of calculations per unit time that can be performed by one or more available processors, etc.

While the description below includes details relating to apportionment of an optical budget, a computational budget may be apportioned in analogous ways to those described relative to optical budget apportionment. For example, in some cases a computational budget may pertain an amount of computational resources available to process point clouds in order to determine what the LIDAR has detected. In some cases, processing relating to the point clouds can require significant computing resources—a limited resource. Thus, in some cases, it may be desirable to determine whether certain areas may be of higher interest/importance than other areas for processing the associated point clouds. For example, much of the available processing power may be dedicated to processing point clouds and generating depth maps for a region in front of a vehicle, as that area may have the most importance, especially for a forward moving car. On the other hand, while still important, detections occurring in a field of view extending from the side of a vehicle, in some instances, may have less importance than the front of a vehicle (unless, for example, the vehicle is turning, stopped, etc.). In such cases, even if grouped detections have been detected by the LIDAR from reflections signal reflected from a highly reflective object located 130 meters away from the host vehicle, processor 118 may decide to only process the associated point cloud up to a distance of 40 m (or some distance less than 130 m) from the vehicle to conserve the computational budget (e.g., because it may be too costly from a computational standpoint to process the full point cloud including the grouped detections at 130 m, especially if the computational expenditure, as in this side-of-the-vehicle example, is not justified by the importance of the detected objects).

A computational budget may be apportioned not only among available LIDAR systems, such that one LIDAR system may be provided with more computation capability than another, for example, through dedication of the computational capacity of one or more centralized processors more to one LIDAR system than to another. In another example, the processors of two or more LIDAR systems may be aggregated/networked and the aggregate processing capabilities may be allocated such that a processor from one LIDAR system may be dedicated at least in part to computational tasks of different LIDAR system. For example, the processing capacity from a plurality of available LIDAR systems may be dedicated to computational tasks associated with a region forward of a host vehicle, a region where high resolution object detection and depth mapping may be desired.

A computational budget may also be apportioned relative to calculations associated with a particular LIDAR FOV such that computational tasks associated with one portion of the FOV may receive more of the computation budget than computational tasks associated with another portion of the FOV. Some examples of how a computation budget may be apportioned include, for example: detection/clustering (object level from point cloud points); tightening bounding boxes of objects ("bounding boxes"); classification of objects/object type; tracking of objects (e.g., between frames); determining object characteristics (e.g., size, direction, velocity, reflectivity, etc.). A computational budget may be expressed in terms that relate processing capacity to time (e.g., GMACs, Gflops, power, etc.). It is noted that the budget apportionment to different parts of the FOV—especially but not only computational budget—may refer to FOV portioning in 3D, and not just in 2D. For example, the computational budget may be allocated that for a given sector of the FOV (e.g. a given 1° by 0.5° sector), 70% of the computational budget is allocated for processing detections in ranges which exceeds 70 m, 30% of the computational budget is allocated for processing detections in ranges closer to the LIDAR than 40 m, and no computational budget is allocated for the ranges between 40 and 70 m.

Returning to the optical budget, an available optical budget may be apportioned in any manner enabling more light to be selectively provided to one group of LIDAR FOV portions than to another group of LIDAR FOV portions within a particular time period. In this context, a group of LIDAR FOV portions may refer to a one or more portions of a particular LIDAR FOV (e.g., one or more pixels, regions, sub-regions, etc. of a particular LIDAR FOV) or may refer to one or more full LIDAR FOVs (e.g., where an optical budget may apportioned across multiple LIDAR systems). References to more light may refer to increased light flux, increased light density, increased number of photons, etc., e.g., as exemplified above in greater detail.

In some cases, apportionment of the optical budget may be accomplished through variation of a scanning rate associated with a particular LIDAR FOV, a scanning pattern, a scanning angle, a spatial light distribution (e.g., providing more light to one or more groups of LIDAR FOV portions than to one or more other LIDAR FOV portions), and/or a temporal light distribution. Temporal light distribution may involve, e.g., controlling or otherwise changing light flux or an amount of light applied to groups of LIDAR FOV portions over time such that an overall amount of light projected in a first scanning cycle is higher than an overall amount of light projected in a second subsequent scanning cycle. In some cases, apportionment of an optical budget may be accomplished by varying two or more of: a scanning rate associated with a particular LIDAR FOV or a particular LIDAR FOV portion, a scanning pattern, a scanning angle, a spatial light distribution, or a temporal light distribution. Such variations may be made with respect to more than one LIDAR FOV, one LIDAR FOV, a portion of a LIDAR FOV (e.g., a region of interest), one scanning cycle, multiple scanning cycles, etc.

At least part of the dynamic apportionment of the optical budget (e.g., changing or updating an apportionment based on feedback or other information received relating to at least one platform condition for a LIDAR system) may be performed by determining a scanning rate for one or more LIDAR systems. For example, at least one processor may be configured to determine a scanning rate for at least one of: a near-field portion of a LIDAR FOV, a far-field portion of a field of view, a narrow-angle sector of a field of view, and/or a wide-angle sector of a field of view.

As noted, optical apportionment may also be accomplished, at least in part, by determining a scanning pattern for at least one scanning cycle of one or more LIDAR systems. The scanning pattern may be determined based on recognition of at least one of the following scenario types: driving on highways, driving off-road, driving in rain, driving in snow, driving in fog, driving in urban areas, driving in rural area, driving through a tunnel, driving in an area close to a predefined establishment, turning left, turning right, crossing a lane, approaching a junction, and approaching a crosswalk.

The optical budget apportionment may be accomplished by any suitable processor. In some cases, processor 118 of LIDAR system 100 may apportion an optical budget based on information from one or more sources. Alternatively, or additionally, processors from other LIDAR systems may be used to apportion an optical budget (e.g., an optical budget associated with a group of LIDAR systems) and/or one or more processors associated with a LIDAR system host (e.g., a vehicle ECU, etc.) may be used. Any other available processors may also be used to apportion an optical budget.

As noted, optical budget apportionment may result in more light being applied to one group of LIDAR FOV portions than to another. Such changes in applied light amounts, for example, may be achieved by varying a ratio of optical budget apportionment relative to a first light source within a plurality of light sources versus an optical budget apportionment relative to a second light source within the plurality of light sources (or a similar ratio between LIDAR detectors). Optical apportionment may also be applied for different reasons relative to different LIDAR FOV portions or at different times. For example, in some portions of a LIDAR FOV or at some times during a scanning cycle, optical apportionment may be directed to increasing resolution, detection quality, etc. n a particular FOV portion or in a particular time period. In other situations, optical apportionment may be directed to increasing detection detection range associated with a particular FOV portion, a particular FOV sub-region, or in a particular time period. In general, an optical/power budget may be used to achieve different goals in acquiring different frames or different portions of acquired frames. This way a LIDAR system may provide a series of useful or high quality frames for different ROIs, each being useful for different reasons. In this way, the optical budget may be expended in ways determined as having a high probability for returning useful information to the host platform (e.g., a navigational system of a vehicle).

Regarding controls, any suitable parameter or information element may be used in determining whether and/or how to apportion and optical budget. In some embodiments, a platform condition for the LIDAR system may be used as the basis for optical budget apportionment. As noted above, a platform condition for a LIDAR system may refer to any operational parameter, parameter value, observed condition, instruction, informational item, etc., relating to one or more aspects of a LIDAR system, the environment surrounding the LIDAR system, the host on which the LIDAR system is deployed, etc. that may justify providing more light to at least one group of LIDAR FOV portions or in one scanning cycle than is provided to another group of LIDAR FOV portions or in another scanning cycle over a particular period of time.

Such platform conditions for a LIDAR system may be determined in various ways and using any suitable source of information. In some cases, a platform condition of a LIDAR system may be determined internal to the LIDAR system. For example, based on acquired light reflections, reflectivity signatures, depth maps, etc., processor 118 may determine one or more characteristics associated with an environment in which the LIDAR system is deployed. In other cases, a platform condition for a LIDAR system (PCLS) may be determined based on information received from one or more sources separate from LIDAR system 100. For example, as shown in FIG. 16 a PCLS may be determined based on information from one or more of an electronic control unit 2904 of a host vehicle, one or more temperature sensors 2906, a GPS receiver 2908, a vehicle navigation system 2910, a RADAR unit 2912, one or more other LIDAR systems 2914, an Internet or other network connection 2916, a camera 2920, or any other suitable source.

In some cases, information indicative of a PCLS may establish one or more regions of a LIDAR FOV as a region of interest that may justify higher proportions of an optical or computational budget as compared to other regions (e.g., regions of less interest or non-interest). A region of interest may be identified based on a sensed current driving mode of a vehicle in which the LIDAR system is deployed, which may be determined based on one or more outputs of any of information sources 2904, 2906, 2908, 2910, 2912, 2914, 2916, 2920, or from LIDAR system 100, or any combination of these. In one example, a region of interest based on a sensed current driving mode may include a one or more portions of a LIDAR FOV overlapping an area that a host vehicle is turning toward (as conveyed by navigation system 2910, GPS receiver 2908, etc.). In another example, a region of interest may correspond to one or more portions of a LIDAR FOV in which LIDAR system 100 has detected an object, such as another vehicle, a pedestrian, obstacle, etc. Other examples of regions of interest and how such regions are identified are included in other sections of this disclosure.

Information indicative of a PLCS on which optical apportionment (or computational budget) may be determined may include, among other things, at least one of a vehicle operational parameter, an environmental condition, a driving decision, a navigational state of a vehicle, or a power management mode.

Examples of a vehicle operational parameter or a navigational state of a vehicle upon which optical apportionment (or computational budget) may be based may include current speed (e.g., from ECU 2904, GPS 2908), a current vehicle heading (e.g., from GPS 2908, navigation system 2910), a current braking or accelerating condition (e.g., from GPS 2908, ECU 2904), whether the host vehicle is navigating a cross-lane situation (e.g., from navigation system 2908, camera 2920, GPS 2908, etc.). Vehicle operational parameters may also relate to the condition or state of any components associated with a vehicle platform on which LIDAR system 100 is deployed or the condition or state of any components of LIDAR system 100 itself. Such conditions may include a temperature of at least one component of the LIDAR system, whether a portion of the FOV is blocked (e.g., by rain, mud, debris, etc.), whether a lens is scratched, whether deflector 114 is impeded from reaching certain instantaneous positions, whether more internal reflections exist at some angles compared to other angles. A navigational state of the vehicle may also include a position of the host vehicle relative to three-dimensional maps, partial maps, 2-D maps, landmarks, or any combination of map and landmarks, etc. Maps may be pre-stored, received via a communication channel, or generated (e.g. by SLAM).

Examples of an environmental condition may include at least one of a weather condition (e.g., rain, snow, fog, etc. determined based on information from camera 2920, cloud 2916, navigation system 2910); a lighting condition (e.g., determined based on information from LIDAR system 100 (ambient light, type of light source, etc.)); an environmental temperature (e.g., based on an output from temperature sensor 2906); and/or a proximity to a predefined type of establishment (e.g., a school as determined based on input from navigation system 2910, GPS 2908, camera 2920, etc.). Additional examples of environmental conditions upon which optical budget (or computational budget) apportionment may be based may include weather conditions, positions or distribution of detected objects in space (e.g., relative to LIDAR system 100 and/or a host vehicle), detected characteristics of objects in space (e.g. shape, reflectivity, characteristics affecting SNR), type/class of objects (e.g., pedestrian, building, vehicle, light post), a relative position of the sun or other light sources, a state of traffic (e.g., jammed vs. open highway), a state of other host vehicle systems (e.g., driving related or other sensors—in some cases LIDAR system 100 may compensate for a malfunctioning camera 2920), conditions of the road itself (e.g., bumpiness, roughness, going up/down, curving, its reflectivity), map/GPS based data (e.g., road location and orientation in the scene, building location and orientation in scene—(a region of lower interest may be established relative to a building or other obstacle, as LIDAR may not expect to receive reflections from objects on a far side of a building), ambient temperature around LIDAR system 100, ambient temperature of a host vehicle environment, data analysis from previous collected FOV frames (e.g., point clouds, normal to surfaces, reflectivity, confidence levels, etc.). In general, an optical/power budget may be allocated based on knowledge about the environment. For example, GPS data, map data, processed LIDAR information of previous frames, data from other sensors of the vehicle, or any other source may indicate a presence of a building in a part of the FOV, in a given range (e.g. 15 m). While that building may be in a region of high interest (e.g. directly in front of the vehicle), the processor may nevertheless allocate relatively low power to this part of the FOV and allocate the surplus energy to other portions of the LIDAR FOV, so as not to waste budget on parts of the FOV which are hidden behind the building (e.g. beyond 15 m), and cannot be reached, regardless of the amount of light which can be allocated to that direction in the FOV.

Examples of a driving decision upon which optical apportionment (or computational budget) may be based may include at least one of a rural-related indication, an urban-related indication, a current speed of a vehicle containing the LIDAR system, a next driving maneuver, a conditional driving maneuver (a maneuver that may be completed only in the presence of additional environmental information indicating it is safe to do so), a driving navigation event, a manual-driving indication, and an autonomous-driving indication. Such information may be acquired based on outputs provided, for example, by LIDAR system 100 or 2914, navigation system 2910, ECU 2904, GPS 2908, any combinations of those sources or other potential sources of an indicator of a PCLS.

Examples of a power management mode upon which optical apportionment (or computational budget) may be based may include at least one of an indication a normal power operation mode and a power saving mode. Such information may be obtained from ECU 2904, for example, and may reflect an amount of power available from the host vehicle. Other indicators of a power management mode may be based on a sensed condition of one or more components of LIDAR system 100 (e.g., whether any components are overheating or in danger of overheating).

Several examples may further illustrate the collection of a PCLS upon which optical or computation budget apportionment may be based. For example, during operation, processor 118 may receive input indicative of a current driving environment of the vehicle. For example, processor 118 may receive input that includes at least one of a rural-related indication and an urban-related indication. By way of further example, processor 118 may receive input that includes at least one rural-related indication, urban-related indication, information associated with a light condition, information associated a weather condition, and information associated with a velocity of the vehicle.

In some embodiments, processor 118 may receive the input from a determination performed by processor 118 itself. In such an example, processor 118 may determine the current driving environment based on information from one or more previous (and/or the current) scans of the field of view. For example, the processor may determine that the current driving environment is urban based on the presence of numerous vehicles and/or buildings in close proximity to the vehicle. By way of further example, the processor may determine that the current driving environment is rural based on the presence of numerous trees and/or open land. Processor 118 may alternatively or concurrently determine the current driving environment based on a speed of the vehicle and/or based on map information (which may be stored or received and may include updated traffic information). For example, processor 118 may determine that the current driving environment is an interstate or highway based on sustained, high speeds of the vehicle and/or based on a location of the vehicle aligning with a known interstate or highway. By way of further example, processor 118 may determine that the current driving environment is a traffic jam based on frequent stopping of the vehicle with sustained, low speeds and/or based on known traffic information.

Alternatively or concurrently, processor 118 may receive the input from a host vehicle processing unit (e.g., ECU 2904). The central computer may determine the current driving environment using the techniques described above with respect to processor 118. Similarly, processor 118 may additionally or alternatively receive the input from a remote system. For example, processor 118 may receive an indication of the weather from a weather server or other source of updated weather information. Similarly, processor 118 may receive an indication of the traffic from a traffic server or other source of updated traffic information.

In some embodiments, processor 118 may receive the input indicative of the current driving environment from at least one of a GPS, a vehicle navigation system, a vehicle controller, a radar, a LIDAR, and a camera, as shown in FIG. 16. For example, as explained above, processor 118 may use the vehicle's location as determined by the GPS and/or the vehicle navigation system in combination with maps and/or traffic information to derive the current driving environment. In such an example, processor 118 may align the vehicle's GPS location with a map to determine that the vehicle is on an interstate or may align the vehicle's GPS location with traffic information to determine that the vehicle is in a traffic jam. Similarly, processor 118 may use the speed, heading, or the like from the vehicle controller to derive the current driving environment, as explained above. Additionally or alternatively, processor 118 may use information from radar, LIDAR, and/or a camera to derive the current driving environment. For example, processor 118 may identify one or more objects using radar, LIDAR, and/or a camera, such as fields, trees, buildings, medians, or the like, and use the identified objects to derive the current driving environment.

Once the optical or computational budget has been allocated and a plan for applying the apportioned budgets, processor 118 (or other processing devices) may implement the plan. For example, processor 118 may output signals for controlling the at least one light source 112 and/or light deflector 114, or any other component affecting light flux (spatial or temporal) to a LIDAR FOV, in a manner enabling light flux to vary over scanning of the LIDAR FOV in accordance with the dynamically apportioned optical budget. In some cases, application of the apportioned optical budget may result in more light flux to certain portions (e.g., ROIs) of one or more LIDAR FOVs, which, in turn, may require reduced light flux to other areas (e.g., regions of lower interest or non-interest). To execute a plan for implementing an allocated optical budget, processor 118 may be configured to control the at least one light deflector 114 in order to scan the FOV, and during a scanning cycle the at least one light deflector 114 may be located in a plurality of different instantaneous positions. Further, processor 118 may coordinate the at least one light deflector 114 and the at least one light source 112 (e.g., synchronize their operation) such that when the at least one light deflector is located at a particular instantaneous position, a portion of a light beam is deflected by the at least one light deflector from the at least one light source towards an object in the field of view, and reflections of the portion of the light beam from the object are deflected by the at least one light deflector toward at least one sensor 116. In some cases, LIDAR system 100 may include a plurality of light sources aimed at the at least one light deflector 114, and processor 118 may be configured to control the at least one light deflector 114 such that when the at least one light deflector 114 is located at a particular instantaneous position, light from the plurality of light sources is projected towards a plurality of independent regions of the LIDAR FOV. Generally, processor 118 may coordinate the at least one light source 112 and the at least one light deflector 114 in accordance with the dynamically apportioned optical budget. More light per unit time may be applied to regions of higher interest, and less light per unit time may be applied to regions of lower interest through application of the apportioned optical budget. Moreover, based on detections of objects in one or more portions of a LIDAR FOV, processor 118 may prevent an accumulated energy density of light projected to the a particular portion (e.g., whether a region of interest or a region of less interest) to exceed a maximum permissible exposure.

Figure 17A:
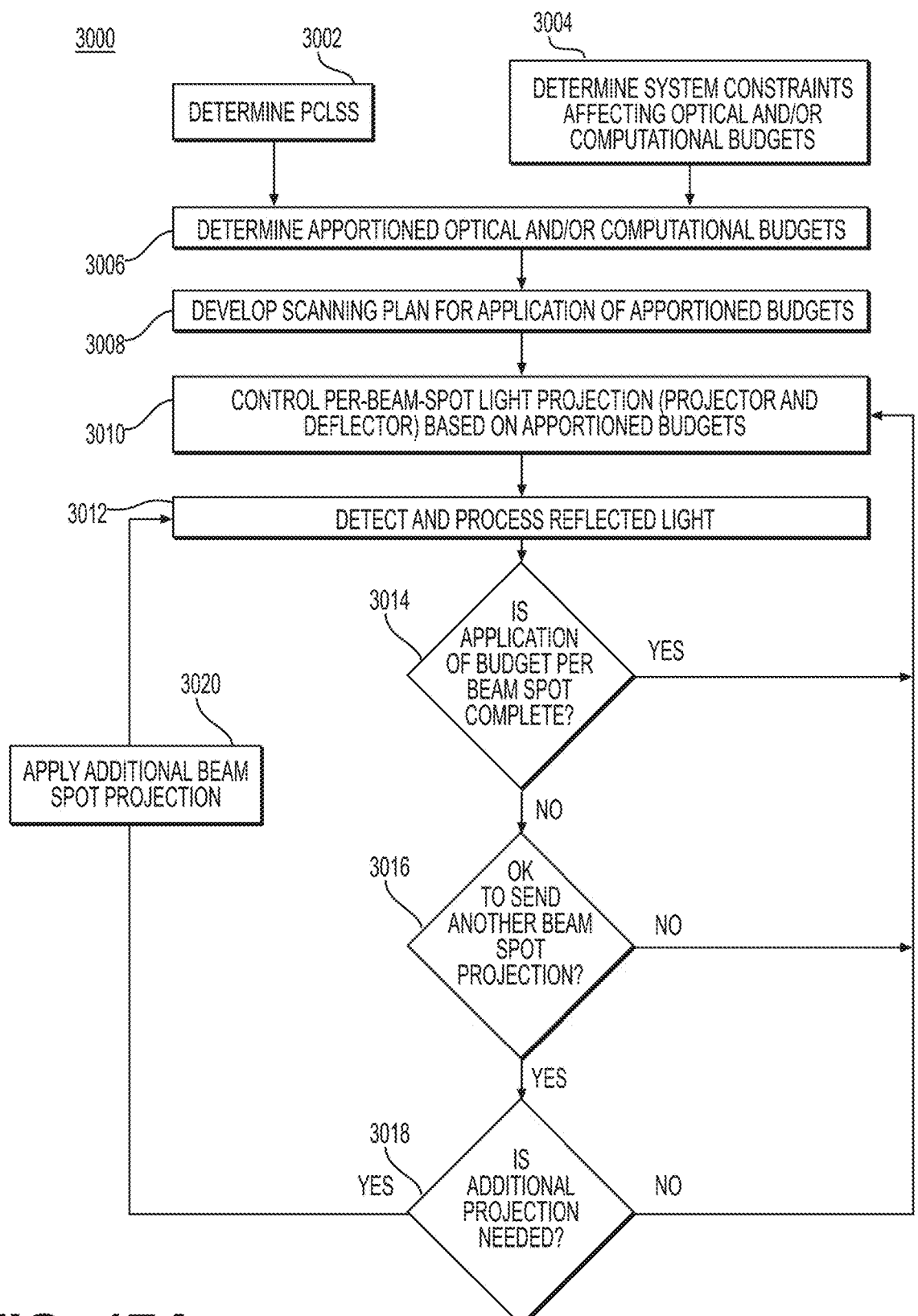
FIG. 17A provides a flow chart providing an example of a method 3000 for controlling a LIDAR system based on apportioned budgets consistent with the disclosed embodiments.

FIG. 17A provides a flow chart providing an example of a method 3000 for controlling a LIDAR system based on apportioned budgets consistent with the disclosed embodiments. For example, at step 3002, processor 118 (or other available processing devices) may receive information indicative of one or more platform conditions of the LIDAR system (PCLS). As described above, these PCLSs may include any conditions associated with the LIDAR system 100 or the platform host on which it is deployed for which a non-uniform light apportionment may be desired. At step 3004, processor 118 may determine system constraints that may in part aid in defining an optical or computational budget (e.g., light output capabilities of available light sources, processing capabilities of available CPUs, etc.). Based on the information acquired at steps 3002 and 3004, processor 118 may determine an apportioned optical budget and/or an apportioned computational budget at step 3006. At step 3008, processor 118 may develop a scanning plan for application of the apportioned budgets to the operation of one or more LIDAR systems. At step 3010, processor 118 may control the per-beam-spot light projection (e.g., light projection from a particular instantaneous position of deflector 114) by, for example, controlling the operation of light source 112 and deflector 114 based on the apportioned budgets. For example, more light flux per unit time may be provided to regions of interest than is applied to regions of less interest. At step 3012, processor may detect and process reflected light based on an output of detector 116, for example. At step 3014, processor 118 may determine whether a prescribed application of the apportioned optical budget for a particular beam spot is complete. If so, the process may return to step 3010 for continued control of light project at another beam spot. If not, then at step 3016, processor 118 may determine whether another beam spot projection is permissible (e.g., whether another projection would comply with eye safety regulations, whether a maximum permissible amount of light flux for a particular beam spot would be exceeded, etc.). If another projection is not permitted, the process may return to step 3010 for continued control of light project at another beam spot. If another projection is permitted, then at step 3018, processor 118 may determine whether another projection at the particular beam spot is needed (e.g., whether sufficient data or detections have already been obtained based on previous projections associated the particular beam spot or previously illuminated pixels). If an additional projection is not needed, the process may return to step 3010 for continued control of light project at another beam spot. Optionally, processor 118 may decide to redistribute the remaining unused power allocated to the present beam spot for at least one other beam-spot in the same scanning cycle. If an additional projection is warranted, then at step 3020, processor 118 may cause an additional light projection at the particular beam spot, before returning to step 3012 for detection and processing of reflected light.

Figure 17B:
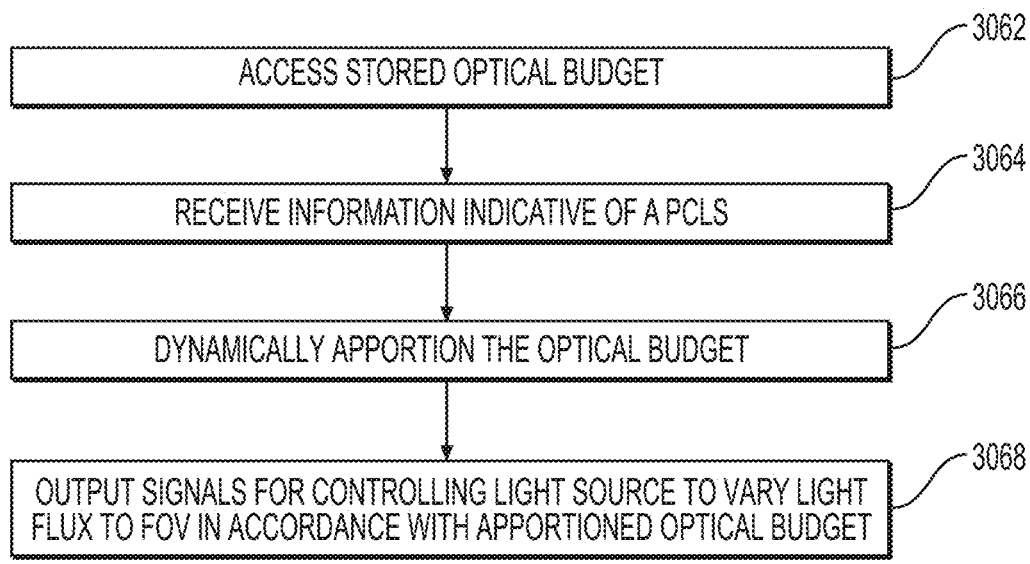
FIG. 17B provides a flow chart representation of an exemplary method for controlling a LIDAR system according to the presently disclosed embodiments.

FIG. 17B provides a flow chart representation of an exemplary method 3050 for controlling a LIDAR system according to the presently disclosed embodiments. Step 3062 may include accessing an optical budget stored in memory, the optical budget being associated with at least one light source and defining an amount of light that is emittable in a predetermined time period by the at least one light source. Step 3064 may include receiving information about a vehicle operational parameter, including at least one of: an environmental condition, a driving decision, and a power management mode. Based on the received information, step 3066 may include dynamically apportioning the optical budget to a field of view of the LIDAR system based on at least two of: scanning rates, scanning patterns, scanning angles, spatial light distribution, and temporal light distribution. Step 3068 may include outputting signals for controlling the at least one light source in a manner enabling light flux to vary over scanning of the field of view in accordance with the dynamically apportioned optical budget.

In some embodiments, dynamically apportioning the optical budget based on spatial light distribution may include projecting, during a single scanning cycle, more light towards a first portion of the field of view than towards a second portion of the field of view. In a following scanning cycle, dynamically apportioning the optical budget based on spatial light distribution may include projecting, during that following scanning cycle, more light towards the second portion of the field of view than towards the first portion of the field of view. The method may further include obtaining an identification of the first portion as a region of interest and an identification of the second portion as a region of non-interest (or lower interest). The method may also include determining an existence of an object in the second portion and preventing an accumulated energy density of the light in the second portion from exceeding a maximum permissible exposure.

In another example for how an apportioned optical budget may be applied during operation of a LIDAR system, processor 118 may be configured to apportion more of an optical budget (e.g., more flux/FOV) to a particular LIDAR system installed on a vehicle based a PCLS indicative of a failure of another LIDAR system on the same vehicle. Such apportionment may at least partly compensate for the failed LIDAR system. For example, the apportionment to the working LIDAR system may include emitting pulses to parts of that LIDAR's FOV where during normal operation no pulses (or few pulses) are usually sent. Such apportionment may also include changing deflector parameters in order to scan a wider FOV, for example.

To further illustrate this example, FIG. 18 provides a diagrammatic illustration of a vehicle including seven installed LIDAR systems positioned at different locations in the vehicle. Each individual LIDAR device may exhibit different parameters in terms of field of view, range, resolution, accuracy, etc. The installed LIDAR systems may be connected by a bus (e.g. CAN bus) that provides communication access between the systems and potentially other components as shown in FIG. 16. During operation, the various LIDAR devices may broadcast their operational parameters to one another as part of a capability exchange booting phase or on-demand status request. This exchange of information may enable the processor of another LIDAR system, such as LIDAR system #7 to recognize that LIDAR system #2 has failed (e.g., based on received error messages, health status indicators, etc.). In some cases, a faulty device on the bus may not be able to report (for example it lost its power supply). In that case the non-reporting system is no longer connected to the shared bus and is assumed to be failed.

One or more other LIDAR systems may take an action to at least partially compensate for the failed LIDAR device. For example, as shown in FIG. 18, failure of LIDAR system #2 may result in a blind spot for the vehicle sensory system. A monitoring layer in HW or FW (main controller or a designated master LiDAR device connected to the bus) would detect that LiDAR #2 is non-functional and would designate another LiDAR in the system to compensate for loss of coverage. In this specific example LiDAR #7 was found to be the best choice for compensating the loss of coverage, given its extended capabilities. LiDAR #7 is designated to operate in a backup mode and extend its field of view in order to cover up for LIDAR #2 field of view. Increasing the scanning range of LiDAR #7 may occur at the expense of some of its capabilities, decreased total range, resolution or frame rate. The full system at the level of the vehicle main controller would be notified of the updated sensors state with a reduced set of performance parameters and compensate for the vehicle behavior. Similar to a narrow spare tire that limits the vehicle to 80 Km/h, the vehicle might be limited at top speed. The compensation of faulty sensors is ultimately driven by the need of an autonomous vehicle to maintain a minimum autonomic level in order to be able to safely reach a service location without human intervention.

It is noted that optionally, computational resources may be shared by a plurality of sensors of two or more types (e.g. LIDAR, camera, ultrasound sensor, radar) or allocated to the processing of detection information arriving from sensors of different types. This may be implemented, for example, by a host computer which integrates information from different sensors in a vehicle, such as an autonomous car. The methods and processes disclosed above for apportionment of computational budget (e.g. method 3000) may be extended may to apportion computational budget between processing information collected by sensors of different types. Optionally, this may be further extended to allocate the computational budget differently between FOV portion of each sensor out of a plurality of sensors of different types, while also shifting computational resources between the different types of detection data, based on various parameters, such as platform condition of the vehicle, or any system installed in it. Such parameter may include, for example, any combination of one or more of the following: vehicle operational parameter, an environmental condition, a driving decision, a navigational state of a vehicle, or a power management mode, system parameter of one or more detection system (such as LIDAR, radar, etc.). It is that the apportionment of computational budget for processing of a first sensor of a first type may be based on the processing of another sensor of another type.

For example, if a camera detected a suspected object in one of its ROI, the apportioning processor may apportion more of the LIDAR computational budget for processing of detection information from that of the FOV, on the expense of processing LIDAR detection information from other parts of the FOV. In another example, the apportioning processor may apportion the computational budget based on detection results and/or platform parameters such that some parts of the FOV (which can of course be defined in 3D, not just in 2D) would be primarily analyzed using detection information from a first type of sensors, while others parts of the FOV would primarily be analyzed using detection information from a second type of sensors. In yet more advanced allocation scheme, the host (or another processor) may also shift power allocation between sensors of different types, e.g., based on any one of the previously disclosed parameters, and according to any one of the aforementioned considerations, mutatis mutandis.

It is noted that many of the methods, processes and techniques for a LIDAR system which are discussed throughout the disclosure, when taken considered together with method 3000 (and with the entire discussion of budget apportionment), can be a part of a wider budget apportionment scheme, which combines any two or more of the disclosed methods, processes and techniques. Such methods, processes and techniques may fit to different places in the disclosed budget allocation scheme. For example, some of these methods, processes and techniques may be used to as determining factors by which to allocate the budget to different portions of the FOV; some of these methods, processes and techniques may be used to as determining factors by which to restrict allocation of the budget to different portions of the FOV; some of these methods, processes and techniques may be used for making use of the budget allocated to different portions of the FOV, and so on.

According to some embodiments, a LIDAR system 100 may include:

a. A photonic emitter assembly (PTX) such as projection unit 102 (or a part thereof), to produce pulses of inspection photons wherein the pulses are characterized by at least one pulse parameter;
b. A photonic reception and detection assembly (PRX) to receive reflected photons reflected back from an object, the PRX including a detector (e.g. detector 116) to detect the reflected photons and to produce a detected scene signal (e.g. by processor 118). The photonic reception and detection assembly may include sensing unit 106 (or a part thereof) and processing unit 108 (or a part thereof);
c. A photonic steering assembly (PSY) such as scanning unit 104 (or a part thereof) functionally associated with both the PTX and the PRX to direct the pulses of inspection photons in a direction of an inspected scene segment and to steer the reflection photons back to the PRX; and
d. a closed loop controller (herein below also "controller") which may be implemented by processing unit 108 (or a part thereof, such as at least one processor 118), to: (a) control the PTX, PRX and PSY, (b) receive the detected scene signal from the detector and (c) update the at least one pulse parameter at least partially based on the detected scene signal.

According to some embodiments, at least one pulse parameter may be selected from the following group: pulse power intensity, pulse width, pulse repetition rate pulse sequence, pulse duty cycle, wavelength, phase and/or polarization.

According to some embodiments, the controller may include a situational assessment unit to receive the detected scene signal and produce a scanning/work plan. The work plan may include some or all of a determined budget allocation, and may also include additional operational decisions (e.g., scanning pattern). The situational assessment unit may receive a photonic steering assembly feedback from the photonic steering assembly. The situational assessment unit may receive information stored on a memory. Optionally, the information may be selected from the following list: laser power budget (or any other form of optical budget), electrical operational characteristics and/or calibration data. The situational assessment unit may use the photonic steering assembly feedback to produce the scanning/work plan. The optical budget (e.g. laser power budget) may be derived from constraints such as: eye safety limitations, thermal budget, laser aging over time and more.

According to some embodiments, the work plan may be produced based on (a) real-time detected scene signal (b) intra-frame level scene signal and (c) interframe level scene signal accumulated and analyzed over two or more frames.

According to some embodiments, the detector may be a dynamic detector having one or more detector parameters and the closed loop controller may update the detector parameters based on the work plan. The detector parameters may be selected from the following group: scanning direction, frame rate, sampling rate, ambient light effects, mechanical static and dynamic impairments, dynamic gating for reducing parasitic light, dynamic sensitivity, dynamic bias, and/or thermal effects. The PSY may have one or more steering parameters and the closed loop controller may update the steering based on the work plan. The steering parameters may be selected from the following group: scanning method, power modulation, single or multiple axis methods, synchronization components. Optionally, the situational assessment unit may receive a host-feedback from a host device and use the host feedback to produce or contribute to the work plan.

According to some embodiments, processor 118 may include situational assessment logic or circuitry such as situational assessment logic (SAL). The SAL may receive detected scene signals from detector 116 as well as information from additional blocks/elements either internal or external to scanning unit 104.

According to some embodiments, the scene signal may be assessed and calculated with or without additional feedback signals such as a photonic steering assembly feedback PTX feedback, PRX feedback and host feedback and information stored in memory 2902 in a weighted means of local and global cost functions that determine a scanning/work plan such as a work plan signal for scanning unit 104 (such as: which pixels in the FOV are scanned, at which laser parameters budget, at which detector parameters budget). Accordingly, processor 118 may be a closed loop dynamic controller that receives system feedback and updates the system's operation based on that feedback. The scanning work plan, for example, may be developed for implementing an apportioned optical or computational budget.

According to some embodiments, there may be provided a scanning unit 104 for scanning one or more segments of a scene, also referred to as scene segments. The device may include one or more photonic emitter assemblies (PTX), one or more photonic reception and detection assemblies (PRX), a photonic steering assembly (PSY) and a situationally aware processor adapted to synchronize operation of the PTX, PRX and PSY, such that the device may dynamically perform active scanning of one or more scene segments, or regions, of a scene during a scanning frame. Active scanning, may include transmission of one or more photonic inspection pulses towards and across a scene segment, and when a scene element present within the scene segment is hit by an inspection pulse, measuring a roundtrip time-of-flight for the pulse to hit the element and its reflections to return, in order to estimate a distance and a (relative) three dimensional coordinate of point hit by the inspection pulse on the scene element. By collecting coordinates for a set of points on an element, using a set of inspection pulses, a three dimensional point cloud may be generated and used to detect, register and possibly identify the scene element.

Processor 118 may be a situationally aware controller and may dynamically adjust the operational mode and operational parameters of the PTX, PRX and/or PSY based on one or more detected and/or otherwise known scene related situational parameters. According to some embodiments, processor 118 may generate and/or adjust a work plan such as a scanning plan for scanning portions of a scene to implement an apportioned optical or computational budget, as part of a scanning frame intended to scan/cover one or more segments of the scene, based on an understanding of situational parameters such as scene elements present within the one or more scene segment. Other situational parameters which may be factored in generating the scanning plan may include a location and/or a trajectory of a host platform carrying a device according to embodiments. Yet further situational parameters which may be factored in generating the scanning plan may include a topography, include road slope, pitch and curvature, surrounding a host platform carrying a device according to embodiments.

The scanning plan may include: (a) a designation of scene segments within the scene to be actively scanned as part of a scanning frame, (b) an inspection pulse set scheme (PSS) which may define a pulse distribution pattern and/or individual pulse characteristics of a set of inspection pulses used to scan at least one of the scene segments, (c) a detection scheme which may define a detector sensitivity or responsivity pattern, (d) a steering scheme which may define a steering direction, frequency, designate idle elements within a steering array and more. In other words, the scanning plan may at least partially affect/determine a PTX control signal, steering parameters control, PRX control, and/or detector control parameters so that a scanning frame is actively scanned based on scene analysis and the apportioned optical and/or computational budgets.

The discussion below provides additional examples of controlling one or more scans of a LIDAR FOV based on determined optical and/or computational budgets. For example, based on a current detected or inferred driving environment, processor 118 may coordinate the control of the at least one light source with the control of the at least one light deflector to dynamically adjust an instantaneous detection distance by varying an amount of an optical budget spatially applied across a scan of the field of view. For example, processor 118 may increase the amount of light projected and/or decrease the spatial distribution of light to increase the instantaneous detection distance in certain regions of the FOV (regions of interest). By way of further example, processor 118 may decrease the amount of light projected and/or increase the spatial distribution of light to decrease the instantaneous detection distance in other regions of the FOV (regions of lower interest).

It should be noted that the optical budget apportionment concepts and techniques described above may be used in conjunction with any other embodiments described herein. For example, the present disclosure also discusses techniques for varying detection sensitivity between detections in LIDAR systems, varying detection sensitivity during the time of flight of light emitted by the LIDAR system, and dynamically allocating detection elements to pixels in LIDAR systems. The optical budget apportionment techniques may be used together with any of these other LIDAR system controls. Moreover, any of the disclosed LIDAR system controls can be used with any other LIDAR system controls. For example, techniques for varying detection sensitivity between detections in LIDAR systems may be used together with the described techniques for varying detection sensitivity during the time of flight of light emitted by the LIDAR system, and dynamically allocating detection elements to pixels in LIDAR systems. Similarly, the described techniques for varying detection sensitivity during the time of flight of light emitted by the LIDAR system may be used together with the described techniques for dynamically allocating detection elements to pixels in LIDAR systems.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system, comprising:
   at least one processor configured to:
      control activation of at least one light source to emit a first light emission directed toward a field of view;
      receive, from at least one sensor at a first amplification setting, data associated with one or more reflections of the first light emission from one or more objects in the field of view;
      control activation of the at least one light source to emit a second light emission directed toward the field of view;
      alter an amplification setting associated with the at least one sensor, to a second amplification setting, different from the first amplification setting;
      receive, from the at least at the second amplification setting, data associated with one or more reflections of the second light emission from one or more objects in the field of view; and
      determine distances to objects in the field of view based on analysis of the data associated with the one or more reflections of the first light emission and the data associated with the one or more reflections of the second light emission,
      wherein the first light emission and the second light emission are directed toward different portions of the field of view, and the at least one processor is further configured to determine two different distances to two different objects in the field of view by processing data received from the different portions of the field of view using the first and second amplification settings.

2. The LIDAR system of claim 1, wherein the at least one processor is further configured to determine distances to the objects in the field of view based on time of flight of at least the first and second light emissions.

3. The LIDAR system of claim 1, wherein the first light emission includes at least one light pulse and the second signal includes at least one other light emission.

4. The LIDAR system of claim 1, wherein the first light emission includes a first plurality of light pulses, and the second light emission includes a second plurality of light pulses including more light pulses than the first plurality of light pulses.

5. The LIDAR system of claim 1, wherein the at least one processor is further configured to control activation of the at least one light source such that the first light emission is associated with a first light source parameter and the second light emission is associated with a second light source parameter.

6. The LIDAR system of claim 1, wherein the first light emission and the second light emission are each portions of a continuous light emission.

7. The LIDAR system of claim 6, wherein the continuous light emission is modulated.

8. The LIDAR system of claim 1, wherein the at least one processor is further configured to control at least one light deflector to deflect light from the at least one light source for scanning the field of view, and wherein the first light emission and the second light emission are emitted in a single scanning cycle.

9. The LIDAR system of claim 1, wherein the at least one processor is further configured to control at least one light deflector to deflect light from the at least one light source for scanning the field of view, and wherein the first light emission is emitted in a first scanning cycle and the second light emission is emitted in a second subsequent scanning cycle.

10. The LIDAR system of claim 1, wherein the at least one sensor includes a plurality of detection elements and the at least one processor is further configured to obtain an identification of a defective detection element and to apply the second amplification setting with respect to the defective detection element.

11. The LIDAR system of claim 1, wherein the at least one sensor includes a plurality of detection elements and the at least one processor is further configured to obtain an identification of a defective detection direction element of the at least one sensor and to apply the second amplification setting to the defective detection-direction element.

12. The LIDAR system of claim 1, wherein the at least one processor is further configured to process the data associated with the one or more reflections of the first light emission and, based on the data, determine whether to emit the second light emission.

13. The LIDAR system of claim 1, wherein the at least one processor is further configured to process the data associated with the one or more reflections of the first light emission and, based on the data, determine the second amplification setting.

14. The LIDAR system of claim 1, wherein the first light emission is emitted in a first scanning cycle, and the second light emission is emitted in a second subsequent scanning cycle, and wherein the at least one processor is further configured to determine the second amplification setting such that in the second subsequent scanning cycle, the at least one sensor is associated with a higher sensitivity than in the first scanning cycle.

15. The LIDAR system according to claim 1, wherein the at least one sensor includes a plurality of detection elements, and wherein the at least one processor is further configured to:
receive from the at least one sensor reflections signals indicative of light reflected from objects in the field of view;
dynamically allocate a first subset of the plurality of detection elements to constitute a first pixel;
dynamically allocate a second subset of the plurality of detection elements to constitute a second pixel;
following processing of the first pixel and the second pixel, dynamically allocate a third subset of the plurality of detection elements to constitute a third pixel, the third subset overlapping with at least one of the first subset and the second subset, and differing from each of the first subset and the second subset; and
following processing of the first pixel and the second pixel, dynamically allocate a fourth subset of the plurality of detection elements to constitute a fourth pixel, the fourth subset overlapping with at least one of the first subset, the second subset, and the third subset, and differing from each of the first subset, the second subset, and the third subset.

16. The LIDAR system of claim 1, wherein the at least one processor is further configured to:
receive from the at least one sensor a reflection signal associated with an object in the field of view, wherein a time lapse between light leaving the at least one light source and reflection impinging on the least one sensor constitutes a time of flight; and
alter an amplification parameter associated with the at least one sensor during the time of flight.

17. The LIDAR system of claim 1, wherein the at least one processor is further configured to:
access an optical budget stored in memory, the optical budget being associated with the at least one light source and defining an amount of light that is emittable in a predetermined time period by the at least one light source;
receive information indicative of a platform condition for the LIDAR system;
based on the received information, dynamically apportion the optical budget to a field of view of the LIDAR system based on at least two of: scanning rates, scanning patterns, scanning angles, spatial light distribution, and temporal light distribution; and
output signals for controlling the at least one light source in a manner enabling light flux to vary over scanning of the field of view in accordance with the dynamically apportioned optical budget.

18. The LIDAR system of claim 1, wherein the at least one sensor includes a plurality of detection elements, and wherein the at least one processor is further configured to apply the second amplification setting with respect to a subset of the plurality of detection elements.

19. A LIDAR method for determining distances to objects, the method comprising:
emitting a first light emission directed toward a field of view;
receiving, from at least one sensor at a first amplification setting, data associated with one or more reflections of the first light emission from one or more objects in the field of view;
emitting a second light emission directed toward the field of view;
altering an amplification setting associated with the at least one sensor, to a second amplification setting, different from the first amplification setting;
receiving, from the at least one sensor at the second amplification setting, data associated with one or more reflections of the second light emission from one or more objects in the field of view; and
determining distances to objects in the field of view by analyzing the data associated with the one or more reflections of the first light emission and the data associated with the one or more reflections of the second light emission, wherein the first light emission and the second light emission are directed toward different portions of the field of view, and the method further comprises determining two different distances to two different objects in the field of view by processing data received from the different portions of the field of view using the first and second amplification settings.

20. The method of claim 19, wherein the second amplification setting is associated with a higher detector gain than the first amplification setting.

21. The method of claim 19, wherein the second amplification setting is associated with a higher sensitivity than the first amplification setting.

22. The method of claim 19, wherein the second amplification setting is determined based on the data associated with the one or more reflections of the first light emission.

23. The LIDAR method of claim 19 wherein the at least one sensor includes a plurality of detection elements, and wherein altering the amplification setting associated with the at least one sensor includes applying the second amplification setting with respect to a subset of the plurality of detection elements.

* * * * *